(12) United States Patent
Makinen et al.

(10) Patent No.: US 11,863,087 B2
(45) Date of Patent: Jan. 2, 2024

(54) STACKABLE ACTUATING ELEMENT WITH PROFILED INSULATED ELECTRODE STRUCTURES

(71) Applicant: PixArt Imaging Inc., Hsin-Chu (TW)

(72) Inventors: Ville Topias Makinen, Espoo (FI);
Roberto Tejera-Garcia, Espoo (FI);
Daniil Zykov, Espoo (FI)

(73) Assignee: PixArt Imaging Inc., Hsin-Chu (TW)

( * ) Notice: Subject to any disclaimer, the term of this patent is extended or adjusted under 35 U.S.C. 154(b) by 172 days.

(21) Appl. No.: 17/574,534

(22) Filed: Jan. 12, 2022

(65) Prior Publication Data
US 2022/0181994 A1 Jun. 9, 2022

Related U.S. Application Data

(63) Continuation-in-part of application No. 17/377,403, filed on Jul. 16, 2021, which is a continuation-in-part of application No. 15/852,386, filed on Dec. 22, 2017, now Pat. No. 11,101,745.

(30) Foreign Application Priority Data

Jul. 14, 2017 (FI) .................................... 20175691

(51) Int. Cl.
*H02N 1/00* (2006.01)
(52) U.S. Cl.
CPC .................... *H02N 1/006* (2013.01)
(58) Field of Classification Search
CPC ...................................................... H02N 1/006

USPC .................................................. 310/309, 310
See application file for complete search history.

(56) References Cited

U.S. PATENT DOCUMENTS

| | | | |
|---|---|---|---|
| 9,490,306 B2 | 11/2016 | Kim | |
| 9,595,892 B2 | 3/2017 | Takahashi | |
| 9,667,173 B1 | 5/2017 | Kappus | |
| 2006/0102461 A1* | 5/2006 | Cok | G06F 3/045 200/512 |
| 2006/0105152 A1* | 5/2006 | Cok | G06F 3/045 428/209 |
| 2006/0170925 A1 | 8/2006 | Lin | |
| 2012/0268386 A1 | 10/2012 | Karamath | |

(Continued)

FOREIGN PATENT DOCUMENTS

| | | | |
|---|---|---|---|
| JP | H06284750 | * | 10/1994 |
| JP | H08168099 | * | 6/1996 |

(Continued)

*Primary Examiner* — Ahmed Elnakib
(74) *Attorney, Agent, or Firm* — Winston Hsu

(57) ABSTRACT

A stacked structure is composed of a plurality of layers, and includes: a substrate; a plurality of conductive patterns printed on the substrate; and at least one layer of elastic nodules formed between two layers of the plurality of layers, the layer of elastic nodules including a sensing area being used for at least one of actuation or sensing. The stacked structure is formed by folding the substrate multiple times. The stacked structure further includes: an adhesive layer printed on but not completely covering the conductive patterns and substrate, and forming at least one air reservoir for holding air displaced when the sensing area is compressed. The stacked structure does not include electrically conducting through holes or electrically connecting structures.

20 Claims, 37 Drawing Sheets

(56) References Cited

U.S. PATENT DOCUMENTS

| | | | |
|---|---|---|---|
| 2013/0249859 A1 | 9/2013 | Park | |
| 2014/0210313 A1 | 7/2014 | Kim | |
| 2014/0338458 A1 | 11/2014 | Wang | |
| 2016/0091971 A1 | 3/2016 | Burr | |
| 2019/0020288 A1* | 1/2019 | Mäkinen | G06F 3/016 |
| 2021/0344284 A1* | 11/2021 | Makinen | H02N 1/006 |
| 2022/0181994 A1* | 6/2022 | Makinen | H02N 1/006 |

FOREIGN PATENT DOCUMENTS

| | | | |
|---|---|---|---|
| KR | 10-2015-0112793 A | | 10/2015 |
| WO | WO 2018172621 | * | 9/2018 |

* cited by examiner

1000

1000

Web direction ⟶

Web direction ⟶

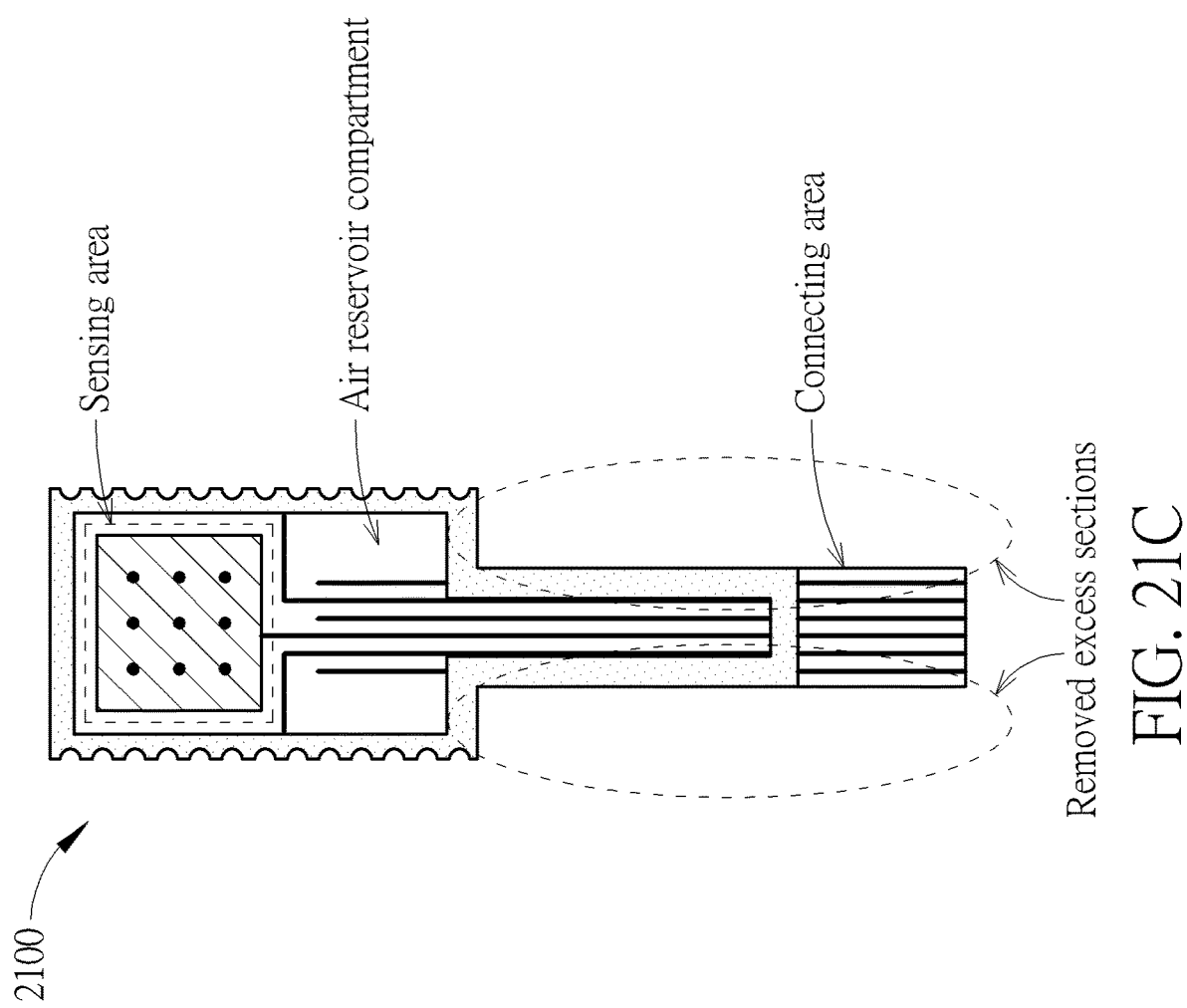

US 11,863,087 B2

STACKABLE ACTUATING ELEMENT WITH PROFILED INSULATED ELECTRODE STRUCTURES

CROSS REFERENCE TO RELATED APPLICATIONS

This application is a Continuation in Part of U.S. patent application Ser. No. 17/377,403, which was filed on Jul. 16, 2021 and is itself a Continuation in Part of U.S. patent application Ser. No. 15/852,386, filed on Dec. 22, 2017, the contents of which are included herein by reference.

BACKGROUND OF THE INVENTION

1. Field of the Invention

This invention is directed to a method for providing electrical edge insulation for an elastomeric film actuator used in an actuator or a sensor, and further directed to a stacked actuator or sensor structure which uses book binding edges and adhesive connections between the layers to prevent lateral displacement and improve electrical connections between the layers. The invention further includes favorable encasing methods and methods facilitating cost effective manufacturing.

2. Description of the Prior Art

There are various techniques for facilitating electrically induced mechanical movement in devices (e.g., consumer electronic devices). One common technique is the use of an Eccentric Rotating Mass (ERM) vibration motor. An ERM vibration motor moves a small rotating mass that is off-center from the point of rotation. The rotation of the mass produces a centripetal force, thereby causing the entire motor to move and vibrate from side to side. Another common technique for facilitating electrically induced mechanical movement is the use of a linear resonant actuator (LRA). An LRA uses magnetic fields and electrical current to create a force on a coil, with the coil driving a magnetic mass up and down against a spring. The movement of the magnetic mass inside a housing moves the entire LRA, thus producing electrically induced mechanical movement. Another common technique is the use of a piezoelectric actuator. A piezoelectric actuator produces a mechanical change (e.g., deformation) in a piezoelectric material in response to an applied electric charge, and the mechanical change produces electrically induced mechanical movement.

These techniques for electrically induced mechanical movement are often characterized by high power consumption; low durability; short lifespan; complex design with external motors, masses, or both; low scalability, especially on flexible surfaces; poor suitability to large area actuation; or any combination thereof.

SUMMARY OF THE INVENTION

The multilayer sensor or actuator structure may be inventively manufactured using a structure printed on a single substrate which does not contain through holes by inventive patterns and folding to achieve the final structure.

While the figures of this application show the actuator or sensors as components that are connected to a circuit board, or a control unit with a connector, it is possible that a sensor or actuator as described here can instead be a surface mounted component or otherwise electrically connected suitable sensing circuit without a discrete connector. In this case, there may not be any protruding stems; instead, the connection is made via connecting pads that are connected to a circuit board or a control unit with, for example, anisotropic conductive film or conductive adhesive.

A stacked structure according to an exemplary embodiment of the present invention is composed of a plurality of layers, and comprises: a substrate; a plurality of conductive patterns printed on the substrate; and at least one layer of elastic nodules formed between two layers of the plurality of layers, the layer of elastic nodules comprising a sensing area being used for at least one of actuation or sensing. The stacked structure is formed by folding the substrate multiple times. The stacked structure does not comprise electrically conducting through holes or electrically connecting structures.

The stacked structure further comprises: an adhesive layer applied on but not completely covering the conductive patterns and substrate. Each fold of the substrate folds the adhesive layer inward for forming the stacked structure by adhering each layer of the plurality of layers. A part of the substrate below, including at least two of the conductive patterns, is not covered by the adhesive layer, so that when the substrate is folded, the stacked structure comprises an air reservoir in one of the plurality of layers. When the sensing area is compressed, displaced air is transmitted to the air reservoir.

In another embodiment, a part of the substrate below three of the conductive patterns is not covered by the adhesive layer, so that when the substrate is folded, the stacked structure comprises a first air reservoir in a top layer of the plurality of layers and a second air reservoir in a bottom layer of the plurality of layers. The stacked structure further comprises: at least two holes in a middle layer of the plurality of layers for connecting the first air reservoir and the second air reservoir. When the sensing area is compressed, displaced air is transmitted to the first air reservoir and the second air reservoir via the two holes.

In yet another embodiment, the adhesive layer is only formed on two sides of the sensing area, and the other two sides of the sensing area are at least partially open to the environment. When the sensing area is compressed, displaced air is transmitted to the environment via the open two sides.

The stacked structure further comprises an insulating layer formed on the conductive layer patterns and partially covering the substrate. Cut holes are formed on the substrate for facilitating folding of the substrate to form the stacked structure. The stacked structure further comprises a stiffener formed on part of a back layer of the stacked structure, to facilitate electrical connection to specific connection ports.

The stacked structure can be formed by a roll-to-roll method.

A method for forming the stacked structure is also provided, comprising: providing a substrate; printing a plurality of conductive patterns on the substrate; forming at least one layer of elastic nodules between two layers of the plurality of layers, the layer of elastic nodules comprising a sensing area being used for at least one of actuation or sensing; and folding the substrate multiple times to form the stacked structure. The stacked structure does not comprise electrically conducting through holes or electrically connecting structures.

The method further comprises: printing or laminating an adhesive layer on but not completely covering the conductive patterns and substrate. For each fold of the substrate, the adhesive layer is folded inward to form the stacked structure by adhering each layer of the plurality of layers.

The step of printing or laminating the adhesive layer comprises: printing or laminating the adhesive layer so that a part of the substrate below at least two of the conductive patterns is not covered by the adhesive layer, so that when the substrate is folded, the stacked structure comprises an air reservoir in one of the plurality of layers. The method further comprises: compressing the sensing area by displacing air to the air reservoir.

In another embodiment, a part of the substrate below three of the conductive patterns is not covered by the adhesive layer, so that when the substrate is folded, the stacked structure comprises a first air reservoir in a top layer of the plurality of layers and a second air reservoir in a bottom layer of the plurality of layers. The method further comprises: forming at least two holes in a middle layer of the plurality of layers for connecting the first air reservoir and the second air reservoir; and compressing the sensing area by displacing air to the first air reservoir and the second air reservoir via the two holes.

In yet another embodiment, the step of printing or laminating an adhesive layer comprises: only forming the adhesive layer on two sides of the sensing area, and leaving the other two sides of the sensing area at least partially open to the environment. The method further comprises: compressing the sensing area by displacing air to the environment via the open two sides.

The method further comprises: forming an insulating layer on the conductive layer patterns and partially covering the substrate; forming cut holes on the substrate for enabling folding of the substrate to form the stacked structure; and forming a stiffener on part of a back layer of the stacked structure, to facilitate electrical connection to specific connection ports.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 21C is a final stage of the sensor shown in FIG. 21A.

DETAILED DESCRIPTION

Figure 1:
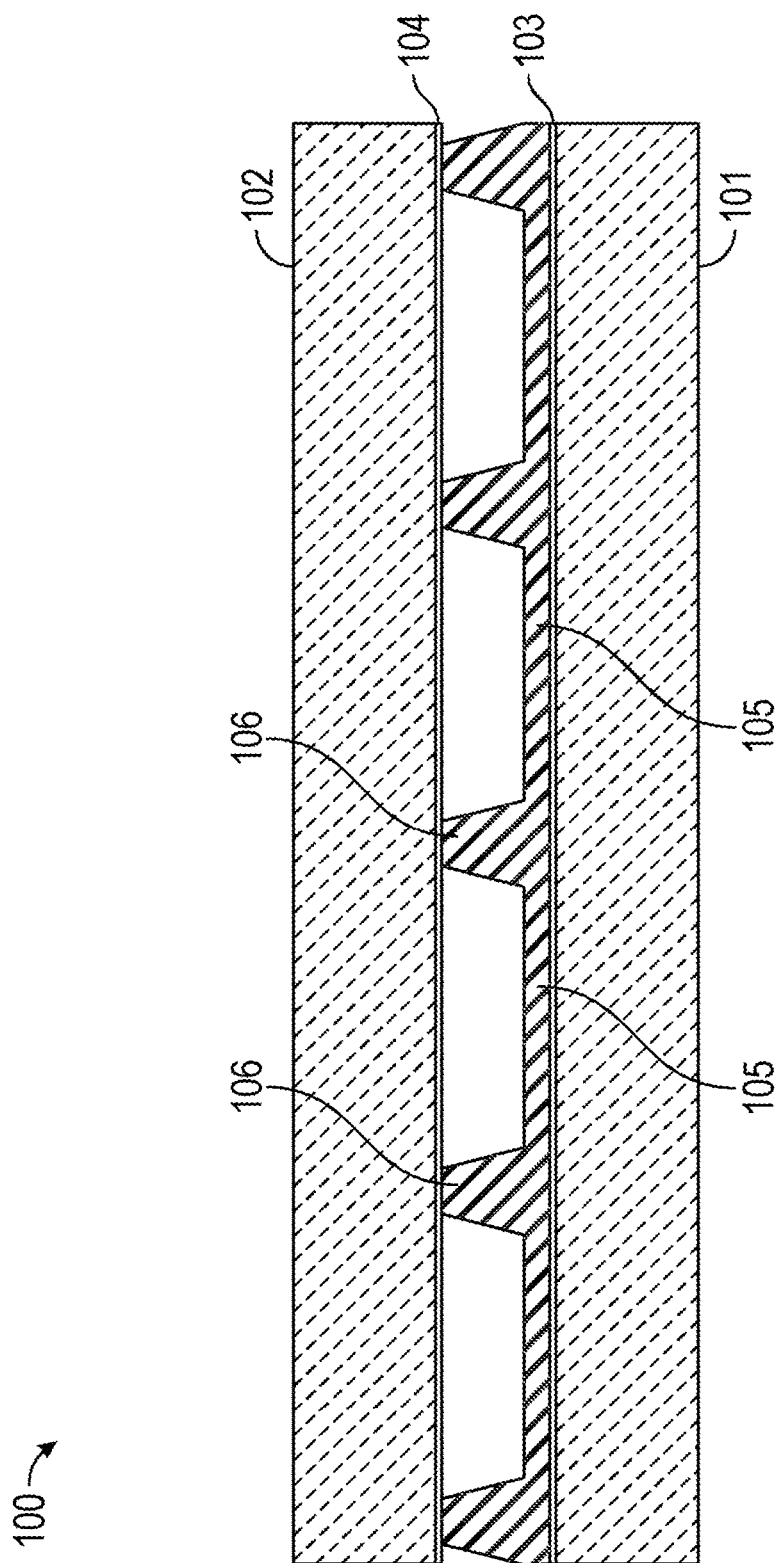
FIG. 1 is a cross-sectional diagram illustrating at least a portion of a single layer of an electrostatic actuator (e.g., an electrostatic actuator structure), according to some example embodiments.

Example structures (e.g. devices, systems, or other apparatus) described herein facilitate electrically induced mechanical movement, which may accordingly provide one or more tactile effects (e.g. tactile feedback), and can in addition (or instead) be able to electrically detect external mechanical movement exerted thereon. Examples merely typify possible variations. Unless explicitly stated otherwise, structures (e.g. structural components, such as layers or nodules) are optional and may be combined or subdivided, and operations are optional and may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

Various example embodiments of the structures discussed herein may be or include a special electrostatic actuator (e.g. electrostatic actuator structure) or sensor that includes at least a first electrode and a second electrode. The electrostatic actuator may also include one or more electrostatic actuation layers, and at least one of said electrostatic actuation layers includes:
a first substrate film, which is intrinsically conductive or semi conductive, or includes
a first conductive electrode layer, the first conductive electrode layer being a part of the first electrode, a second substrate film, which is intrinsically conductive or semi conductive, or includes a second conductive electrode layer, the second conductive electrode layer being a part of the second electrode, at least one of the first and second conductive electrode layers being insulated (e.g. electrically) from the respective first and second substrate films, and a grid array that includes a plurality (e.g. multitude) of elastic support nodules, the plurality of elastic support nodules being configured (e.g. arranged) between the first substrate film and the second substrate film, such that there is a compression space between the first and second conductive electrode layers, the compression space being not entirely filled with solid material; and wherein the electrostatic actuator is configured to compress (e.g. by a certain percentage or by a certain distance) in response to a voltage difference between the first and second electrodes (e.g. in response to the voltage difference exceeding or otherwise transgressing a threshold voltage difference, such that the electrostatic actuator compresses by a certain percentage or by certain distance when a sufficient voltage difference is applied between at least the first electrode and the second electrode).

Accordingly, the electrostatic actuator may be or include an actuator that comprises: a first substrate having a first conductive surface (e.g., functioning as a first electrode); a second substrate having a second conductive surface (e.g. functioning as a second electrode), the first and second conductive surfaces facing toward each other across a compression space between the first and second substrates; and a plurality of elastic nodules spanning the compression space and separating the first and second conductive surfaces, the compression space being less than fully filled with solid (e.g. elastic) material, the compression space being configured to compress (e.g. by certain percentage or by a certain distance) in response to a voltage difference between the first conductive surface and the second conductive surface (e.g. in response to the voltage difference exceeding or otherwise transgressing a threshold voltage difference).

FIG. 1 is a cross-sectional diagram illustrating at least a portion of a single electrostatic actuation layer 100 of an electrostatic actuator (e.g., an electrostatic actuator structure), according to some example embodiments. The electrostatic actuation layer 100 illustrated in FIG. 1 includes a first substrate 101 (e.g. a first substrate film) and a second substrate 102 (e.g. a second substrate film). In the example embodiments shown in FIG. 1, the first substrate 101 and the second substrate 102 each may have typically a thickness of 5 to 100 micrometers. The first substrate 101 may include electrically insulating material or be intrinsically conductive or semi conductive, according to various example embodiments. In the example embodiments shown in FIG. 1, the first substrate 101 is a film that includes or otherwise provides a first conductive layer 103 (e.g. a first conductive electrode layer) applied on top of the first substrate 101. The first conductive layer 103 may form all or part of a first electrode. Accordingly, the first substrate 101 can be described as having a first conductive surface, whether the first conductive surface is intrinsically conductive, intrinsically semi conductive, or intrinsically insulative but topped with the first conductive layer 103.

Similarly, as shown in FIG. 1, the second substrate 102 is a film that includes or otherwise provides a second conductive layer 104 (e.g. a second conductive electrode layer) applied on top of the second substrate 102. The second conductive layer 104 may form all or part of a second electrode. Accordingly, the second substrate 102 can be described as having a second conductive surface, whether the second conductive surface is intrinsically conductive, intrinsically semi conductive, or intrinsically insulative but topped with the second conductive layer 104. According to various example embodiments, the first conductive layer 103, the second conductive layer 104, or both, are insulated.

The first substrate 101 (e.g. with the insulated first conductive layer 103) has a layer of electrically insulating elastomer material 105 (e.g. an electrically insulating elastomer coating) applied on top of the insulated first conductive layer 103 of the first substrate 101. Furthermore, there is a group (e.g. plurality or multitude) of elastic support nodules 106 arranged (e.g. in a grid array) and adhered on top of, or forming part of, the intrinsic structure of the layer of electrically insulating elastomer material 105. In the example embodiments shown in FIG. 1, the layer of electrically insulating elastomer material 105 may typically have a thickness of 1 to 30 micrometers. Furthermore, according to certain example embodiments, the elastic support nodules 106 each have a height of 5 to 100 micrometers and a diameter of 10 to 400 micrometers. In addition, according to some example embodiments, the elastic support nodules 106 each have an aspect ratio of height to maximum width, and the aspect ratio may have a maximum value of two.

Figure 2:
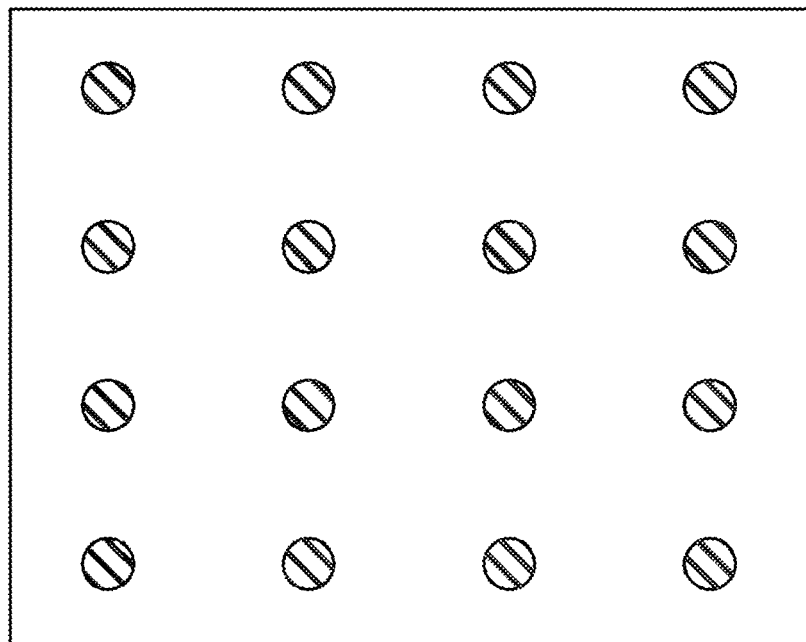
FIG. 2 is a plan view diagram illustrating a multitude of elastic support nodules, arranged in a spaced two-dimensional row-column grid array, according to some example embodiments.
Figure 3:
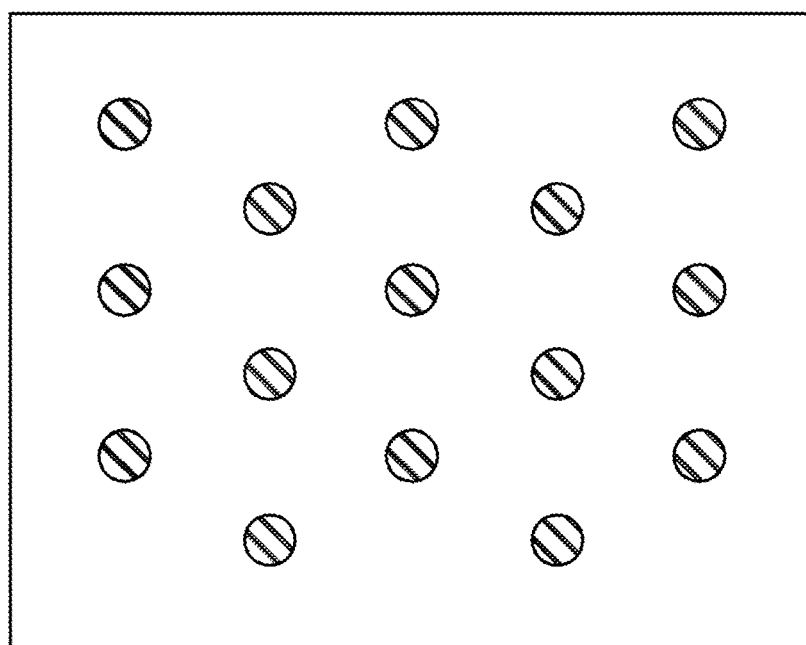
FIG. 3 is a plan view diagram illustrating a multitude of elastic support nodules, arranged in a spaced triangular grid array, according to some example embodiments.

The layer of electrically insulating elastomer material 105, the group of elastic support nodules 106, or both may be applied using a suitable microfabrication technique (e.g. a deposition technique, such as a thin film deposition technique). The group of elastic support nodules 106 may be fully or partially made of a silicon-based organic polymer (e.g. polydimethylsiloxane (PDMS)), rubber (e.g. natural or synthetic), or any suitable combination thereof. Furthermore, the group of elastic support nodules 106 may be arranged less than 5 millimeters apart from each other in distance, and in some example embodiments, the internodule distance is less than 500 micrometers. In certain example embodiments, the group of elastic support nodules 106 is arranged in a grid array, such as a spaced two-dimensional row-column grid array, as illustrated in FIG. 2. In some alternative example embodiments, the group of elastic support nodules 106 is arranged in a spaced triangular grid array, as illustrated in FIG. 3.

After the group of elastic support nodules 106 has been applied to the first substrate 101, the second substrate 102 with the second conductive layer 104 may be turned upside down and placed on top of the group of elastic support nodules 106 to form the electrostatic actuation layer 100 (e.g. a single electrostatic actuation layer that may be combined with one or more additional electrostatic actuation layers into a multi-layer electrostatic actuator structure). Before the second substrate 102 is placed on top of the group of elastic support nodules 106, there may be a layer of adhesive applied to the second substrate 102, to the group of elastic support nodules 106, or to both.

As the first substrate 101 and the second substrate 102 have been stacked one above the other (e.g. to form the electrostatic actuation layer 100), the distance between the first conductive layer 103 and the second conductive layer 104, which may be the distance between the first and second electrodes, in the electrostatic actuation layer 100 may be less than 1000 micrometers and, in some example embodiments, less than 200 micrometers. In the electrostatic actuation layer 100 shown in FIG. 1, the distance between the first and second conductive layers 103 and 104 may be 80 micrometers.

In the electrostatic actuation layer 100, the group of elastic support nodules 106 provides a compression space between the first and second conductive layers 103 and 104. In many example embodiments, the compression space is not entirely filled with solid material (e.g. the compression space is less than fully filled with solid material, such as solid elastic material). In the example embodiments shown in FIG. 1, the compression space may be 80 micrometers thick, and the layer of electrically insulating elastomer material 105 may be 20 micrometers thick, thus leaving a space gap of 60 micrometers. This space gap in the compression space may be filled with fluid (e.g. air, nitrogen, or a dielectric liquid, such as dielectric hydraulic fluid) in places where the elastic support nodules 106 are not present.

In the example embodiments shown in FIG. 1, the electrostatic actuation layer 100 (e.g. one of multiple electrostatic actuation layers within the electrostatic actuator) may also include a group of limiting nodules, which may be arranged in a grid array (e.g. similar to the row-column grid array illustrated in FIG. 2 or the triangular grid array illustrated in FIG. 3). This group of limiting nodules may be arranged between or among the elastic support nodules 106 and between the first substrate 101 and the second substrate 102, for limiting the compression of the compression space and thereby limiting the compression of the electrostatic actuation layer 100 overall. In the example embodiments shown in FIG. 1, the conductive surfaces of the first and second conductive layers 103 and 104 on both sides of the space gap, the elastic support nodules 106, or both may be inherently hydrophobic, hydrophobically or superhydrophobically coated, hydrophobically or superhydrophobically treated, or any suitable combination thereof.

The electrostatic actuation layer 100 is configured (e.g. arranged) to compress when a sufficient voltage difference is applied between at least the first conductive layer 103 (e.g. functioning as a first electrode) and the second conductive layer 104 (e.g. functioning as a second electrode). Hence, an electrostatic actuator (e.g. an electrostatic actuator structure) that includes one or more electrostatic actuation layers (e.g. electrostatic actuation layer 100) may be configured to compress in response to such a voltage difference between the first conductive layer 103 and the second conductive layer 104 (e.g. between respectively first and second conductive surfaces thereof) exceeding a threshold voltage difference (e.g. a predetermined threshold voltage difference). Accordingly, an electrostatic actuator that includes one or more of such electrostatic actuation layers may be configured to be compressed in response to application of such a voltage difference. According to various example embodiments, the electrostatic actuator may be included (e.g. embedded) as part of a flexible or elastic substrate. For example, the electrostatic actuator itself may be intrinsically flexible, elastic, or both, and may be included in such a flexible or elastic substrate. The electrostatic actuation layer 100 shown in FIG. 1 may have an overall thickness in the range of approximately 15 micrometers to approximately 500 micrometers, including the thickness of the first and second conductive layers 103 and 104 and, in some example embodiments, the thickness of an adhesive layer between the elastic support nodules 106 and the second conductive layer 104.

Figure 4:
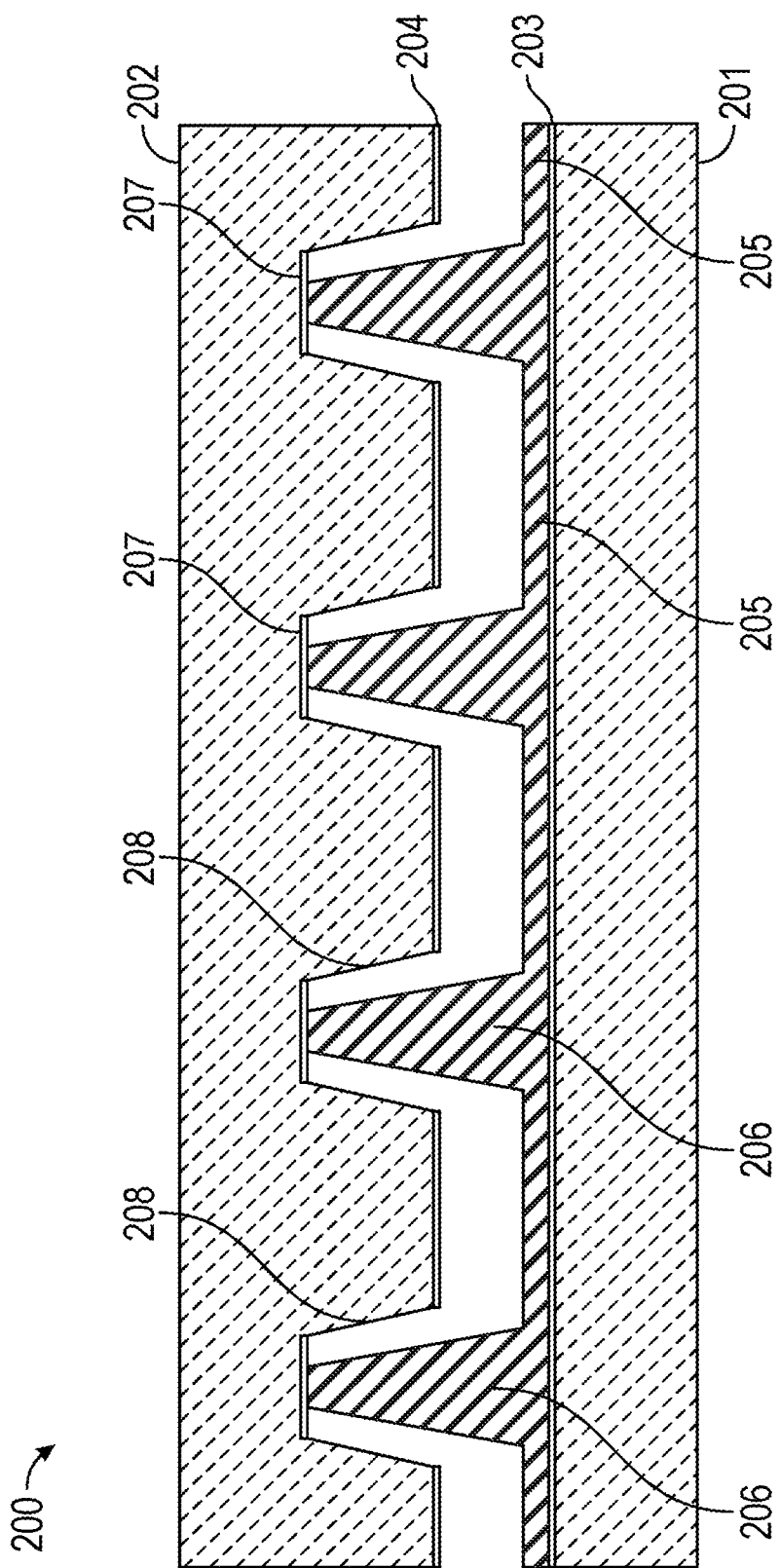
FIG. 4 is a cross-sectional diagram illustrating at least a portion of a single layer of an electrostatic actuator, according to some example embodiments.

FIG. 4 is a cross-sectional diagram illustrating at least a portion of a single electrostatic actuation layer 200 of an electrostatic actuator (e.g., an electrostatic actuator structure), according to some example embodiments. The electrostatic actuation layer 200 illustrated in FIG. 4 includes a first substrate 201 (e.g. a first substrate film) and a second substrate 202 (e.g. a second substrate film). In the example embodiments shown in FIG. 4, the first substrate 201 may have a thickness of 20 micrometers, and the second substrate 202 may have a thickness of 50 micrometers. The first substrate 201 may be a film that includes or otherwise provides a first conductive layer 203 (e.g. a first conductive electrode layer) applied on top of the first substrate 201. The first conductive layer 203 may form all or part of a first electrode. The second substrate 202 may be a film that includes or otherwise provides a second conductive layer 204 (e.g. a second conductive electrode layer) applied on top of the second substrate 202. The second conductive layer 204 may form all or part of a second electrode. According to various example embodiments, the first conductive layer 203, the second conductive layer 204, or both, are insulated.

The first substrate 201 (e.g. with the insulated first conductive layer 203) has a layer of electrically insulating elastomer material 205 (e.g. an electrically insulating elastomer coating) applied on top of the insulated first conductive layer 203 of the first substrate 201. Furthermore, there is a group (e.g. plurality or multitude) of elastic support nodules 206 arranged (e.g. in a grid array) and adhered on top of, or forming part of, the intrinsic structure of the layer of electrically insulating elastomer material 205. In the example embodiments shown in FIG. 4, the layer of electrically insulating elastomer material 205 may have a thickness of 20 micrometers. Furthermore, according to certain example embodiments, the elastic support nodules 206 each have a height of 80 micrometers. In addition, according to some example embodiments, the elastic support nodules 206 each have an aspect ratio of height to maximum width, and the aspect ratio may have a maximum value of two.

The layer of electrically insulating elastomer material 205, the group of elastic support nodules 206, or both may be applied using a suitable microfabrication technique (e.g. a thin film deposition technique). The group of elastic support nodules 206 may be fully or partially made of a silicon-based organic polymer (e.g. PDMS), rubber (e.g. natural or synthetic), or any suitable combination thereof. Furthermore, the group of elastic support nodules 206 may be arranged less than 10 millimeters apart from each other in distance, and in some example embodiments, the inter-nodule distance is less than 2 millimeters. In certain example embodiments, the group of elastic support nodules 206 is arranged in a grid array, such as a spaced two-dimensional row-column grid array, as illustrated in FIG. 2. In some alternative example embodiments, the group of elastic support nodules 206 is arranged in a spaced triangular grid array, as illustrated in FIG. 3.

As shown in FIG. 4, the second substrate 202 may be microfabricated (e.g. etched) to provide wells 208 in the second substrate 202. The wells 208 may be arranged to match the group of elastic support nodules 206 applied to the first substrate 201. The wells 208 may be microfabricated using a suitable microfabrication technique (e.g. an anisotropic wet etching technique). The microfabricated second substrate 202 with the second conductive layer 204 may be turned upside down and placed on top of the group of elastic support nodules 206, such that the wells 208 coincide with the group of elastic support nodules 206 to form the electrostatic actuation layer 200 (e.g. a single electrostatic actuation layer that may be combined with one or more additional electrostatic actuation layers into a multi-layer electrostatic actuator structure). In the electrostatic actuation layer 200, the elastic support nodules 206 may reside in the wells 208. Before the second substrate 202 is placed on top of the group of elastic support nodules 206, there may be adhesive 207 applied to the wells 208, to the group of elastic support nodules 206, or both. In the example embodiments shown in FIG. 4, the depth of the wells 208 may be 90 micrometers. Other suitable depths may be used, depending on the thickness of the second substrate 202 to be microfabricated.

As the first substrate 201 and the second substrate 202 have been stacked one above the other (e.g., to form the electrostatic actuation layer 200), the distance between the first conductive layer 203 and the second conductive layer 204, which may be the distance between the first and second electrodes, in the electrostatic actuation layer 200 may be less than 1000 micrometers and, in some example embodiments, less than 20 micrometers. In the electrostatic actuation layer 200, the distance between said first and second conductive layers 203 and 204 may be 80 micrometers. Due to the wells 208 of the second substrate 202 coinciding (e.g. matching) with the group of elastic support nodules 206 on the first substrate 201, the distance between the first and second conductive layers 203 and 204 may be considerably less than the height of the group of elastic support nodules 206.

In the electrostatic actuation layer 200, the group of elastic support nodules 206 provides a compression space between the first and second conductive layers 203 and 204. In many example embodiments, the compression space is not entirely filled with solid material (e.g. the compression space is less than fully filled with solid material, such as solid elastic material). In the example embodiments shown in FIG. 4, the compression space may be 80 micrometers thick, and the layer of electrically insulating elastomer material 205 may be 20 micrometers thick, thus leaving a space gap of 60 micrometers. This space gap in the compression space may be filled with fluid (e.g. air, nitrogen, or a dielectric liquid, such as dielectric hydraulic fluid) in places where the elastic support nodules 206 are not present.

In the example embodiments shown in FIG. 4, the electrostatic actuation layer 200 (e.g. one of multiple electrostatic actuation layers within an electrostatic actuator) may also include a group of limiting nodules, which may be arranged in a grid array (e.g. similar to the row-column grid array illustrated in FIG. 2 or the triangular grid array illustrated in FIG. 3). This group of limiting nodules may be arranged between or among the elastic support nodules 206 and between the first substrate 201 and the second substrate 202, for limiting the compression of the compression space and thereby limiting the compression of the electrostatic actuation layer 200 overall. In the example embodiments shown in FIG. 4, any one or more of the conductive surfaces of the first and second conductive layers 203 and 204 on either or both sides of the space gap, the elastic support nodules 206, or both may be inherently hydrophobic, hydrophobically or superhydrophobically coated, hydrophobically or superhydrophobically treated, or any suitable combination thereof.

The electrostatic actuation layer 200 is configured (e.g. arranged) to compress when a sufficient voltage difference is applied between at least the first conductive layer 203 (e.g. functioning as a first electrode) and the second conductive layer 204 (e.g. functioning as a second electrode). Hence, an electrostatic actuator (e.g. electrostatic actuator structure) that includes one or more electrostatic actuation layers (e.g. electrostatic actuation layer 200) may be configured to compress in response to such a voltage difference between the first conductive layer 203 and the second conductive layer 204 (e.g. between respectively first and second conductive surfaces thereof) exceeding a threshold voltage difference (e.g. a predetermined threshold voltage difference). Accordingly, an electrostatic actuator that includes one or more of such electrostatic actuation layers may be configured to be compressed in response to application of such a voltage difference. According to various example embodiments, the electrostatic actuator may be included (e.g. embedded) as part of a flexible or elastic substrate. For example, the electrostatic actuator itself may be intrinsically flexible, elastic, or both, and may be included in such a flexible or elastic substrate. The electrostatic actuation layer 200 shown in FIG. 4 may have an overall thickness in the range of approximately 15 micrometers to approximately 500 micrometers, including the thickness of the first and second conductive layers 203 and 204 and, in some example embodiments, the thickness of the adhesive 207 applied between the wells 208 and the elastic support nodules 206.

Figure 5:
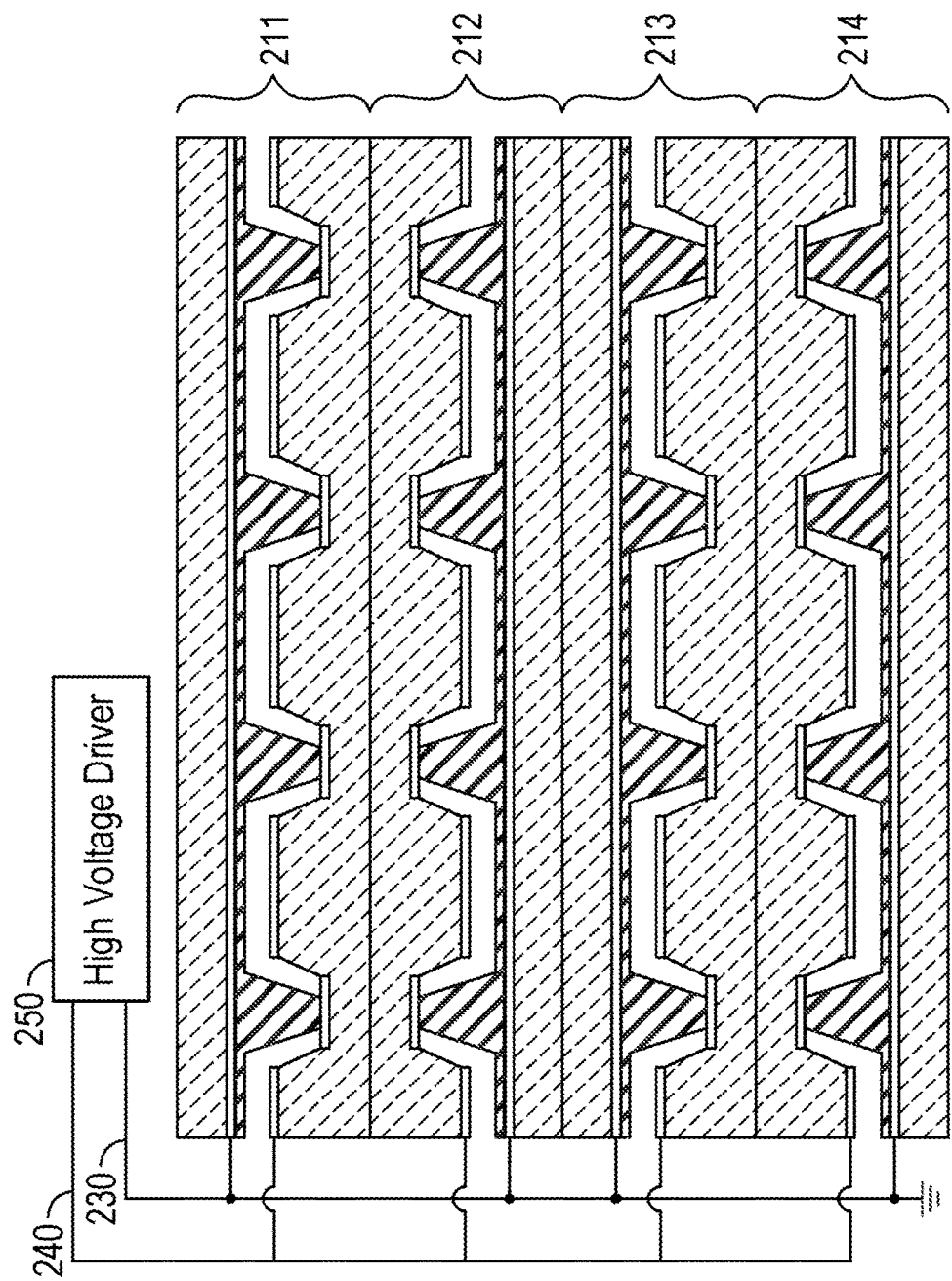
FIG. 5 is a cross-sectional diagram illustrating at least a portion of an electrostatic actuator with four electrostatic actuation layers, according to some example embodiments.

FIG. 5 is a cross-sectional diagram illustrating at least a portion of an electrostatic actuator (e.g. electrostatic actuator structure) with four electrostatic actuation layers, according to some example embodiments. The illustrated electrostatic actuator includes four electrostatic actuation layers 211-214. In the example embodiments shown in FIG. 5, each of the electrostatic actuation layers 211-214 includes a corresponding first substrate (e.g. first substrate 201) with a corresponding first conductive layer (e.g. first conductive layer 203), and the first conductive layer may be part of a first electrode 230. Similarly, each of the electrostatic actuation layers 211-214 includes a corresponding second substrate (e.g. second substrate 202) with a corresponding second conductive layer (e.g. second conductive layer 204), and the second conductive layer may be part of a second electrode 240. Moreover, the first conductive layer may be insulated (e.g. from its first substrate, from another conductive layer, or from both), the second conductive layer may be insulated (e.g. from its second substrate, from another conductive layer, or from both), or both.

Each of the electrostatic actuation layers 211-214 may further include a grid array that includes a group of elastic support nodules (e.g. elastic support nodules 206), and the group of elastic support nodules may be arranged between their corresponding first and second substrates, such that there is arranged a compression space between the first and second conductive layers (e.g. first and second conductive layers 203 and 204). In many example embodiments, the compression space is not entirely filled with solid material (e.g. the compression space is less than fully filled with solid material, such as solid elastic material). According to various example embodiments, the electrostatic actuator that includes the illustrated electrostatic actuation layers 211-214 may further include a high voltage driver 250 (e.g. a high voltage driver with a flyback-mode boost converter).

In the example embodiments shown in FIG. 5, the electrostatic actuation layers 211-214 are stacked one above the other, such that similar structural elements of the electrostatic actuation layers 211-214 coincide at least partially (e.g. coincide fully). For example, the elastic support nodules (e.g. elastic support nodules 206) of one electrostatic actuation layer 211 may be fully or partially aligned over the elastic support nodules of another electrostatic actuation layer 212. Similarly, the wells (e.g. wells 208) of one electrostatic actuation layer 211 may be fully or partially aligned over the wells of another electrostatic actuation layer 212. In alternative example embodiments, the electrostatic actuation layers 211-214 may be imbricatedly stacked (e.g. like overlapping roof tiles).

The electrostatic actuator shown in FIG. 5 is configured to compress when a sufficient voltage difference is applied between the first electrode 230 and the second electrode 240 (e.g. compress in response to such a voltage difference exceeding a threshold voltage difference, such as a predetermined threshold voltage difference). Due to the coinciding, adhered, and joint structure of the electrostatic actuation layers 211-214, the compression effect of the electrostatic actuator structure is increased substantially as a function of the number of coinciding electrostatic actuation layers. With the help of the adhered and joint structure of the electrostatic actuation layers 211-214, the appearance of holes or inter-layer gaps is avoided, and the potential reduction of the compression effect due to the potential inter-pillar swallowing for air compression is covered. Furthermore, potential inter-layer bouncing or non-uniform separation (e.g. due to inter-layer pulling forces resulting from the compression of each layer) is also avoided.

In the example embodiments shown in FIG. 5, the electrostatic actuation layers 211-216 are stacked one above another (e.g. as a stack of electrostatic actuation layers), such that a bifunctional substrate (e.g. a bifunctional substrate film) forms both the first substrate of one electrostatic actuation layer (e.g. electrostatic actuation layer 212) and the first substrate of an adjacent electrostatic actuation layer (e.g. electrostatic actuation layer 211) among the electrostatic actuation layers 211-216, one extending below the bifunctional substrate and the other extending above the bifunctional substrate. Alternatively, the bifunctional substrate may form both the second substrate of one electrostatic actuation layer (e.g. electrostatic actuation layer 212) and the second substrate of an adjacent electrostatic actuation layer (e.g. electrostatic actuation layer 211). Accordingly, such a bifunctional substrate can be considered as being or including (e.g. containing) the boundary between two adjacent electrostatic actuation layers (e.g. between the electrostatic actuation layers 211 and 212), as well as being or including the junction of the two adjacent electrostatic actuation layers. The bifunctional substrate may include a mesh of elastomer material.

Each of the electrostatic actuation layers 211-214 may have an overall thickness of approximately 365 micrometers. Accordingly, the thickness of the electrostatic actuator structure with the four electrostatic actuation layers 211-214 may be approximately four times 365 micrometers, thus resulting in a total thickness of approximately 1.46 millimeters. The electrostatic actuator structure may be hermetically sealed. The described compressing nodule structure, together with hermetic sealing, allows the compression of the electrostatic actuation layers 211-214 as a pump (e.g. a pneumatic pump or a hydraulic pump). In addition to the increased actuation produced by the combined compression of the electrostatic actuation layers 211-214, when hermetically sealed, the above-described elastic support nodules allow the compression of these layers as a pump (e.g. a pneumatic pump or a hydraulic pump). Fluid (e.g. gas or liquid) configured to flow into or out of the space gaps within the electrostatic actuation layers 211-214 can be used to actuate various elastic structures that are affected by the pressure of the fluid. This effect may be used to create a textured surface or to actuate some part of a system via pneumatic or hydraulic means.

Figure 6:
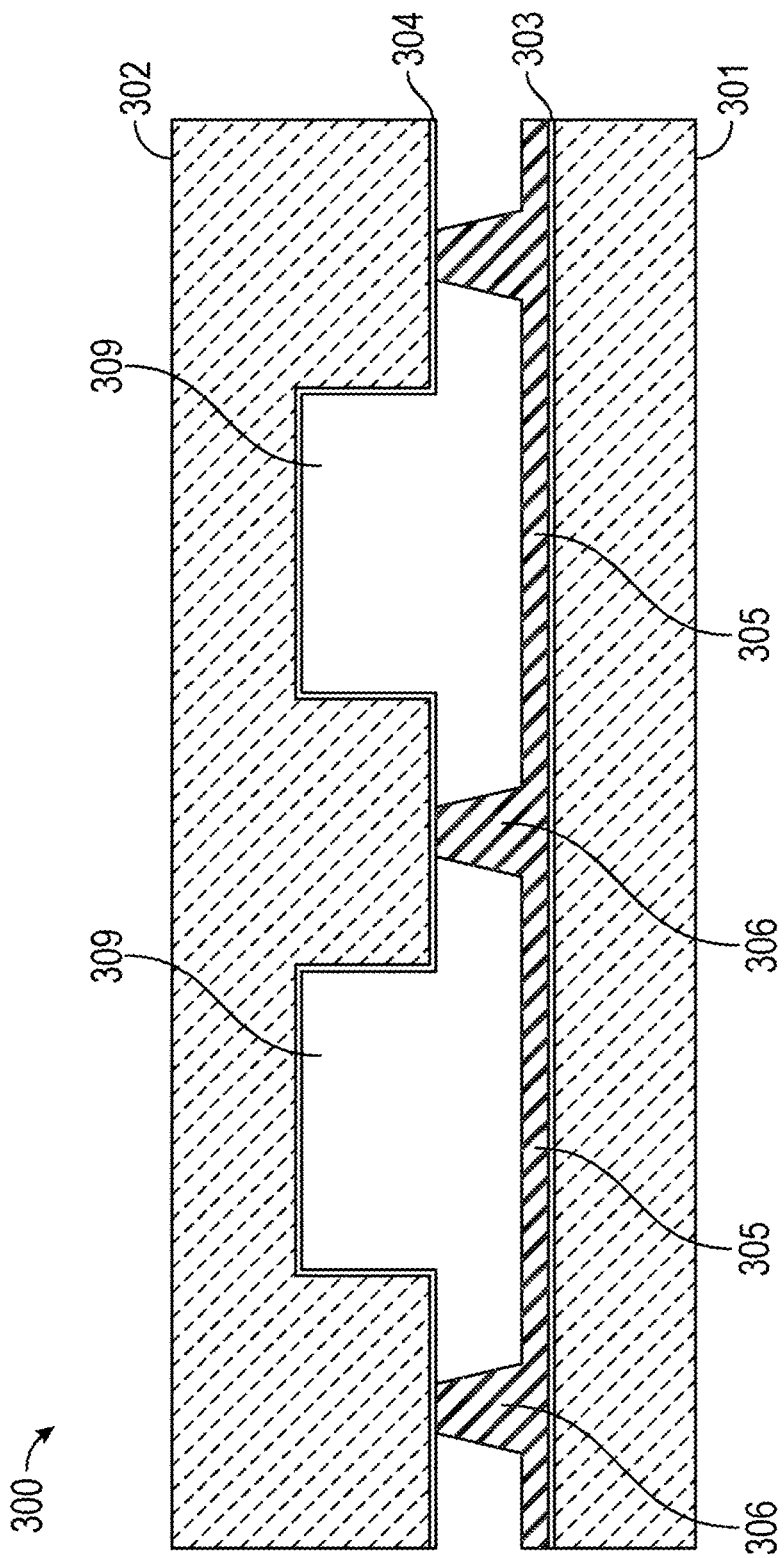
FIG. 6 is a cross-sectional diagram illustrating at least a portion of a single layer of an electrostatic actuator, according to some example embodiments.

FIG. 6 is a cross-sectional diagram illustrating at least a portion of a single electrostatic actuation layer 300 that may form all or part of an electrostatic actuator (e.g. electrostatic actuator structure), according to some example embodiments. The illustrated single electrostatic actuation layer 300 includes a first substrate 301 (e.g. a first substrate film) and a second substrate 302 (e.g. a second substrate film). In the example embodiments shown in FIG. 6, the first substrate 301 may have a thickness of 100 micrometers, and the second substrate 302 may have a thickness of 175 micrometers. The first substrate 301 may be a film that includes or otherwise provides a first conductive layer 303 (e.g. a first conductive electrode layer) applied on top of the first substrate 301. The first conductive layer 303 may form all or part of a first electrode. The second substrate 302 may be a film that includes or otherwise provides a second conductive layer 304 (e.g. a second conductive electrode layer) applied on top of the second substrate 302. The second conductive layer 304 may form all or part of a second electrode. According to various example embodiments, the first conductive layer 303, the second conductive layer 304, or both, are insulated.

The first substrate 301 (e.g. with the insulated first conductive layer 303) has a layer of electrically insulating elastomer material 305 (e.g. an electrically insulating elastomer coating) applied on top of the insulated first conductive layer 303 of the first substrate 301. Furthermore, there is a group (e.g., plurality or multitude) of elastic support nodules 306 arranged (e.g. in a grid array) and adhered on top of, or forming part of, the intrinsic structure of said layer of electrically insulating elastomer material 305. In the example embodiments shown in FIG. 6, the layer of electrically insulating elastomer material 305 may have a thickness of 20 micrometers. Furthermore, according to certain example embodiments, the elastic support nodules 306 each have a height of 80 micrometers. In addition, according to some example embodiments, the elastic support nodules 306 each have an aspect ratio of height to maximum width, and the aspect ratio may have a maximum value of two (2).

The layer of electrically insulating elastomer material 305, the group of elastic support nodules 306, or both may be applied using a suitable microfabrication technique (e.g. a thin film deposition technique). The group of elastic support nodules 306 may be fully or partially made of a silicon-based organic polymer (e.g. PDMS), rubber (e.g. natural or synthetic), or any suitable combination thereof. Furthermore, the group of elastic support nodules 306 may be arranged less than 10 millimeters apart from each other in distance, and in some example embodiments, the internodule distance is less than 2 millimeters. In certain example embodiments, the group of elastic support nodules 306 is arranged in a grid array, such as a spaced two-dimensional row-column grid array, as illustrated in FIG. 2. In some alternative example embodiments, the group of elastic support nodules 306 is arranged in a spaced triangular grid array, as illustrated in FIG. 3.

Furthermore, the electrostatic actuation layer 300 may include one or more fluid reservoirs 309 (e.g. gas reservoirs, such as air reservoirs) that reduce the force involved for overall compression of the electrostatic actuation layer 300 when fluid displacement is restricted by contour sealing, when fluid displacement is restricted by compression speed (e.g. depending on the hydrodynamic properties of the fluid), when the fluid compresses, when the fluid moves from a compression space (e.g. a space gap), or any suitable combination thereof. The second substrate 302 may be microfabricated (e.g. etched) to provide the fluid reservoirs 309 (e.g. gas reservoirs) in the second substrate 302. The fluid reservoirs 309 may be arranged to reduce the compression ratio of fluid volume (e.g. gas volume, such as air volume). The fluid reservoirs 309 may be microfabricated using a suitable microfabrication technique (e.g. an anisotropic wet etching technique). The microfabricated second substrate 302 with the second conductive layer 304 may be turned upside down and placed on top of the group of elastic support nodules 306 to form the electrostatic actuation layer 300. In the example embodiments shown in FIG. 6, the depth of the fluid reservoirs 309 may be 90 micrometers. Other suitable depths may be used, depending on the thickness of the second substrate 302 to be microfabricated. The one or more fluid reservoirs 309 are in fluid communication with (e.g., connected to) one or more compression spaces in the electrostatic actuation layer 300.

In various example embodiments, the horizontal contour of these fluid reservoirs 309 (e.g. wells) can be ellipsoidal, and their centers can be located equidistant from each nodule in each group of four neighboring elastic support nodules (e.g. as shown in in FIG. 2 or FIG. 3). Alternatively, the fluid reservoirs 309 can have an arbitrary shape and can be located outside of the pillar region (e.g. somewhere in the contour of the elastic support nodules layer 306).

Figure 7:
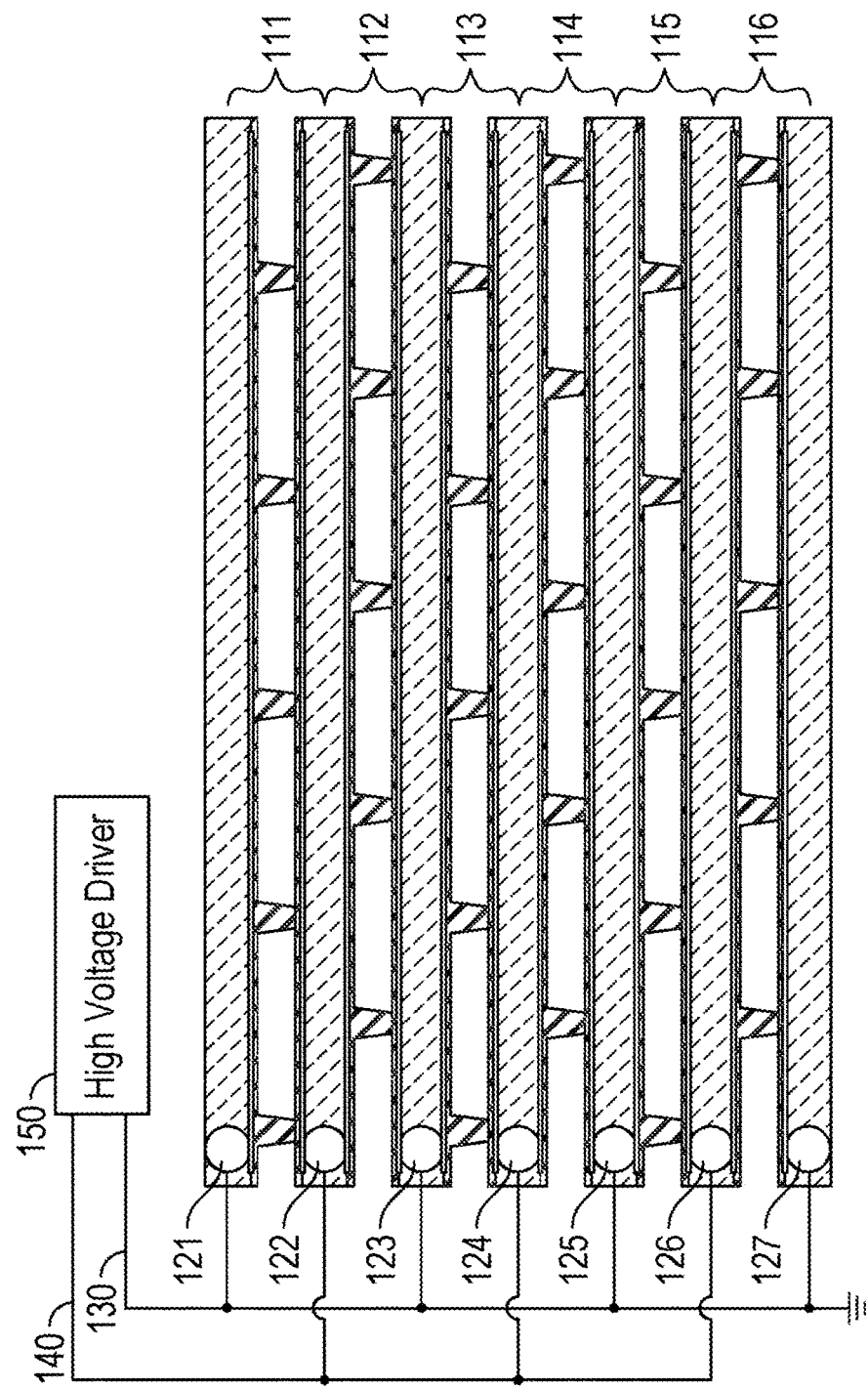
FIG. 7 is a cross-sectional diagram illustrating at least a portion of an electrostatic actuator with six electrostatic actuation layers, according to some example embodiments.

FIG. 7 is a cross-sectional diagram illustrating at least a portion of an electrostatic actuator (e.g. electrostatic actuator structure) with six electrostatic actuation layers, according to some example embodiments. The illustrated electrostatic actuator includes six electrostatic actuation layers 111-116. In the example embodiments shown in FIG. 7, each of the electrostatic actuation layers 111-116 includes a corresponding first substrate (e.g. first substrate 101) with a corresponding first conductive layer (e.g. first conductive layer 103), and the first conductive layer may be part of a first electrode 130. Similarly, each of the electrostatic actuation layers 111-116 includes a corresponding second substrate (e.g. second substrate 102) with a corresponding second conductive layer (e.g. second conductive layer 104), and the second conductive layer may be part of a second electrode 140. Moreover, the first conductive layer may be insulated (e.g. from its first substrate, from another conductive layer, or from both), the second conductive layer may be insulated (e.g. from its second substrate, from another conductive layer, or from both), or both.

In the example embodiments shown in FIG. 7, the electrostatic actuation layers 111-116 are stacked one above another (e.g. as a stack of electrostatic actuation layers), such that a bifunctional substrate (e.g. a bifunctional substrate film) forms both the first substrate of one electrostatic actuation layer (e.g. electrostatic actuation layer 112) and the first substrate of an adjacent electrostatic actuation layer (e.g. electrostatic actuation layer 111) among the electrostatic actuation layers 111-116, one extending below the bifunctional substrate and the other extending above the bifunctional substrate. Alternatively, the bifunctional substrate may form both the second substrate of one electrostatic actuation layer (e.g. electrostatic actuation layer 112) and the second substrate of an adjacent electrostatic actuation layer (e.g. electrostatic actuation layer 111). Accordingly, such a bifunctional substrate can be considered as being or including (e.g. containing) the boundary between two adjacent electrostatic actuation layers (e.g. between the electrostatic actuation layers 111 and 112), as well as being or including the junction of the two adjacent electrostatic actuation layers. The bifunctional substrate may include a mesh of elastomer material.

According to various example embodiments, the electrostatic actuator that includes the illustrated electrostatic actuation layers 111-116 may further include a high voltage driver 150 (e.g. a high voltage driver with a flyback-mode boost converter). Furthermore, any one or more of the substrates (e.g. a bifunctional substrate configured or functioning as both the first substrate of one electrostatic actuation layer and the second substrate of an adjacent electrostatic actuation layer) in the stack of electrostatic actuation layers 111-116 may include an embedded connection element. The electrostatic actuation layers 111-116 are shown in FIG. 7 as including embedded connection elements 121-127, any one or more of which may take the example form of an embedded metal wire or other conductive filament. The embedded connection elements 121-127 each connect one or more of the conductive layers (e.g. first conductive layer 103 or second conductive layer 104, one or more of which may be or include a conductive coating) to the high voltage driver 150. Within the stack of electrostatic actuation layers 111-116, the interior (e.g. non-exterior) embedded connection elements 122-126 connect the conductive electrode layers of the interior bifunctional substrates together and to the high voltage driver 150, as shown in FIG. 7.

Each of the electrostatic actuation layers 111-116 may further include a grid array that includes a group of elastic support nodules (e.g. elastic support nodules 106), and the group of elastic support nodules may be arranged between their corresponding first and second substrates, such that there is arranged a compression space between the first and second conductive layers (e.g. first and second conductive layers 103 and 104). In many example embodiments, the compression space is not entirely filled with solid material (e.g. the compression space is less than fully filled with solid material, such as solid elastic material).

Figure 8:
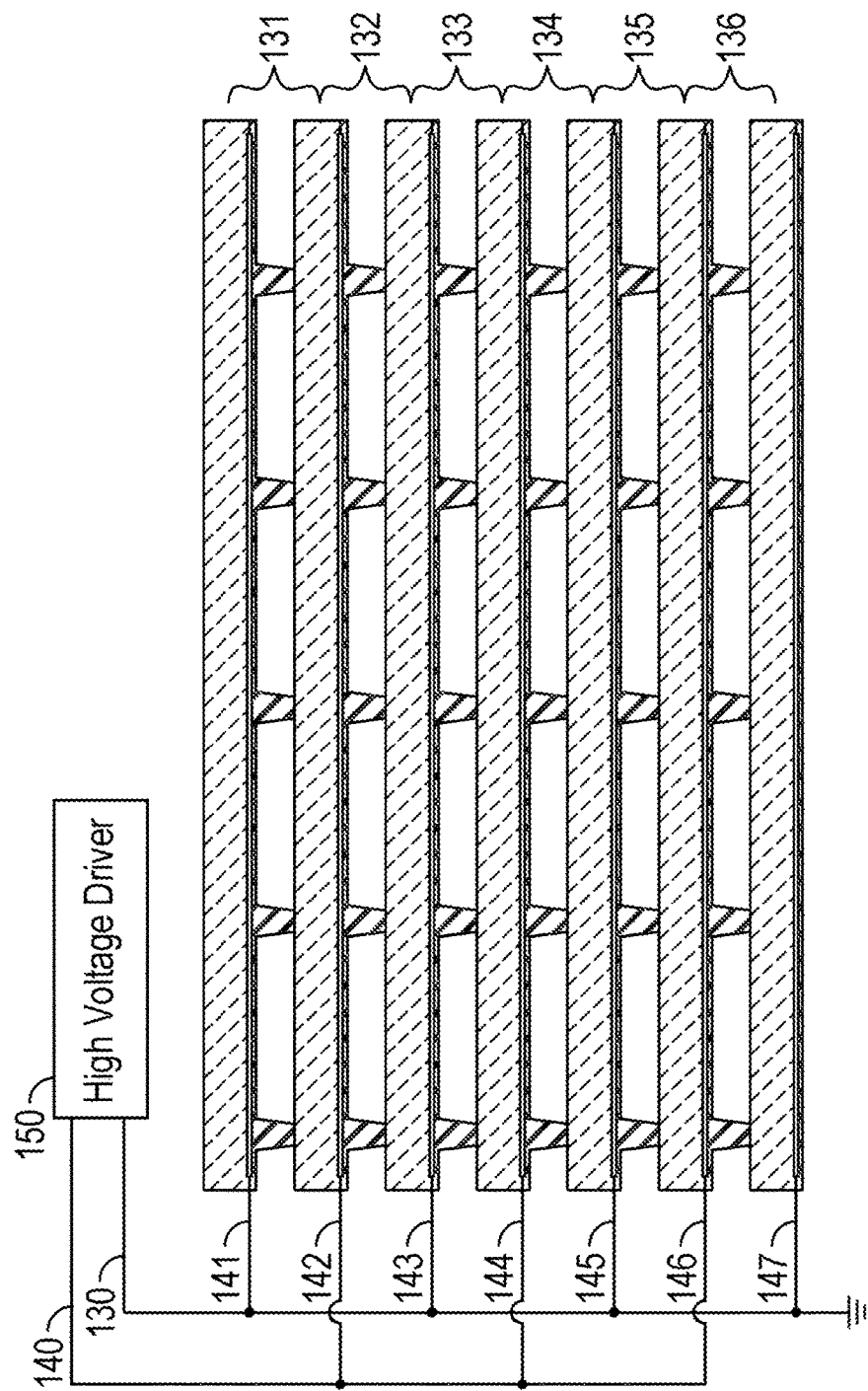
FIG. 8 is a cross-sectional diagram illustrating at least a portion of an electrostatic actuator with six electrostatic actuation layers, according to some example embodiments.

FIG. 8 is a cross-sectional diagram illustrating at least a portion of an electrostatic actuator (e.g. electrostatic actuator structure) with six electrostatic actuation layers, according to some example embodiments. The illustrated electrostatic actuator includes six electrostatic actuation layers 131-136. In the example embodiments shown in FIG. 8, each of the electrostatic actuation layers 131-136 includes a corresponding first substrate (e.g. first substrate 101) with a corresponding first conductive layer (e.g. first conductive layer 103), and the first conductive electrode layer may be part of a first electrode (e.g. first electrode 130). Similarly, each of the electrostatic actuation layers 131-136 includes a corresponding second substrate (e.g. second substrate 102) with a corresponding second conductive layer (e.g. second conductive layer 104), and the second conductive layer may be part of a second electrode (e.g. second electrode 140). Moreover, the first conductive layer may be insulated (e.g. from its first substrate, from another conductive layer, or from both), the second conductive layer may be insulated (e.g. from its second substrate, from another conductive layer, or from both), or both.

In the example embodiments shown in FIG. 8, the electrostatic actuation layers 131-136 are stacked one above another (e.g. as a stack of electrostatic actuation layers), such that a bifunctional substrate (e.g. a bifunctional substrate film) forms both the first substrate of one electrostatic actuation layer (e.g. electrostatic actuation layer 132) and the second substrate of an adjacent electrostatic actuation layer (e.g. electrostatic actuation layer 131) among the electrostatic actuation layers 131-136, one extending below the bifunctional substrate and the other extending above the bifunctional substrate. Accordingly, such a bifunctional substrate can be considered as being or including (e.g. containing) the boundary between two adjacent electrostatic actuation layers (e.g. between the electrostatic actuation layers 131 and 132), as well as being or including the junction of the two adjacent electrostatic actuation layers. The bifunctional substrate may include a mesh of elastomer material.

According to various example embodiments, the electrostatic actuator that includes the illustrated electrostatic actuation layers 131-136 may further include a high voltage driver (e.g. high voltage driver 150, which may have a flyback-mode boost converter). Furthermore, any one or more of the substrates (e.g. a bifunctional substrate configured or functioning as both the first substrate of one electrostatic actuation layer and the second substrate of an adjacent electrostatic actuation layer) in the stack of electrostatic actuation layers 131-136 may include an embedded connection element. The electrostatic actuation layers 131-136 are shown in FIG. 8 as including embedded connection elements 141-147, any one or more of which may take the example form of an embedded wire or other conductive filament. The embedded connection elements 141-147 each connect one or more of the conductive layers (e.g. first conductive layer 103 or second conductive layer 104, one or more of which may be or include a conductive coating) to the high voltage driver (e.g. high voltage driver 150), as shown in FIG. 8.

Each of the electrostatic actuation layers 131-136 may further include a grid array that includes a group of elastic support nodules (e.g. elastic support nodules 106), and the group of elastic support nodules may be arranged between their corresponding first and second substrates, such that there is arranged a compression space between the first and second conductive layers (e.g. first and second conductive layers 103 and 104). In many example embodiments, the compression space is not entirely filled with solid material (e.g. the compression space is less than fully filled with solid material, such as solid elastic material).

Figure 9:
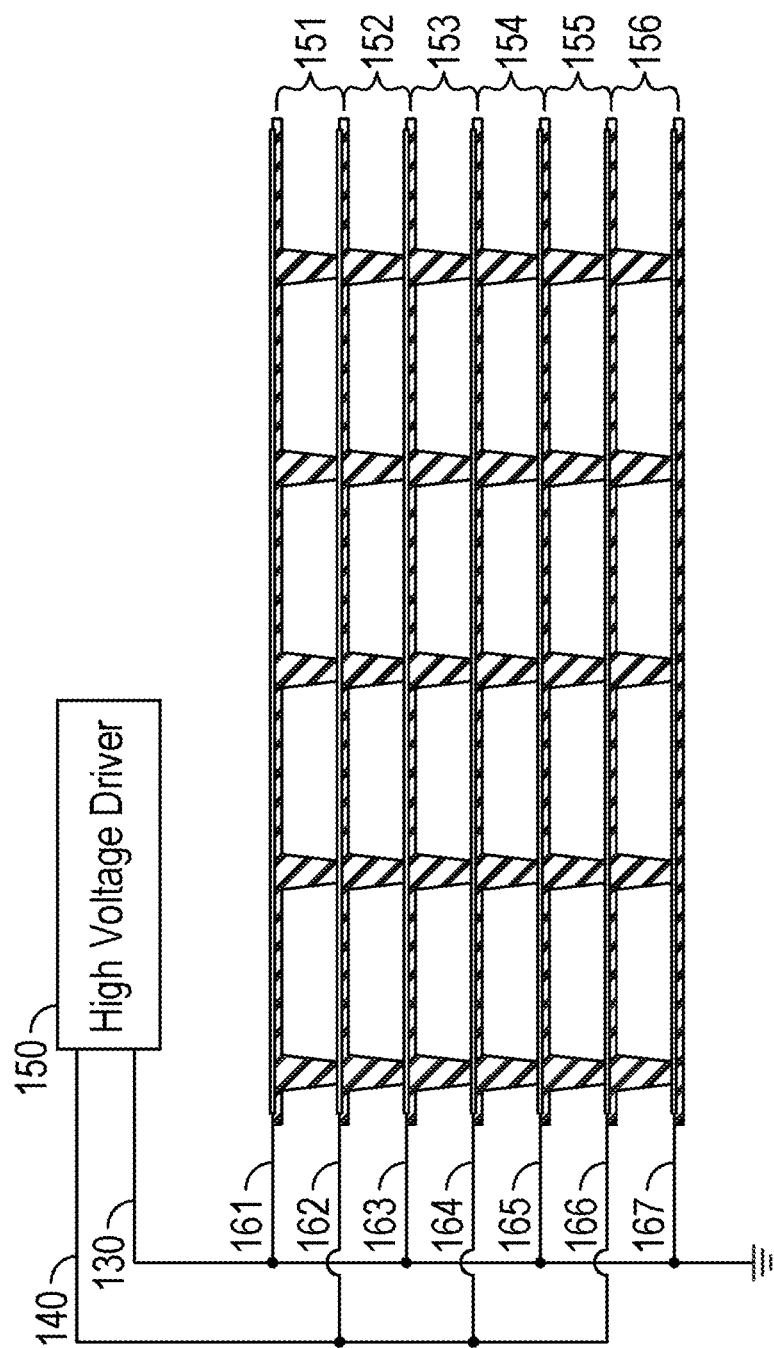
FIG. 9 is a cross-sectional diagram illustrating at least a portion of an electrostatic actuator with six electrostatic actuation layers, according to some example embodiments.

FIG. 9 is a cross-sectional diagram illustrating at least a portion of an electrostatic actuator (e.g. electrostatic actuator structure) with six electrostatic actuation layers, according to some example embodiments. The illustrated electrostatic actuator includes six electrostatic actuation layers 151-156. In the example embodiments shown in FIG. 9, each of the electrostatic actuation layers 151-156 includes a corresponding first substrate (e.g. first substrate 101) with a corresponding first conductive layer (e.g. first conductive layer 103), and the first conductive layer may be part of a first electrode (e.g. first electrode 130). Similarly, each of the electrostatic actuation layers 151-156 includes a corresponding second substrate (e.g. second substrate 102) with a corresponding second conductive layer (e.g. second conductive layer 104), and the second conductive layer may be part of a second electrode (e.g. second electrode 140). Moreover, the first conductive layer may be insulated (e.g. from its first substrate, from another conductive layer, or from both), the second conductive layer may be insulated (e.g. from its second substrate, from another conductive layer, or from both), or both.

In the example embodiments shown in FIG. 9, the electrostatic actuation layers 151-156 are stacked one above another (e.g. as a stack of electrostatic actuation layers), such that a bifunctional layer of electrically insulating elastomer material forms both the first substrate of one electrostatic actuation layer (e.g. electrostatic actuation layer 152) and the second substrate of an adjacent electrostatic actuation layer (e.g. electrostatic actuation layer 151) among the electrostatic actuation layers 151-156, one extending below the bifunctional layer and the other extending above the bifunctional layer. Accordingly, such a bifunctional layer of electrically insulating elastomer material can be considered as being or including (e.g. containing) the boundary between two adjacent electrostatic actuation layers (e.g. between the electrostatic actuation layers 151 and 152), as well as being or including the junction of the two adjacent electrostatic actuation layers. The bifunctional substrate may include a mesh of elastomer material. Furthermore, in certain example embodiments, a bifunctional conductive layer (e.g. a bifunctional conductive electrode layer) is applied to the bifunctional layer of electrically insulating elastomer material and thus arranged to act as both a first conductive layer (e.g. first conductive layer 103) and a second conductive layer (e.g. second conductive layer 104) for a pair of adjacent electrostatic actuation layers (e.g. electrostatic actuation layers 151 and 152), one extending below the bifunctional conductive layer and the other extending above the bifunctional conductive layer.

According to various example embodiments, the electrostatic actuator that includes the illustrated electrostatic actuation layers 151-156 may further include a high voltage driver (e.g. high voltage driver 150, which may have a flyback-mode boost converter). Furthermore, any one or more of the bifunctional layers (e.g. a bifunctional layer of electrically insulating elastomer material or a bifunctional conductive layer) in the stack of electrostatic actuation layers 151-156 may include an embedded connection element. The electrostatic actuation layers 151-156 are shown in FIG. 9 as including embedded connection elements 161-167, any one or more of which may take the example form of an embedded wire or other conductive filament. The embedded connection elements 161-167 each connect one or more of the conductive layers (e.g. one or more bifunctional conductive layers, any one or more of which may be or include a conductive coating) to the high voltage driver (e.g. high voltage driver 150), as shown in FIG. 9.

Each of the electrostatic actuation layers 151-156 may further include a grid array that includes a group of elastic support nodules (e.g. elastic support nodules 106), and the group of elastic support nodules may be arranged between their corresponding first and second substrates, such that there is arranged a compression space between the first and second conductive layers (e.g. first and second conductive layers 103 and 104). In many example embodiments, the compression space is not entirely filled with solid material (e.g. the compression space is less than fully filled with solid material, such as solid elastic material).

Any combination of one or more of the above-described electrostatic actuation layers (e.g. electrostatic actuation layer 100, 200, or 300) may be included in an electrostatic actuator (e.g. an electrostatic actuator structure), and such included electrostatic actuation layers may be stacked one above the other to form at least two stacks of electrostatic actuation layers, as illustrated in FIGS. 10A, 10B, 11A, and 11B. In the example embodiments shown in FIGS. 10A, 10B, 11A, and 11B, any one or more of the first and second conductive surfaces of the first and second conductive layers on either or both sides of the space gap, the elastic support nodules, or both, may be inherently hydrophobic, hydrophobically or superhydrophobically coated, hydrophobically or superhydrophobically treated, or any suitable combination thereof.

FIGS. 10A, 10B, 11A, and 11B are cross-sectional diagrams each illustrating an electrostatic actuator 1000 (e.g. electrostatic actuator structure), which may have multiple (e.g. at least two stacks) of electrostatic actuation layers (e.g. at least two separate stacks that each include multiple instances of the electrostatic actuation layer 100, 200, or 300). In alternative example embodiments, the electrostatic actuator 1000 has a single stack, and the single stack has a cavity (e.g. a hole) that, when viewed in cross-section, has the appearance shown in FIG. 10A, 10B, 11A, or 11B. Each stack includes at least one fluid reservoir (e.g. fluid reservoir 309, which may be a gas reservoir, such as an air reservoir) arranged between the at least two stacks of electrostatic actuation layers. Moreover, there may be an elastic surface layer arranged on top of the at least two stacks of electrostatic actuation layers and on top of said at least one fluid reservoir (e.g. covering both the at least two stacks and the at least one fluid reservoir).

Figure 10A:
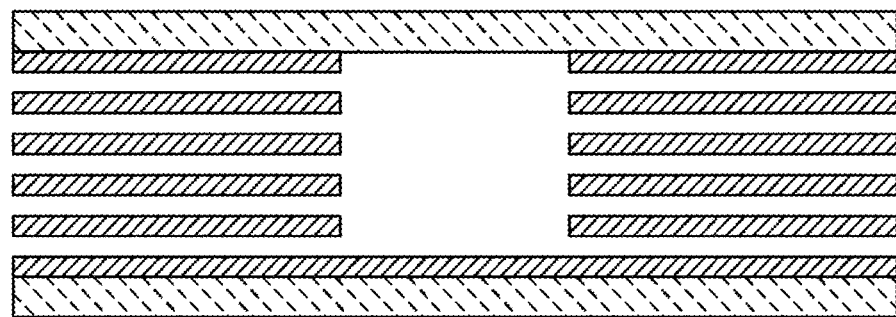
FIGS. 10A and 10B are cross-sectional diagrams each illustrating at least two stacks of electrostatic actuation layers, according to some example embodiments.
Figure 10B:
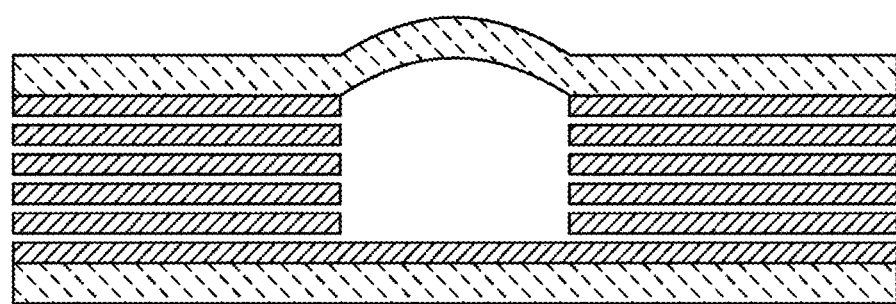
Figure 11A:
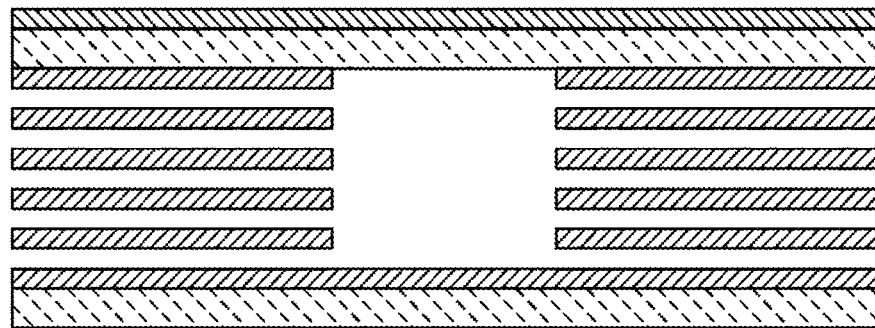
FIGS. 11A and 11B are cross-sectional diagrams each illustrating at least two stacks of electrostatic actuation layers, with an additional firm structure, according to some example embodiments.
Figure 11B:
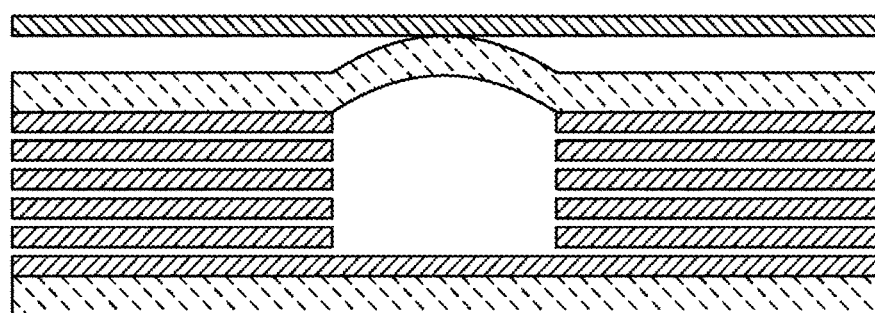

In FIGS. 11A and 11B, the electrostatic actuator 1000 also has an additional firm (e.g. rigid) structure on top of the elastic surface layer. The firm structure may facilitate a homogeneous (e.g. flat) area of actuation, collect actuation power from multiple bulges, protect flexible layers from the environment, or any suitable combination thereof. FIGS. 10A and 11A depict the electrostatic actuator 1000 in a state of rest. FIGS. 10B and 11B depict the electrostatic actuator 1000 when the stacked electrostatic actuation layers are being compressed, such that the elastic surface layer on top of at least one fluid reservoir bulges accordingly as a result of the electrostatic actuation layers being compressed. In FIGS. 11A and 11B, the electrostatic actuator 1000 may include an additional grid array of limiting nodules, which may be arranged between the elastic surface layer and the firm structure, for facilitating the entrance of air between both layers in the expansion process from the configuration shown in FIG. 11A to the configuration shown in FIG. 11B.

Figure 12A:
FIGS. 12A, 12B, and 12C are cross-sectional diagrams each illustrating at least a portion of a single layer of an electrostatic actuator, according to some example embodiments.
Figure 12B:
Figure 12C:

FIGS. 12A, 12B, and 12C are cross-sectional diagrams each illustrating at least a portion of a single layer (e.g. a single electrostatic actuation layer) within the electrostatic actuator 1000, according to some example embodiments. In some example embodiments, such a single layer forms the entirety of an electrostatic actuation structure. In alternative example embodiments, such a single layer is one layer (e.g. a topmost or exterior layer) among multiple electrostatic actuation layers included in an electrostatic actuation structure. As shown in FIGS. 12A, 12B, and 12C, the illustrated single layer has a flexible upper substrate.

FIG. 12A depicts the single layer (e.g. the single electrostatic actuation layer) in a state of rest. FIG. 12B depicts the single layer when being partially compressed (e.g. due to a voltage difference across its first and second electrodes transgressing (e.g. exceeding) a first threshold voltage difference). FIG. 12C depicts the single layer when being fully compressed (e.g. due to the voltage difference across its first and second electrodes transgressing a second threshold voltage difference, which may be higher than the first threshold voltage difference). In FIGS. 12B and 12C, as the flexible upper substrate of the single layer is being compressed, fluid flows from the corresponding compression space (e.g. space) and creates one or more bulges in the flexible upper substrate. These bulges may occur at the positions of the elastic support nodules (e.g. elastic support nodules 106).

As noted above, in certain example embodiments, one or more electrostatic actuation layers (e.g. electrostatic actuation layer 100, 200, or 300) within the electrostatic actuator 1000 (e.g. electrostatic actuator structure) may be stacked one above the other in an aligned manner. For example, the elastic support nodules (e.g. elastic support nodules 106) of one electrostatic actuation layer may be fully or partially aligned over the elastic support nodules of another (e.g. adjacent) electrostatic actuation layer. Similarly, if present, the wells (e.g. wells 208) of one electrostatic actuation layer may be fully or partially aligned over the wells of another (e.g. adjacent) electrostatic actuation layer.

However, in certain alternative example embodiments, one or more electrostatic actuation layers (e.g. electrostatic actuation layer 100, 200, or 300) within the electrostatic actuator 1000 may be imbricatedly stacked one above the other without such alignment (e.g. such that each node resides at the center of mass of a system formed by its closest four neighbor nodes, in the adjacent layer). For example, FIG. 7 illustrates a situation in which the elastic support nodules (e.g. elastic support nodules 106) of one electrostatic actuation layer are not aligned (e.g. are completely unaligned) with the elastic support nodules of another (e.g. adjacent) electrostatic actuation layer. Likewise, if present, the wells (e.g. wells 208) of one electrostatic actuation layer are not aligned with the wells of another (e.g. adjacent) electrostatic actuation layer.

Generally speaking, electrostatic actuators with imbricatedly stacked electrostatic actuation layers may be less vulnerable to overall bending under the aggregated (e.g. compounded) forces, deformations, or both in the stacked electrostatic actuation layers. This may provide the benefit of maximizing the amplitude of compression in situations where there is some layer bending in the inter-node space. This may also provide the benefit of an overall structure in which the stack of electrostatic actuation layers compresses approximately uniformly, despite localized bending occurring in one or more individual layers within the overall structure. "Bending" in this context refers to a process by which one or more of the electrostatic actuation layers become curved, such that interstitial regions between the elastic support nodules (e.g. elastic support nodules 106 or 206) experience more compression than regions near or at the elastic support nodules.

In certain example embodiments, the electrostatic actuator 1000 (e.g. electrostatic actuator structure) includes a grid of relatively rigid tile structures and relatively malleable areas between the tile structures. This may provide the benefit of allowing the bending of the actuator surface (e.g. uppermost or exterior substrate) at the relatively malleable areas, while retaining local rigidity at or near the relatively rigid tile structures. The relatively rigid tile structures may facilitate compression while providing resistance to bending between the elastic support nodules when the voltage difference is applied to the first and second electrodes of the electrostatic actuation layers.

In various example embodiments, instead of elastic support nodules (e.g. elastic support nodules 106), the electrostatic actuator 1000 (e.g. electrostatic actuator structure) may include rigid supports (e.g. non-elastic support nodules), elastic layer materials, foam-filled structures, continuous supports, continuous limiting structures, web structures, bulging supports (e.g. attached to a top layer) or any suitable combination thereof. According to some example embodiments, one or more elastic support nodules may be replaced by sealed (e.g. hermetically sealed or non-hermetically sealed), gas-filled (e.g. air-filled) cells that function as springs when compressed. According to certain example embodiments, one or more elastic support nodules may be replaced by solid semi-foam, again to function as a spring between the first and second electrodes. As used herein, "solid semi-foam" refers to a solid foam in which air pockets (e.g. air bubbles) are not completely sealed, but rather are polymerized, resulting in holes in the solid walls between the air pockets. According to various example embodiments, the electrostatic actuator 1000 includes a three-dimensional (3D) printed or moulded grid made from one or more suitable polymers that function as springs when compressed. According to some example embodiments, one or more elastic support nodules may be replaced by constrained magnets arranged in repulsion (e.g. with similar poles facing each other) to function as springs (e.g. with higher spring constant values).

In FIGS. 12A, 12B, and 12C, the electrostatic actuator 1000 may include an additional grid array of limiting nodules, which may be arranged between the elastic surface layer and the firm structure, for facilitating the entrance of air between both layers in the expansion process from the configuration shown in FIG. 12C, through the configuration shown in FIG. 12B, to the configuration shown in FIG. 12A.

According to some example embodiments, the grid array of elastic support nodules is in direct contact with both the top and bottom insulated conductive electrode layers, without any additional layer of electrically insulating elastomer material. In certain example embodiments, the grid array of elastic support nodules forms part of the intrinsic structure of a bottom grid of elastomer material, located between the nodules and the bottom insulated conductive electrode layer. According to various example embodiments, the grid array of elastic support nodules is adhered to both top and bottom layers of electrically insulating elastomer material, or forms part of the intrinsic structure of both top and bottom layers of electrically insulating elastomer material.

Figure 13:
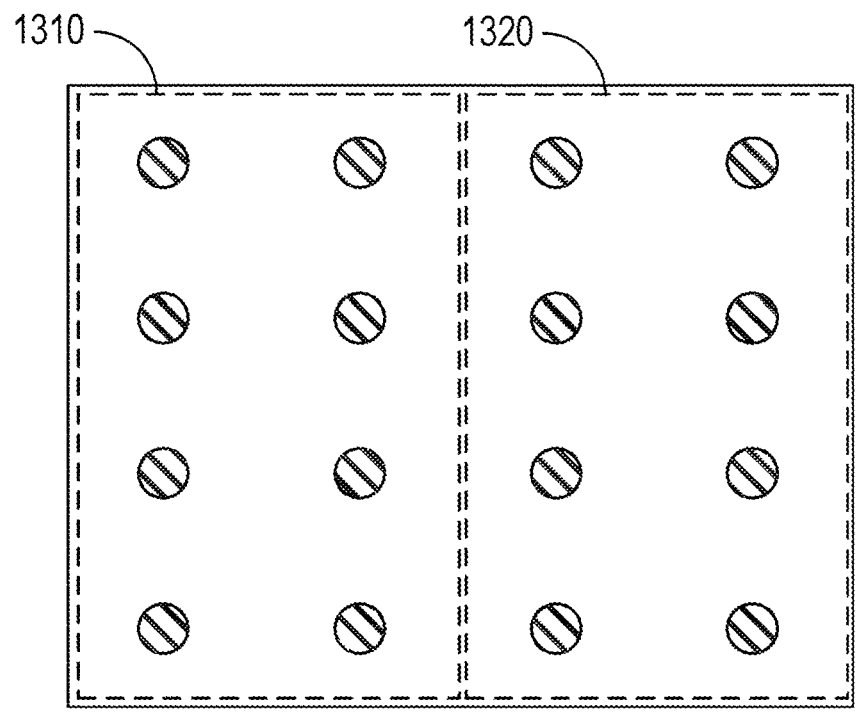
FIG. 13 is a plan view diagram illustrating a multitude of elastic support nodules, arranged in a spaced two-dimensional row-column grid array, with a first zone in which first and second electrodes are present, and with a second zone in which first and second electrodes are absent, according to some example embodiments.
Figure 14:
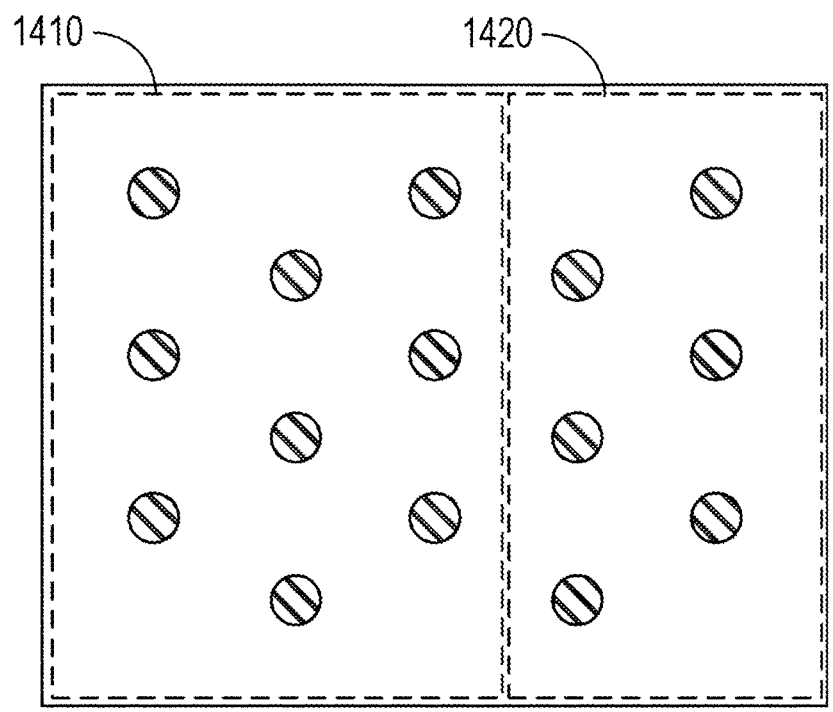
FIG. 14 is a plan view diagram illustrating a multitude of elastic support nodules, arranged in a spaced triangular grid array, with a first zone in which first and second electrodes are present, and with the second zone in which first and second electrodes are absent, according to some example embodiments.

As shown in FIG. 13 and FIG. 14, the electrostatic actuator 1000 may include non-uniform electrodes (e.g. a first or second electrode that does is not coextensive with the entire multitude of elastic support nodules). In FIG. 13, the elastic support nodules in a first zone 1310 are arranged between a first electrode (e.g. first conductive layer 103) and a second electrode (e.g. second conductive layer 104), and the first and second electrodes are present within the first zone 1310. However, in FIG. 13, the elastic support nodules in a second zone 1320 are not arranged between any electrodes, and the first and second electrodes do not extend into the second zone 1320.

Accordingly, while the multitude of elastic support nodules may be uniform and homogeneous (e.g. arranged in a grid array), the electrostatic actuator 1000 can produce one or more non-uniform pressure patterns that result in three-dimensional formations (e.g., one or more ridges) on the surface of the electrostatic actuator 1000. This is facilitated by the elastic surface material of the electrostatic actuator 1000, fluid material flowing from the first zone 1310 to the second zone 1320, or both, within the compression space. For example, such fluid flow may be resultant from the electrostatic pressure being lower in the second zone 1320 where electrodes are absent, compared to the first zone 1310 where electrodes are present.

Similarly, in FIG. 14, the elastic support nodules in a first zone 1410 are arranged between a first electrode (e.g. first conductive layer 103) and a second electrode (e.g. second conductive layer 104), and the first and second electrodes are present within the first zone 1410. However, in FIG. 14, the elastic support nodules in a second zone 1420 are not arranged between any electrodes, and the first and second electrodes do not extend into the second zone 1420. As noted above, while the multitude of elastic support nodules may be uniform and homogeneous (e.g. arranged in a triangular array), the electrostatic actuator 1000 can produce one or more non-uniform pressure patterns that result in three-dimensional formations (e.g. one or more ridges) on the surface of the electrostatic actuator 1000. This is facilitated by the elastic surface material of the electrostatic actuator 1000, fluid material flowing from the first zone 1410 to the second zone 1420, or both, within the compression space. For example, such fluid flow may be resultant from the electrostatic pressure being lower in the second zone 1420 where electrodes are absent, compared to the first zone 1410 where electrodes are present.

As a result, the non-uniform electrodes may cause the surface of the electrostatic actuator 1000 to produce a three-dimensional mechanical oscillation pattern (e.g. a pattern of one or more three-dimensional ridges, bulges, depressions, or any suitable combination thereof). For example, fluid flow from a first zone (e.g. first zone 1310 or 1410) to a second zone (e.g. second zone 1320 or 1420) may cause the second zone to bulge as the first zone compresses, and such bulging may contribute to the production of the three-dimensional mechanical oscillation pattern.

In some example embodiments, a bulging second zone pushes on a rigid surface layer that is mechanically coupled to the elastic surface layer and causes the rigid surface layer to move away from the remainder of the electrostatic actuator 1000. For example, if the second substrate 102 is mechanically coupled to the rigid surface layer within the second zone 1320, the bulging of the second zone 1320 pushes the rigid surface layer away from the first substrate 101, at least within the second zone 1320. Similarly, if the second substrate 202 is mechanically coupled to the rigid surface layer within the second zone 1420, the bulging of the second zone 1420 pushes the rigid surface layer away from the first substrate 201, at least within the second zone 1420.

As is well-known, an actuator operates at high voltages, creating potential differences between the layers causing them to be compressed. In a stacked structure, when the layers are very close and there is insufficient isolation, these different potentials can cause sparks between the electrodes. Prior arts have attempted to solve this problem by forming an electrode that only partly covers the top surface of the substrate upon which it is disposed, creating one gap between the electrode and the substrate edges. This increases the distance between the electrode edges from adjacent layers on the structure, thus minimizing the possibility of sparks occurring between the said layers.

Figure 15A:
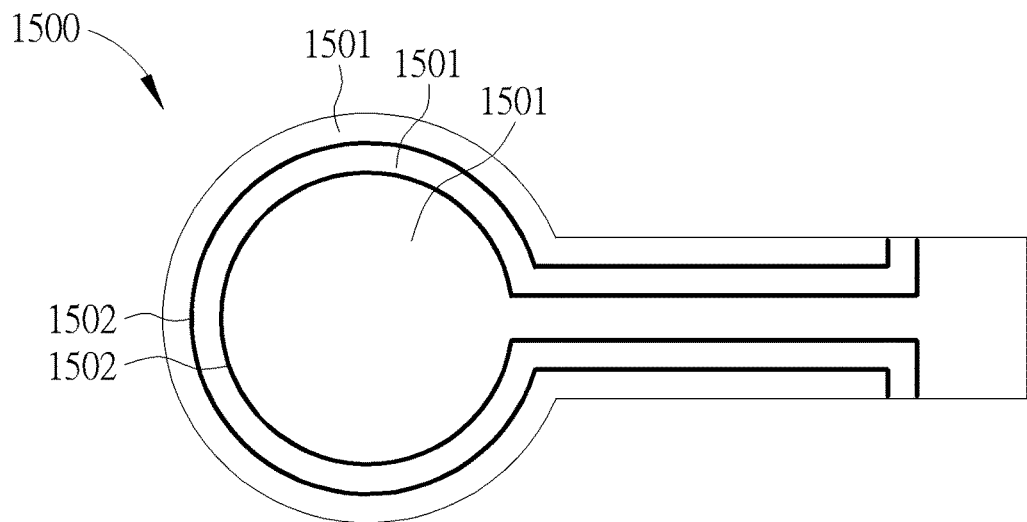
FIG. 15A is a top view of a flat active element (FAE) layer according to an exemplary embodiment of the present invention.
Figure 15B:
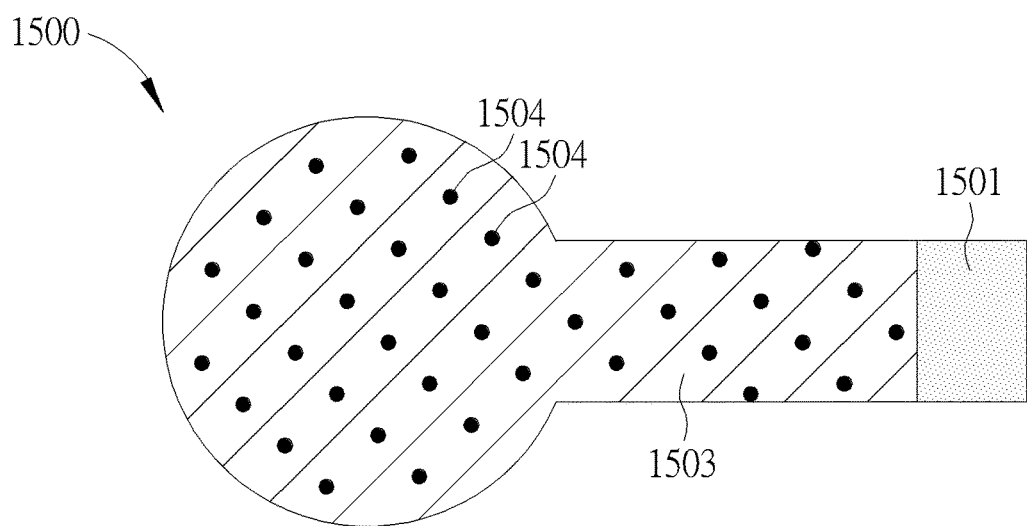
FIG. 15B is a bottom view of the flat active element (FAE) layer in FIG. 15A.
Figure 15C:
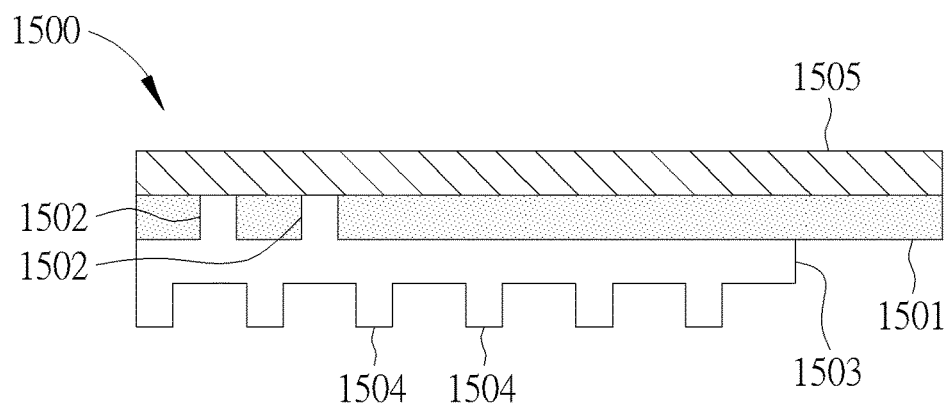
FIG. 15C is a cross-sectional view of the flat active element (FAE) layer in FIG. 15A.

The present invention provides a structure which can also solve the problem of sparks occurring between successive layers of an actuator or sensor, while preserving the robustness of the stacked structure and using a simple manufacturing process. Refer to FIG. 15A, which is a top view of an electrode 1500 according to an exemplary embodiment of the present invention. As shown in FIG. 15A, the electrode 1500 contains a series of indented, i.e. scratched, grooved or etched lines 1502, which follow the shape of the electrode and connect to the protruding end. FIG. 15B shows the underside of the electrode 1500 shown in FIG. 15A, wherein the elastic pillars 1504 are disposed on the underside. FIG. 15C is a cross-sectional diagram of a flat active element (FAE) 1500 having the structure shown in FIG. 15A and FIG. 15B. As shown in FIG. 15C, the etched lines 1502 fully cut through the conductive layer 1501 but do not penetrate the substrate 1505. In some embodiments, the etched lines may penetrate the substrate but will not fully cut through it, as the aim is to provide isolation. This allows isolation between stacked layers. In the example shown in FIGS. 15A, 15B and 15C, the electrode 1500 comprises two parallel etched lines. This is merely for illustrative purposes, however. In one embodiment, the electrode may have a single etched line, or may have multiple etched lines. Two etched lines is a preferred embodiment, as the number of etched lines may be limited by the size of the electrode. More than one etched line further ensures that isolation can be achieved even if one of the etched lines has a defect such that complete electrical isolation between both sides of the gap is not achieved. The distance between the etched lines will depend on the intended voltage used in the system.

In some embodiments, these etched lines (gaps) may be filled by the elastic layer. This typically occurs by first etching the gaps and then creating the elastic layer on top of the electrode layer. This may also be achieved by a wet coating process. This provides additional insulation. In other embodiments, there may also be an additional insulator layer. By etching lines into the electrodes rather than forming electrodes with different dimensions than their respective substrates, all layers of the stacked actuator or sensor can have the same horizontal dimensions from the top view of the stacked actuator or sensor as shown in FIG. 15A, making the entire structure more robust.

Etching can be performed by any profiling tool, such as a CNC machine, a blade or a laser. No chemicals are required.

Figure 16A:
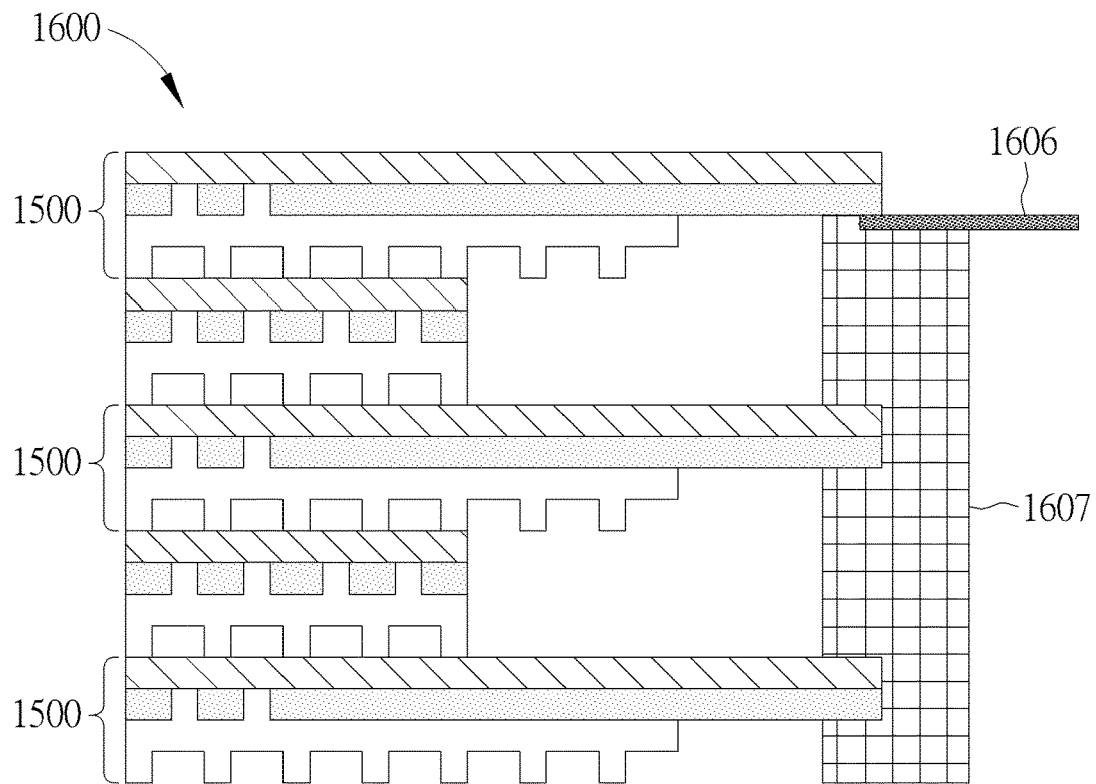
FIG. 16A is a diagram of a stacked structure according to a first embodiment of the present invention.

In order to further increase stability between the stacked layers, the present invention provides various embodiments for joining the FAE layers together to form an actuator or sensor. Refer to FIG. 16A, which is a diagram of a stacked structure 1600 according to a first exemplary embodiment. In FIG. 16A, every alternate layer is coupled at the electrical contact end 1607 to a conductive paste or adhesive, wherein a flat conductive element such as a wire 1606 is coupled to the top layer and the top of the electrical contact end 1607. Forming the stack using this method would require applying the conductive paste/adhesive to each layer before they are applied to the stack. As shown in the diagram, no deformation of any layer occurs as a result of this binding method. A large amount of conductive adhesive is required, however.

Figure 16B:
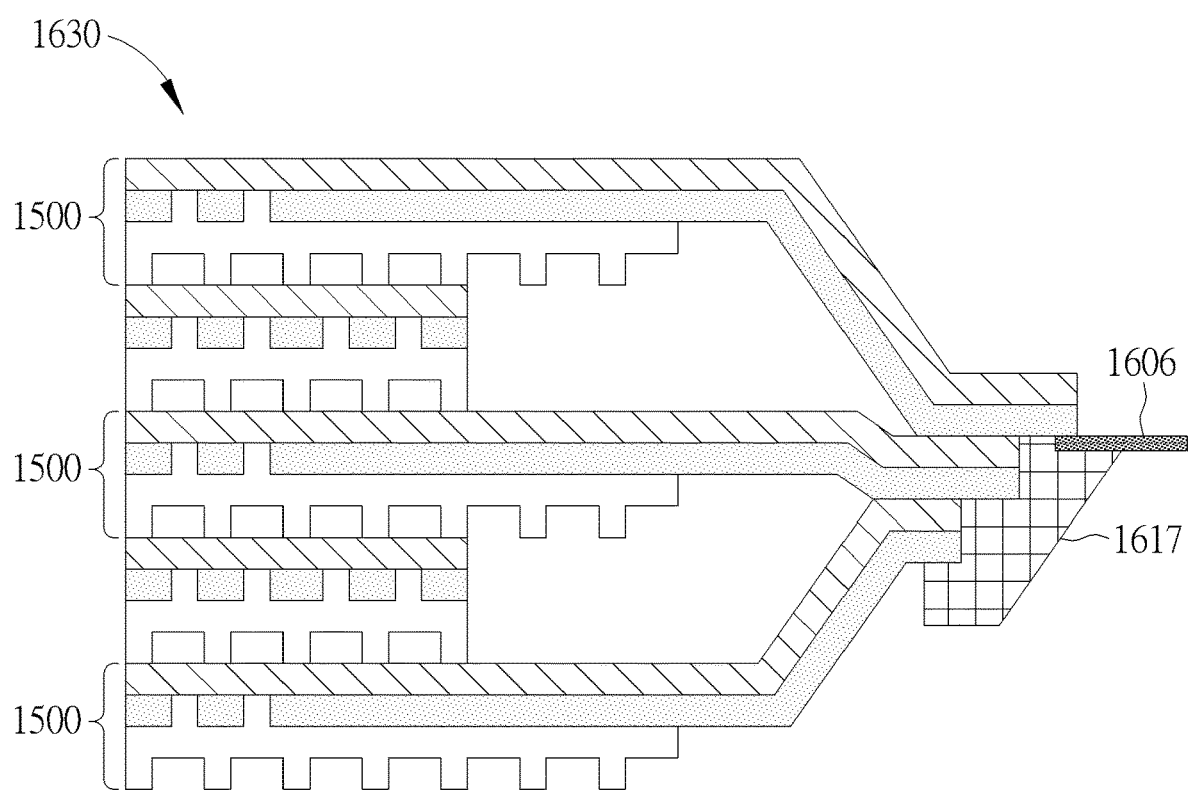
FIG. 16B is a diagram of a stacked structure according to a second embodiment of the present invention.

A second embodiment of a stacked structure 1630 is therefore illustrated in FIG. 16B. As shown in the diagram, each alternate layer has a connecting 'arm' of a different respective length. These 'arms' are bent towards each other and electrically coupled together with conductive paste or adhesive at an electrical contact end 1617. The different lengths allow less conductive paste/adhesive to be used as compared to the embodiment shown in FIG. 16A. As the conductive paste/adhesive can be applied to the underside of the connecting 'arms', as shown in the diagram, the conductive paste/adhesive can be applied after the stacked structure is formed. This method requires that each coupled FAE layer stem or arm be manufactured with a different length.

Figure 16C:
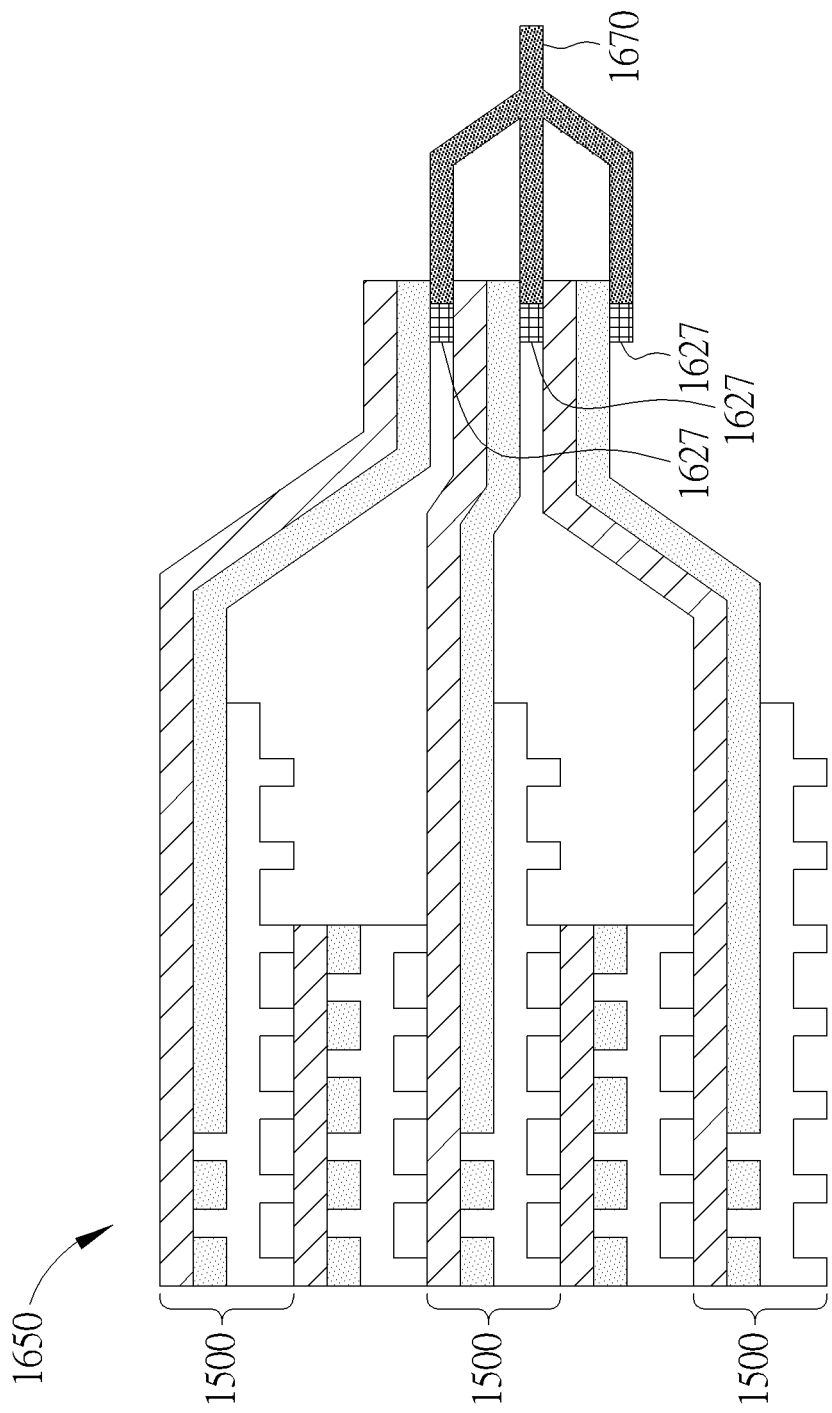
FIG. 16C is a diagram of a stacked structure according to a third embodiment of the present invention.

A third embodiment of a stacked structure 1650 illustrated in FIG. 16C shows coupled FAE layers all of a same length, wherein the 'arms' of each coupled FAE layer are coupled together and each coupled layer also comprises an individual flat conductive element 1670, all of which are coupled together to form the electrical connection between layers. Each individual conductive element is electrically coupled to a respective layer using a small amount of conductive paste or adhesive at an electrical contact end 1627, as illustrated in the diagram. Compared to the embodiment shown in FIG. 16A, only a small amount of conductive paste/adhesive is required, and this conductive paste/adhesive and the coupling of the flat conductive element 1670 to each individual layer can be applied before forming the stack. Complexity of production of the individual layers increases slightly, however, in comparison to the structure shown in FIG. 16A.

Figure 17A:
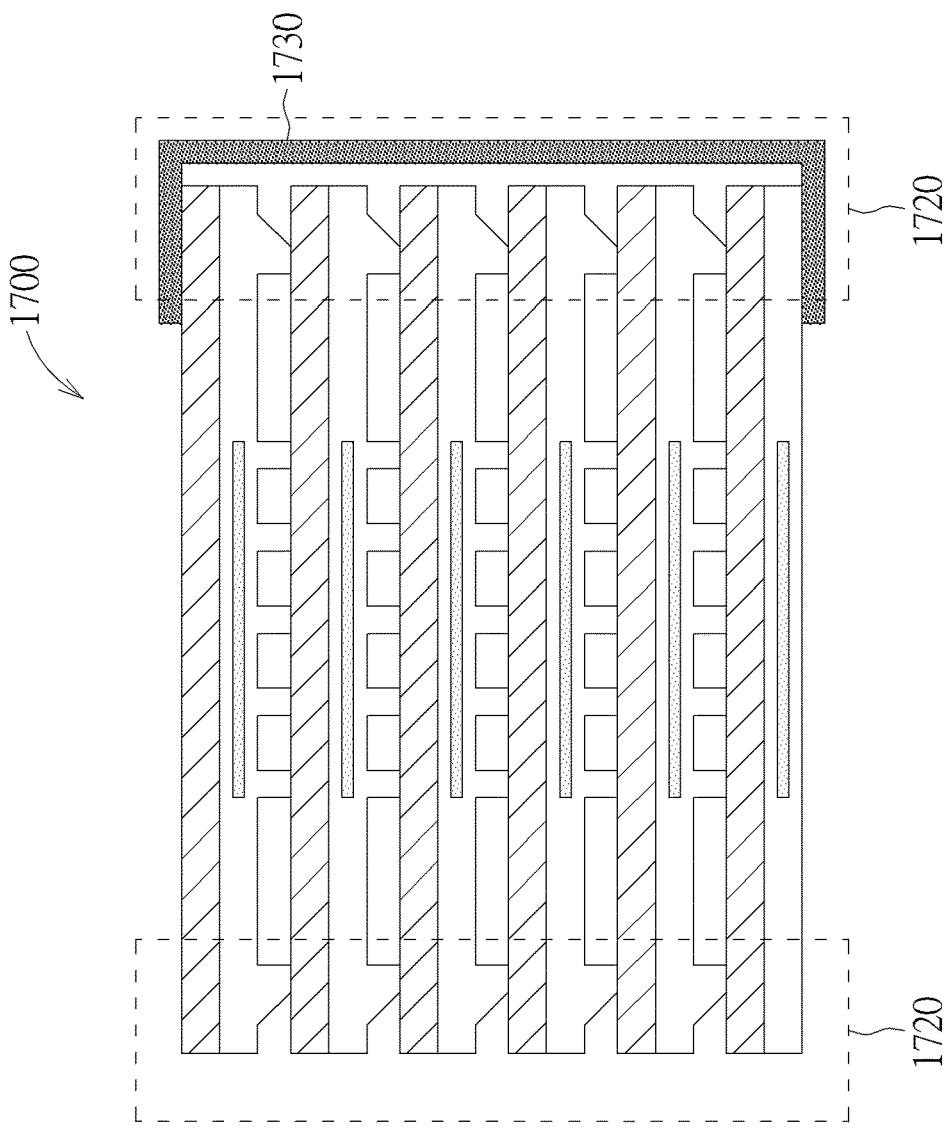
FIG. 17A is a diagram of a stacked structure with a book binding edge according to a first embodiment of the invention.
Figure 17A:
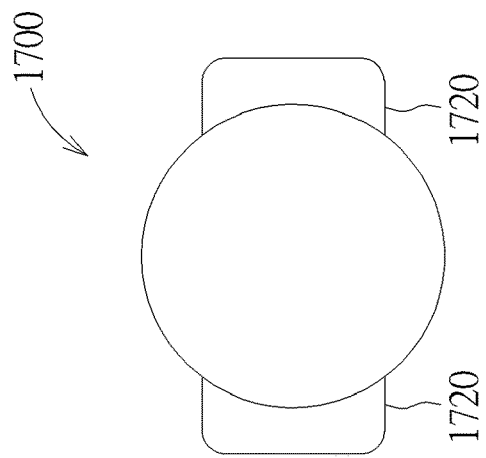

A further embodiment is proposed which simplifies the above stacking schemes while providing electrical connection between the layers. This embodiment uses a solid binding edge which has some similarity to how paperback books are bound and therefore can also be called a book binding edge, wherein an edge is formed on one or two sides of the electrode of an FAE layer and used for bonding with another FAE layer. Refer to FIG. 17A, which is a diagram of a stacked structure 1700 with a book binding edge 1720 according to a first embodiment. Similar to the elastic nodule structure between the layers, the book binding edge 1720 also has a nodule structure. By applying adhesive to the nodules and pressing the layers together, the adhesive can penetrate and form connection between the layers. As shown in the diagram, the book binding edge 1720 can be formed at both ends for increased stability. In addition, one or both of the book binding edges may further comprise a flipped film 1730 which is formed on the outside of the book binding edge for added stability.

Figure 17B:
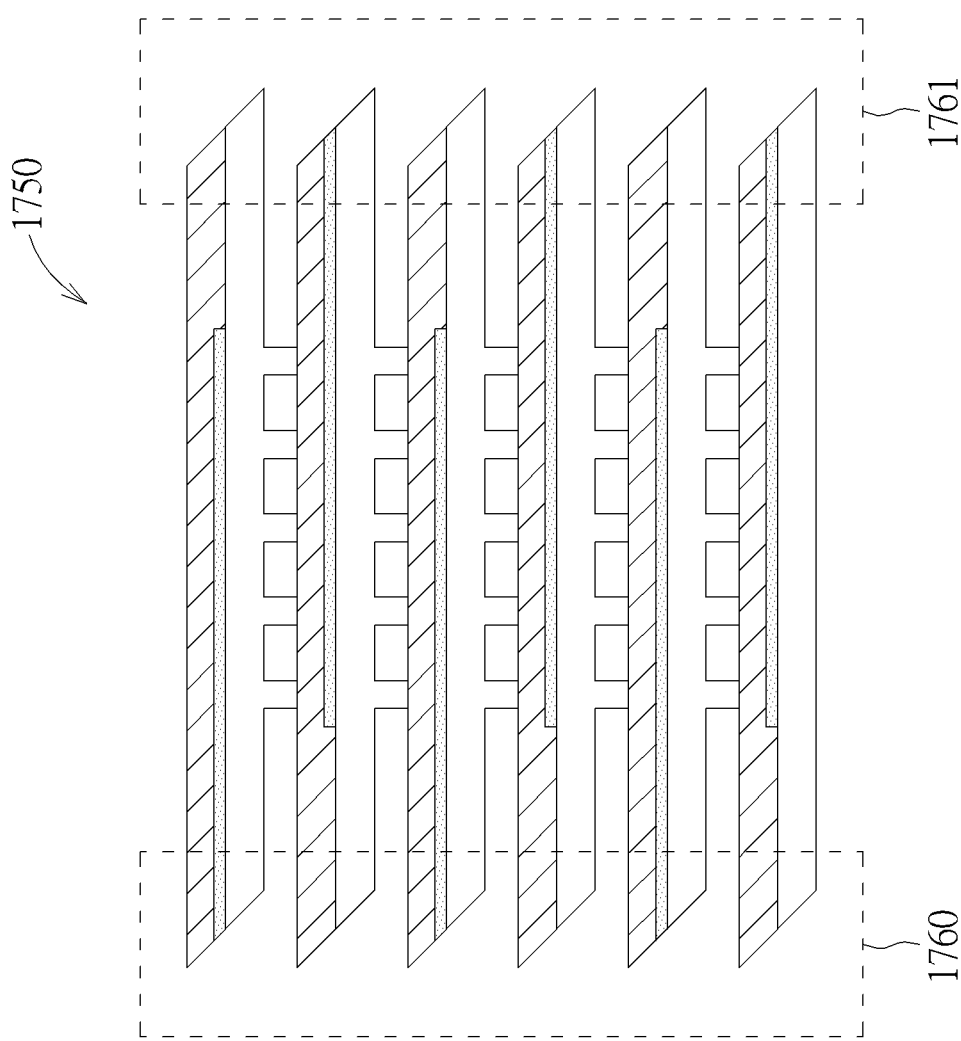
FIG. 17B is a diagram of a stacked structure with a book binding edge according to a second embodiment of the invention.
Figure 17B:
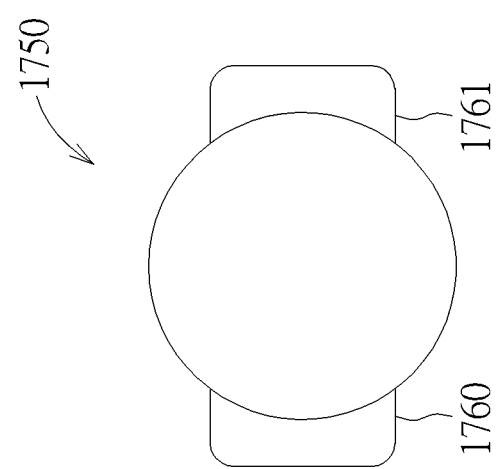

FIG. 17B is a diagram of a stacked structure 1750 with a book binding edge 1760/1761 according to a second embodiment. In this embodiment, electrical connection between the layers is achieved via the book binding edge. In this structure, the electrodes are alternately divided, such that electrodes of one polarity are coupled together at one side of the stacked structure and electrodes of the other polarity are coupled together at the other side of the stacked structure. For example, the first, third and fifth layers are coupled together at the left edge 1760 and the second, fourth and sixth layers are coupled together at the right edge 1761. Further, the electrode layers at each respective side have an exposed edge. The adhesive used to form the book binding edges at each side of the stacked structure is a conductive adhesive, such that it forms an electrical connection with the exposed electrode layers. This can further provide a single point of contact for an electrical contact such as a wire. As shown in the diagram, the electrodes at each side have a diagonal structure which exposes more of the edge, enabling a better electrical connection.

Figure 18A:
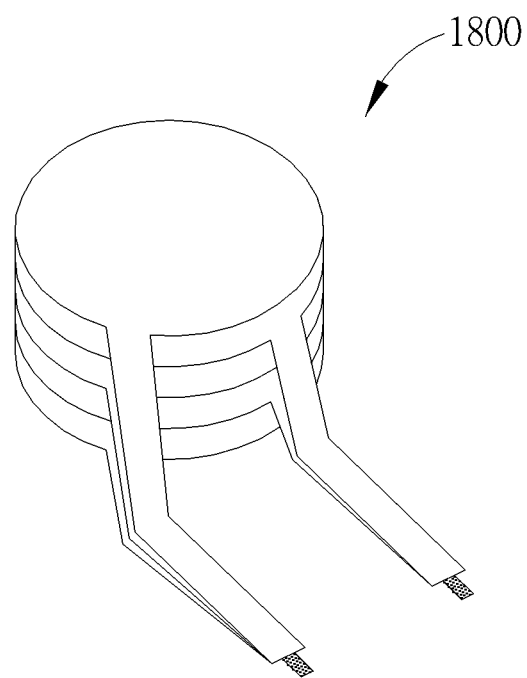
FIG. 18A is a diagram of a stacked structure.
Figure 18B:
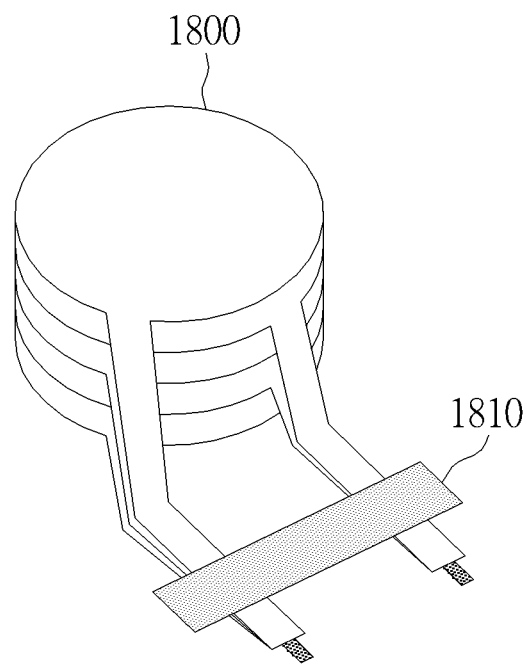
FIG. 18B is a diagram of the stacked structure illustrated in FIG. 18A with reduced lateral displacement according to a first exemplary embodiment of the present invention.

In all stacked structures, there can be a problem with too much lateral displacement occurring between the layers. In practice, it is difficult to achieve a structure that is robust but does not prevent the intended vertical movement between layers, particularly when the number of layers becomes high. The invention therefore provides a number of embodiments which provide bonding methods for stacked structures that can prevent or limit lateral displacement between the FAE layers. Refer to FIG. 18A, which is a diagram of a stacked structure 1800 comprising various FAE layers similar to that illustrated in FIG. 15A, FIG. 15B and FIG. 15C. As shown in FIG. 18A, alternate FAE layers correspond to different polarities, such that the stacked structure comprises two sets of 'arms' extending from the main stack. By fixing the arms using an adhesive method such as glue, adhesive tape or cement, or an external holding structure, the lateral displacement between the layers can be prevented. This is shown in FIG. 18B, wherein a strip of adhesive tape 1810 covers the two sets of arms of the stacked structure.

Figure 18C:
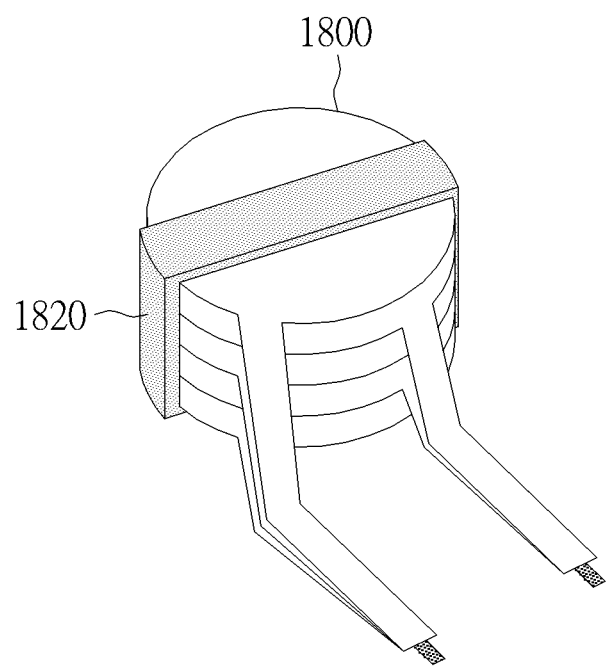
FIG. 18C is a diagram of the stacked structure illustrated in FIG. 18A with reduced lateral displacement according to a second exemplary embodiment of the present invention.
Figure 18D:
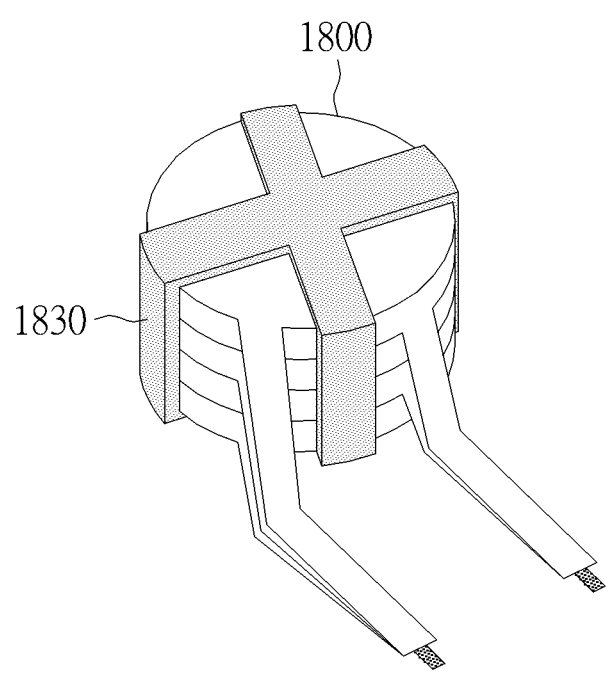
FIG. 18D is a diagram of the stacked structure illustrated in FIG. 18A with reduced lateral displacement according to a third exemplary embodiment of the present invention.
Figure 18E:
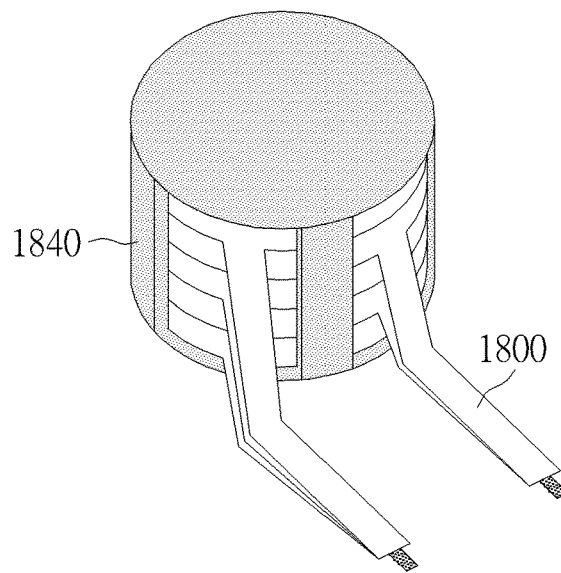
FIG. 18E is a diagram of the stacked structure illustrated in FIG. 18A with reduced lateral displacement according to a fourth exemplary embodiment of the present invention.

Rather than joining the stacked structure at the arms, the stacked structure can be joined at the main body using flexible strips which will deform (bend) when the actuator is in a compressed state. These flexible strips can be of various shapes as shown in the embodiments illustrated in FIG. 18C, FIG. 18D and FIG. 18E, illustrating flexible strips 1820, 1830 and 1840, respectively. In a modification (not shown), both the arms and the main body of the stacked structure can use flexible strips to prevent lateral displacement. In the embodiments shown in FIG. 18C, FIG. 18D and FIG. 18E, separation between layers in the vertical direction can also be prevented.

Figure 18F:
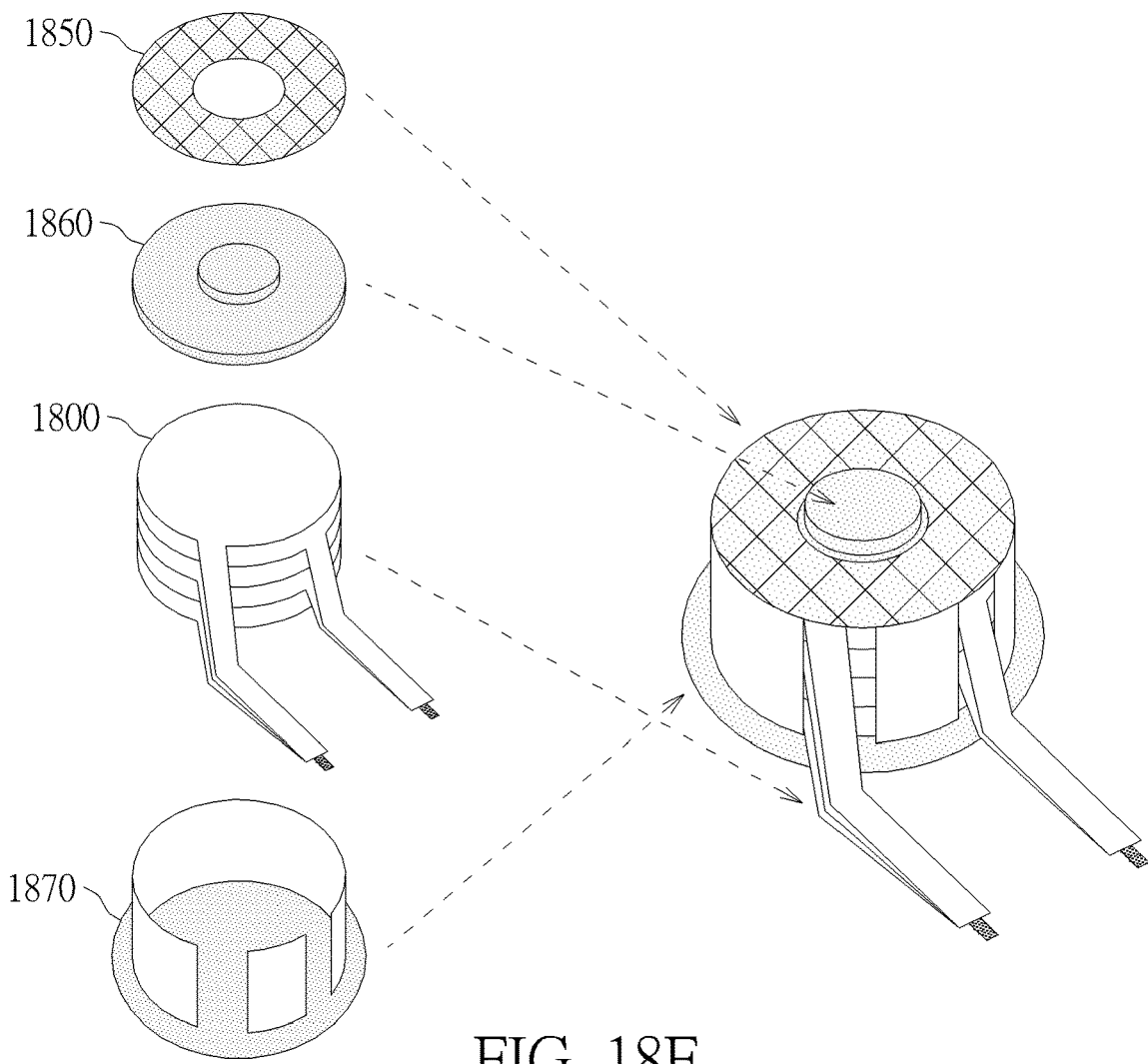
FIG. 18F is a diagram of the stacked structure illustrated in FIG. 18A with reduced lateral displacement according to a fifth exemplary embodiment of the present invention.

In yet another modification of the above structure, the entire stacked structure can be enclosed in a solid casing 1870 comprising walls that may be fully rigid or somewhat flexible, as shown in FIG. 18F. As illustrated in the diagram, the solid casing further (optionally) includes a lid 1850 which has a hollow centre that can allow access to the top of the stacked structure. The lid can optionally be attached to the solid casing to further prevent vertical displacement of the layers. In addition, a mounting structure 1860 can be applied to the stacked structure to prevent loss of functionality if the stacked structure at full compression cannot protrude through the hollow centre of the lid 1850. Please note that this solid casing can be implemented separately or in combination with the embodiments shown in FIG. 18B, FIG. 18C, FIG. 18D and FIG. 18E.

Figure 19A:
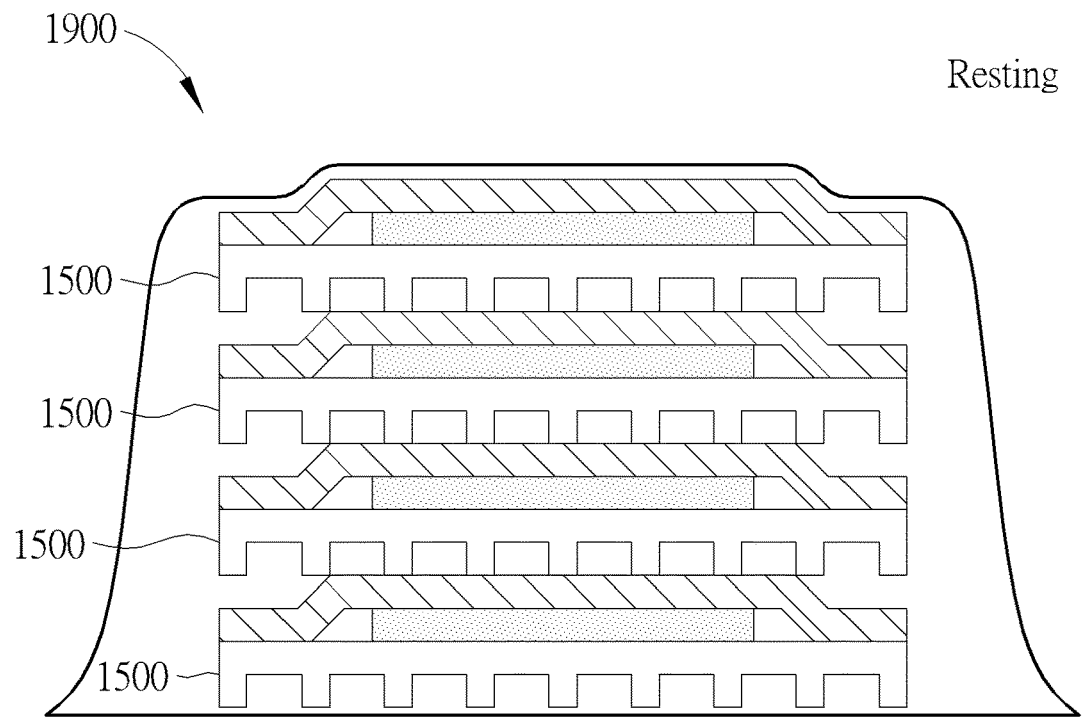
FIG. 19A is a diagram of a stacked structure according to a first exemplary embodiment.
Figure 19B:
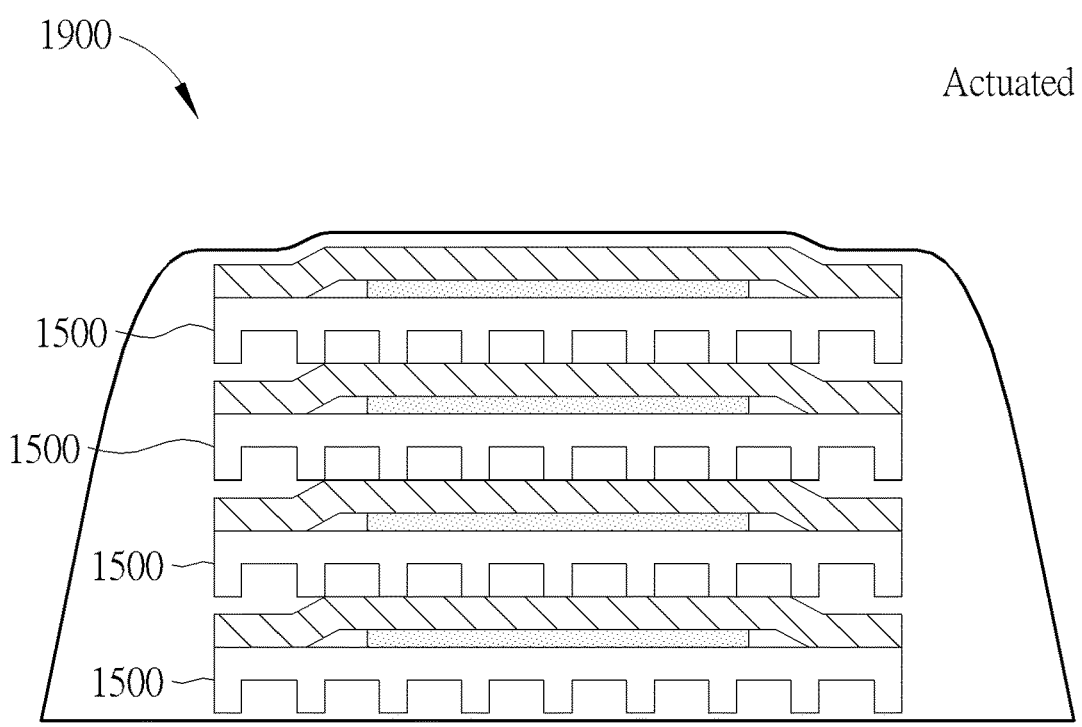
FIG. 19B is a diagram of a stacked structure according to a second exemplary embodiment.

In a final embodiment, which can also be implemented in combination with the embodiments shown in FIG. 18B, FIG. 18C, FIG. 18D and FIG. 18E, the entire stacked structure can be disposed in a flexible hermetically sealed or semi-sealed pouch 1900 as illustrated in FIG. 19A and FIG. 19B. The flexibility of the pouch allows the compression of the actuator/sensor, while the hermetic sealing prevents accumulation of dust within the stacked structure, and further controls humidity.

Semi-sealed refers to a structure that is essentially sealed but wherein the internal compartment may in some situations (such as notable pressure differences) slowly move towards ambient pressure. The pouch may protect the stack from external contamination or humidity accumulation. The shape of the pouch can be designed so that it is in close contact with the external surface of the stack when in a resting state, and that it deforms minimally to accommodate the air displaced when the stack is compressed or when variations in temperature or pressure induce expansion of the inner air. Importantly, the semi-sealed structure does not notably hinder the compression or expansion of the stack.

As the driving signal is known, and the change in capacitance and the current drawn by the actuator can be monitored, it is possible to estimate the overall compression of the actuator. Furthermore, capacitance of the system can be monitored without a driving signal that would notably compress the system. In this case, changes in the system capacitance indicate compression of the system by external forces. Capacitance changes can also be monitored via various other signal proxies such as voltage changes, current draw changes or changes in oscillator frequencies in the system. These techniques are examples of methods enabling the sensor application of the stacked structures.

The system may also be divided into subsystems, with each subsystem having its own monitoring circuitry. This allows for more localized monitoring of the physical changes in the system. The configuration of the electrode layers makes the capacitance of the stack very sensitive to small stack compressions. Therefore, functionality for compression sensing can be achieved by the constant monitoring of the capacitance of the stack.

FIG. 19A presents a profile view of a stack contained in a flexible hermetically sealed pouch 1900. FIG. 19B illustrates the deformation of the pouch 1900 under compression whereby a same volume leads to a different pouch external shape to accommodate approximately the same fluid/air volume. The pouch 1900 can also accommodate changes in external air pressure due to its structure, providing minimal hindrance to the compression decompression cycles of the actuator or sensor.

Figure 19C:
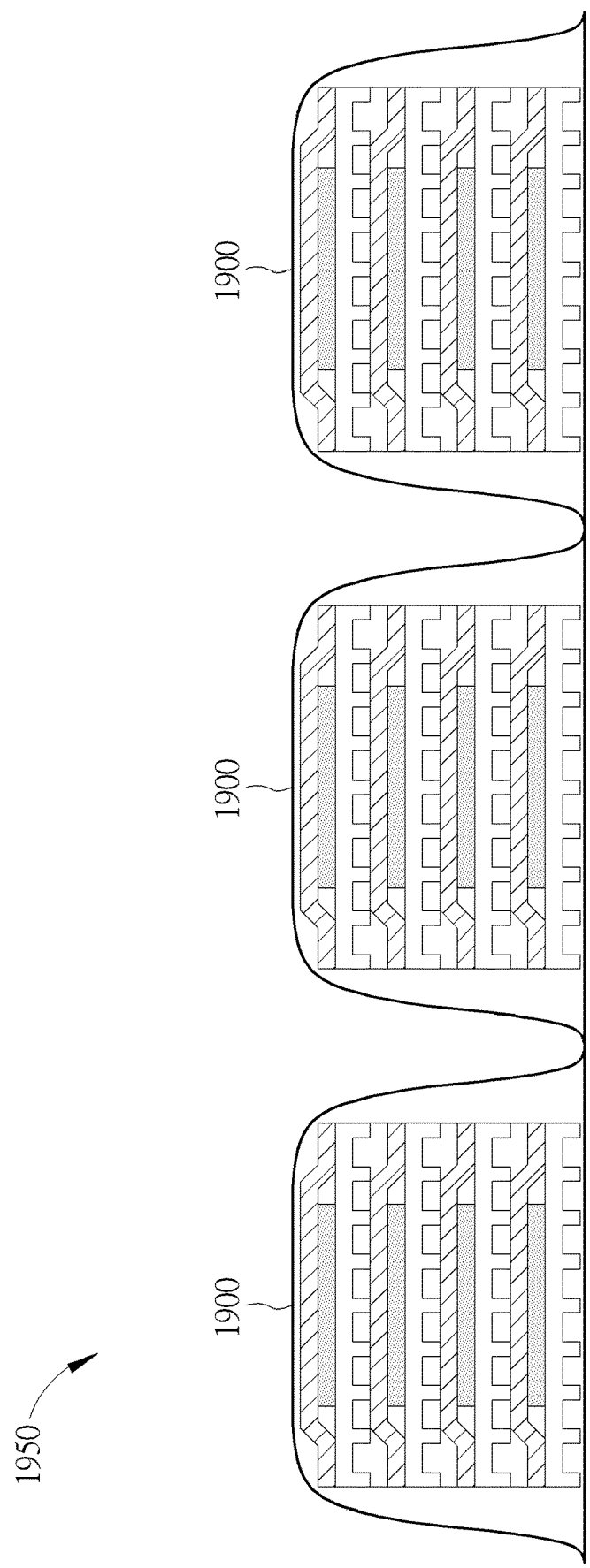
FIG. 19C is a diagram of an array of stacked structures as illustrated in FIG. 19A according to an embodiment.
Figure 19D:
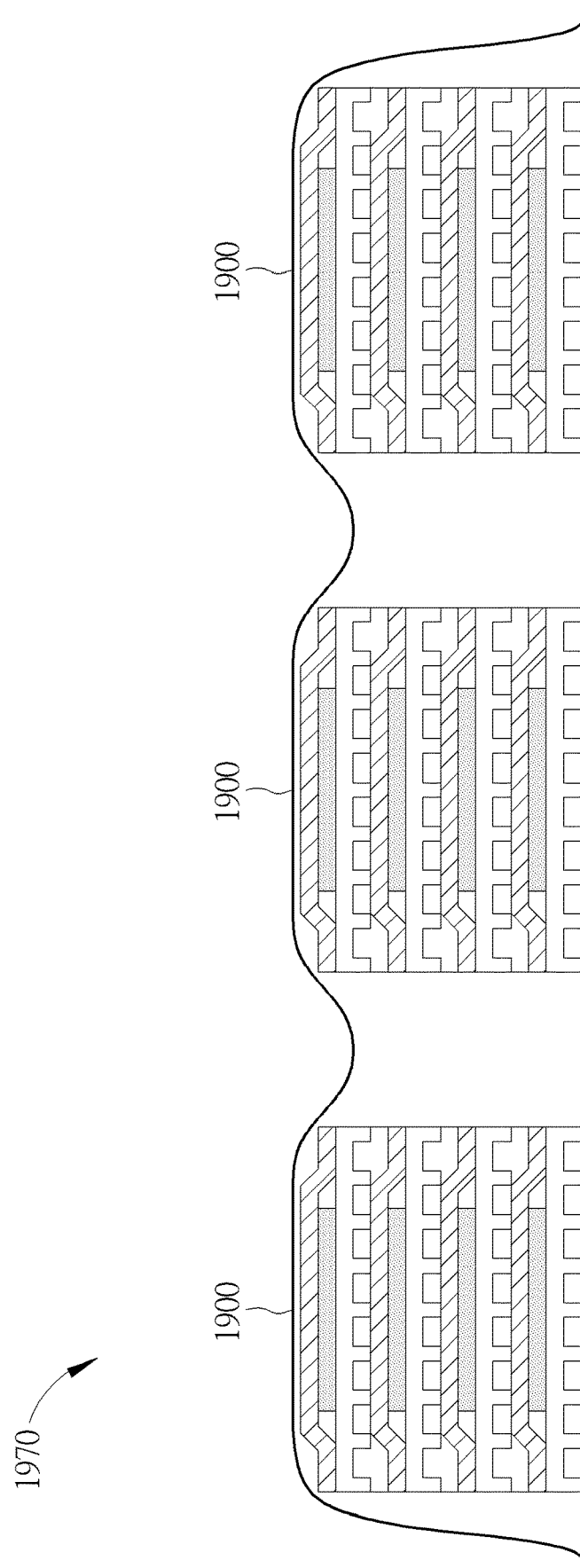
FIG. 19D is a diagram of an array of stacked structures as illustrated in FIG. 19A according to another embodiment.

FIGS. 19C and 19D represent two examples for the use of flexible hermetically sealed pouches in arrays of stacked actuators. FIG. 19C illustrates an array 1950, wherein parts of the pouch reach the base supporting surface between the different stacked actuators. In an embodiment, they may be adhered to the base supporting surface in order to provide increased robustness and to prevent possible local damage in some part of the pouch that could affect the whole array of actuators. In this form, the deformation of the pouch upon compression occurs laterally. FIG. 19D illustrates an example of a pouched array 1970, which can be easier to manufacture and where the deformation of the pouch occurs vertically in the regions between the stacks.

The invention provides a number of stacked structures which have good isolation between the layers. Holding structures such as binding edges or strip layers can increase the robustness by preventing lateral displacement of the layers in the stacked structure with respect to each other wherein the vertical movement of their active regions is not hindered.

The pouch structure may also be implemented as a one-sided elastic film, or pre-shaped flexible film which facilitates the form of the stack, and which adheres to a substrate. For example, a pouch structure can be formed with an elastic substrate with a pressure sensitive adhesive that is larger in area than the sensor/actuator, and which is attached to a substrate or host system encircling the sensor/actuator. This method enables simultaneous placement of a sensor or actuator on a suitable medium such as to a printed circuit board, while also providing the sealing.

Further, the electrical connection of the sensor/actuator may be accomplished using a conductive adhesive or anisotropic conductive adhesive or film at suitable contact points of the printed circuit board or substrate (1915 in FIG. 19E, FIG. 19F, FIG. 19G and FIG. 19H), which simplifies the application or assembly process. For example, in this method the sensor is secured in its place and may also be electrically connected to the system at hand simultaneously.

Figure 19E:
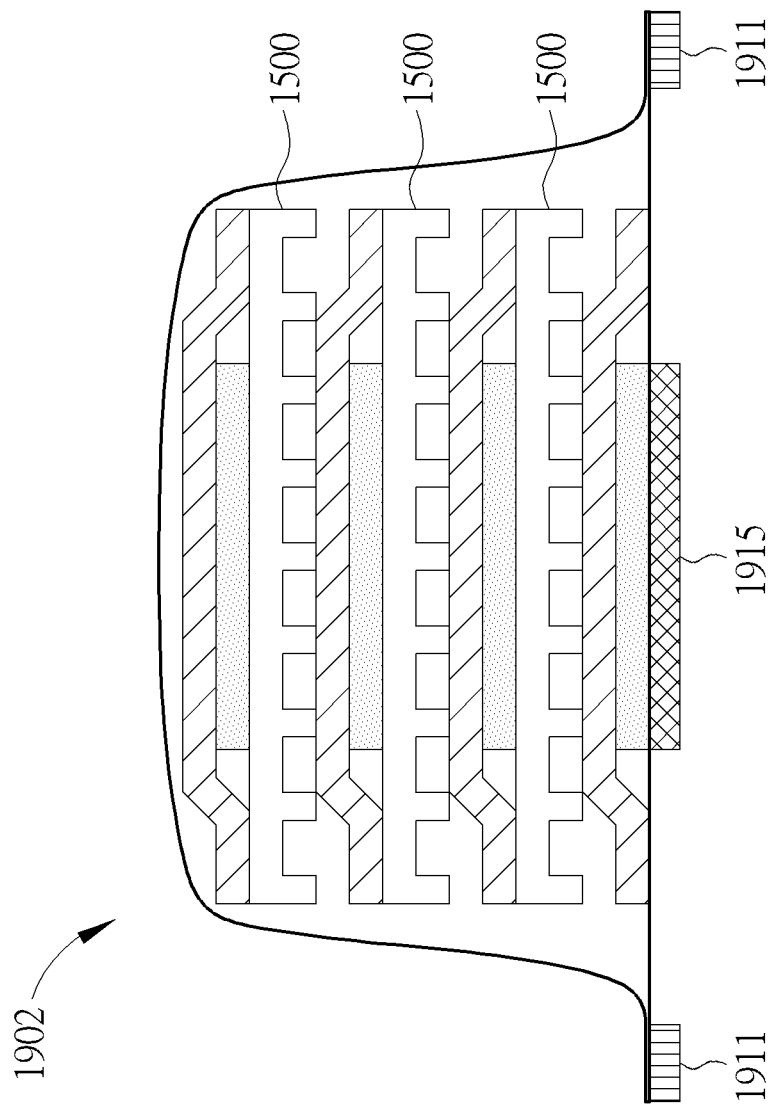
FIG. 19E is a diagram of a stacked structure according to a third exemplary embodiment.
Figure 19F:
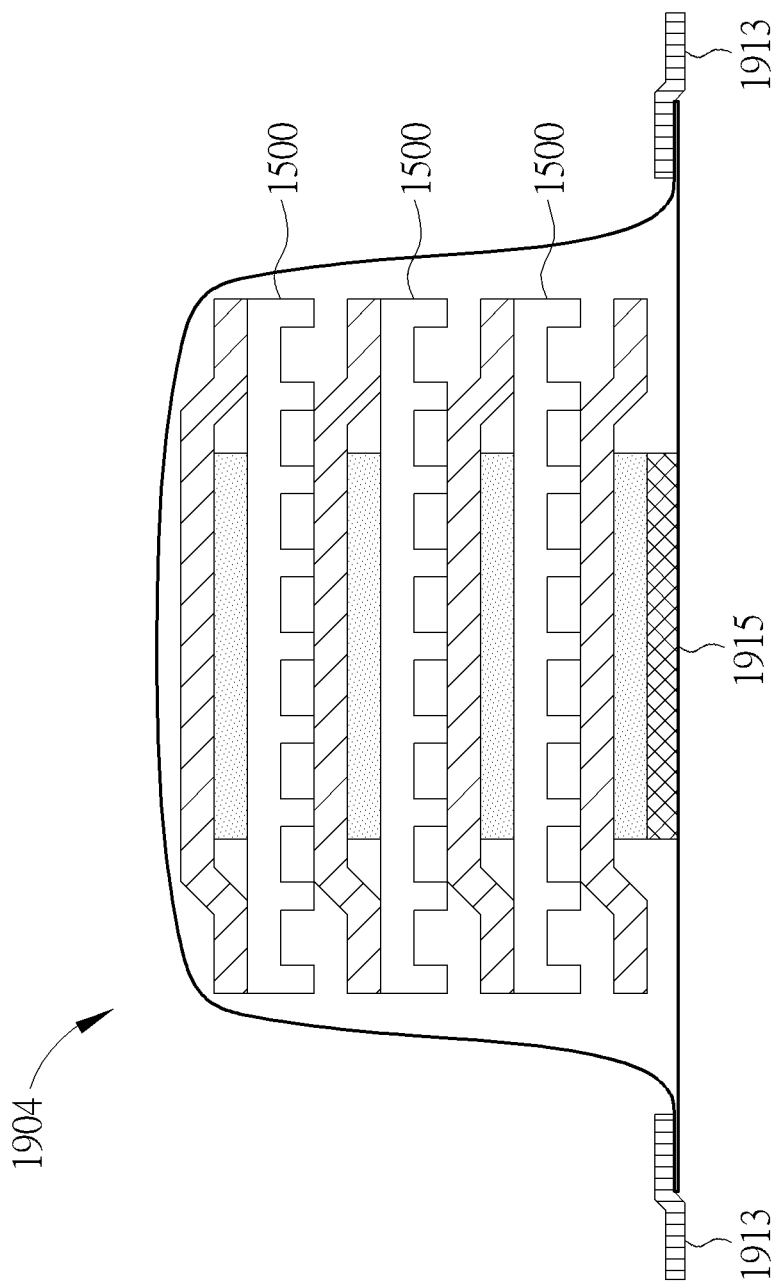
FIG. 19F is a diagram of a stacked structure according to a fourth exemplary embodiment.

Examples for the implementations above are illustrated in FIG. 19E and FIG. 19F. In FIG. 19E, the elastic pouch 1902 is attached to the surface of the hosting board or device (not shown) by placing its contour border on top of a closed band of a pressure sensitive adhesive 1911 that is adhered to the surface of the hosting board or device.

In some cases, such as when using pouch materials with a low surface energy (for example, cured silicone), the adhesion between the pouch and the closed band of pressure sensitive adhesive may be insufficient for providing enough attachment force to sensors or actuators with the pouch structure 1902 as illustrated in FIG. 19E. This risk may be minimized by attaching the sensor using an alternative structure 1904, where the closed band of pressure sensitive adhesive 1913 is placed on top of the contour border of the pouch and extends slightly beyond this border, as illustrated in FIG. 19F. A drawback of this alternative structure is that it occupies slightly more area at the surface of the hosting board or device. These figures show a simple adhesion method while the actual electrical connections may be accomplished via, for example, multiple contact points and pads from a sensor or actuator to the host system or printed circuit board.

Figure 19G:
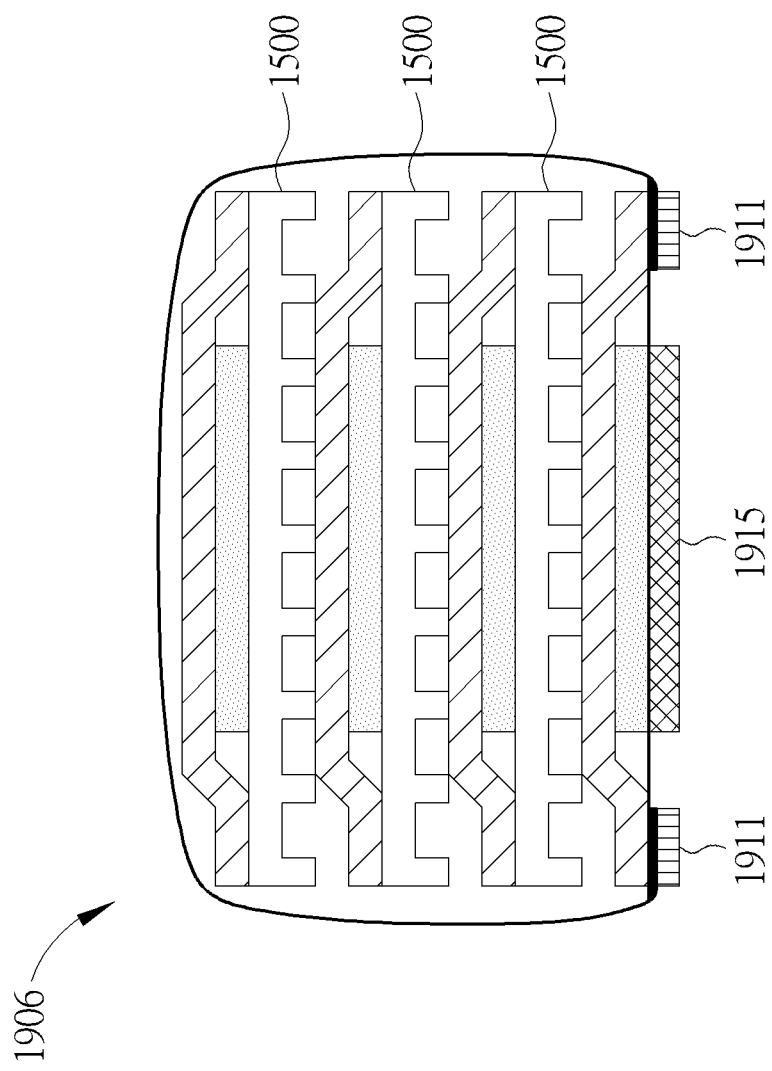
FIG. 19G is a diagram of a stacked structure according to a fifth exemplary embodiment.
Figure 19H:
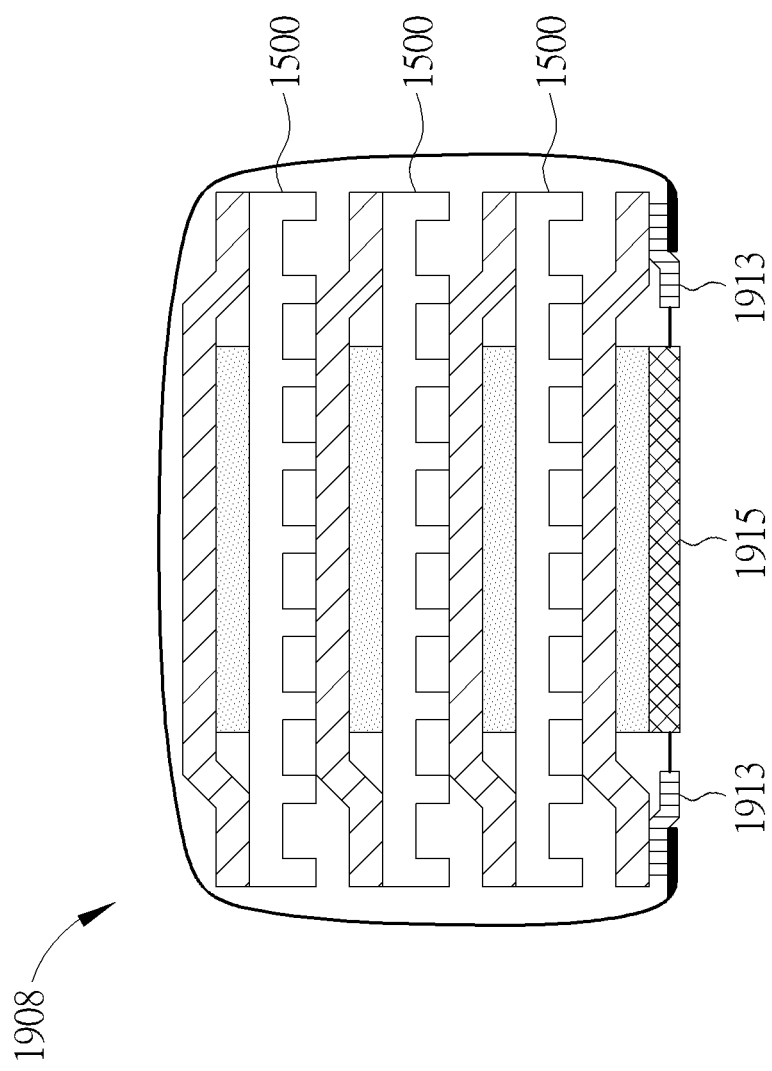
FIG. 19H is a diagram of a stacked structure according to a sixth exemplary embodiment.

The pouch or sealing structure may also be formed in various other ways to achieve the objective of facilitating simple adherence to a desired surface. For example, the pouch may have edges tucked along sensor lines, and encircles the stacked structure from all sides except from the "bottom" adherence area 1915, as illustrated in FIG. 19G and FIG. 19H. In this configuration, the area required by the sensor and the adherence area are essentially the same. In FIG. 19G, the elastic pouch 1906 is attached to the surface of the hosting board or device (not shown) by placing the back (outer) side of its contour border on top of a closed band of pressure sensitive adhesive 1911 that is adhered to the surface of the hosting board or device.

As stated above, in some cases, such as when using pouch materials with low surface energy (for example, cured silicone), the adhesion between the pouch and the closed band of pressure sensitive adhesive may be insufficient for providing enough attachment force to sensors or actuators with the pouch structure as illustrated in FIG. 19G. This risk may be minimized by attaching the sensor using an alternative structure, where the closed band of pressure sensitive adhesive 1913 is placed on top of the inner side contour border of the pouch 1908 and makes physical contact at the same time with the surface of the hosting board or device (not shown), as illustrated in FIG. 19H.

One factor adding complexity and cost to manufacturing of the described sensor or actuators is that the sensor/actuator structure always comprises multiple stacked layers. All functional layers have some electrical connection and generally terminate in an electrical connector where all contact pads are in a single plane. An example of such a connector for sensors is a "zero insertion force" type connector. Normally, this requires electrically conducting through holes or other electrically connecting structures, which can be expensive and complicated to manufacture. An inventive method makes the sensor in such a manner that a single plain/sheet electrode pattern can be printed or etched. The single plain etching/coating can be cost effectively performed, for example by a roll-to-roll procedure. Further, elastic nodules can be imprinted on the same single sheet, for example from PDMS again using a roll-to-roll (web processing) manufacturing method.

A film pattern as shown in the drawings is used, providing a multilayer structure made by appropriate cuts and folds that do not prevent the compressive expansion cycles. In some embodiments, at least a total of four electrode layers are needed due to at least two electrode layers and two shield layers being required, and they can be used for actuation or sensing or both. At least some part of the structure is folded multiple times to achieve a stacked structure, wherein all the layers are electrically connected via the folded part but wherein the layer structure can be dismantled to a single layer print pattern comprising the electrodes and elastic nodules. This structure may also contain internal air reservoirs.

Figure 20A:
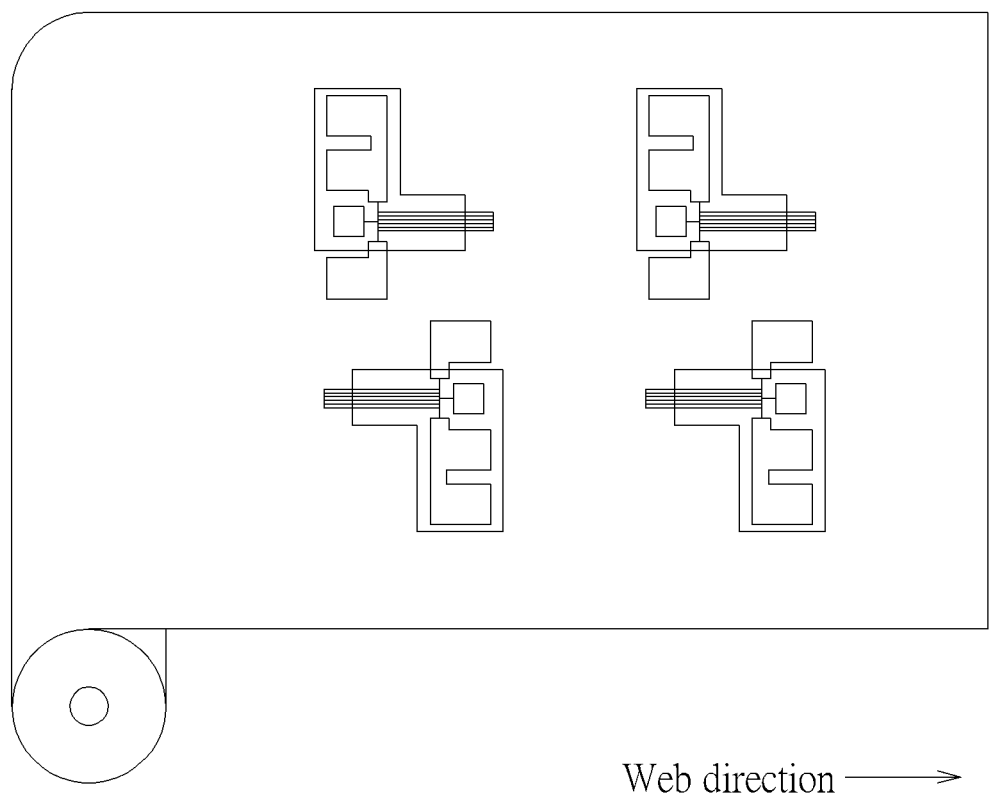
FIG. 20A is a diagram of a roll-to-roll manufacturing method of a sensor according to an embodiment of the present invention.
Figure 20B:
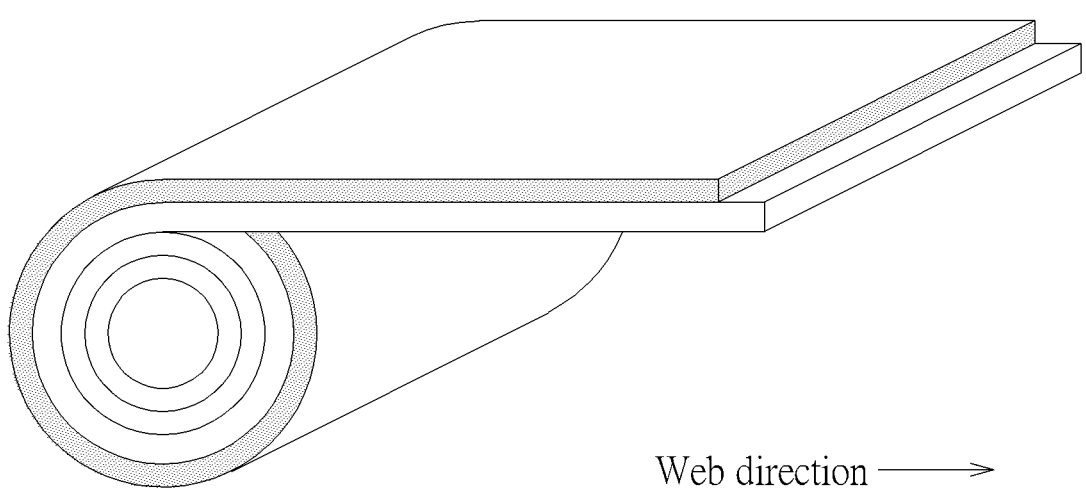
FIG. 20B is a diagram of the roll-to-roll manufacturing method of the sensor shown in FIG. 20A.

FIGS. 20A and 20B illustrate a flat multilayer structure formed using a roll-to-roll method. As is well-known in the art, roll-to-roll manufacturing takes a flexible rolled substrate and prints or etches various layers thereon by feeding the substrate from one roller to another along the web path. In this way, a number of initial flat multilayer structures can be formed on the substrate as shown in FIG. 20A. Further layers, such as an insulation layer, can be formed over these structures as shown in FIG. 20B. Then, these individual structures can be sequentially flipped (or folded or tucked), bent and compressed to form individual sensors or actuators. Holes or linear cuts or incisions, cut in the individual structures facilitate the bending of the sensor structure, and lines can be formed on the structure indicating areas which can be cut away to form the required shape. Further, adhesive layers are added to improve the robustness of the final sensor or actuator structure.

The resultant structure is a capacitive pressure sensor, actuator or both, comprising a sensing or actuating area formed of two conductive layers on either side of an elastic layer, wherein the elastic layer is formed of elastic nodules as detailed previously. When pressure is mechanically applied to the sensing area when used as a sensor, or electrically induced into the actuating area when used as an actuator, air therein will be displaced. The present invention provides various embodiments allowing for air displacement in different ways, either by providing air compartments within the sensor or actuator, or by including open sides which displace the air to the outside.

Figure 21A:
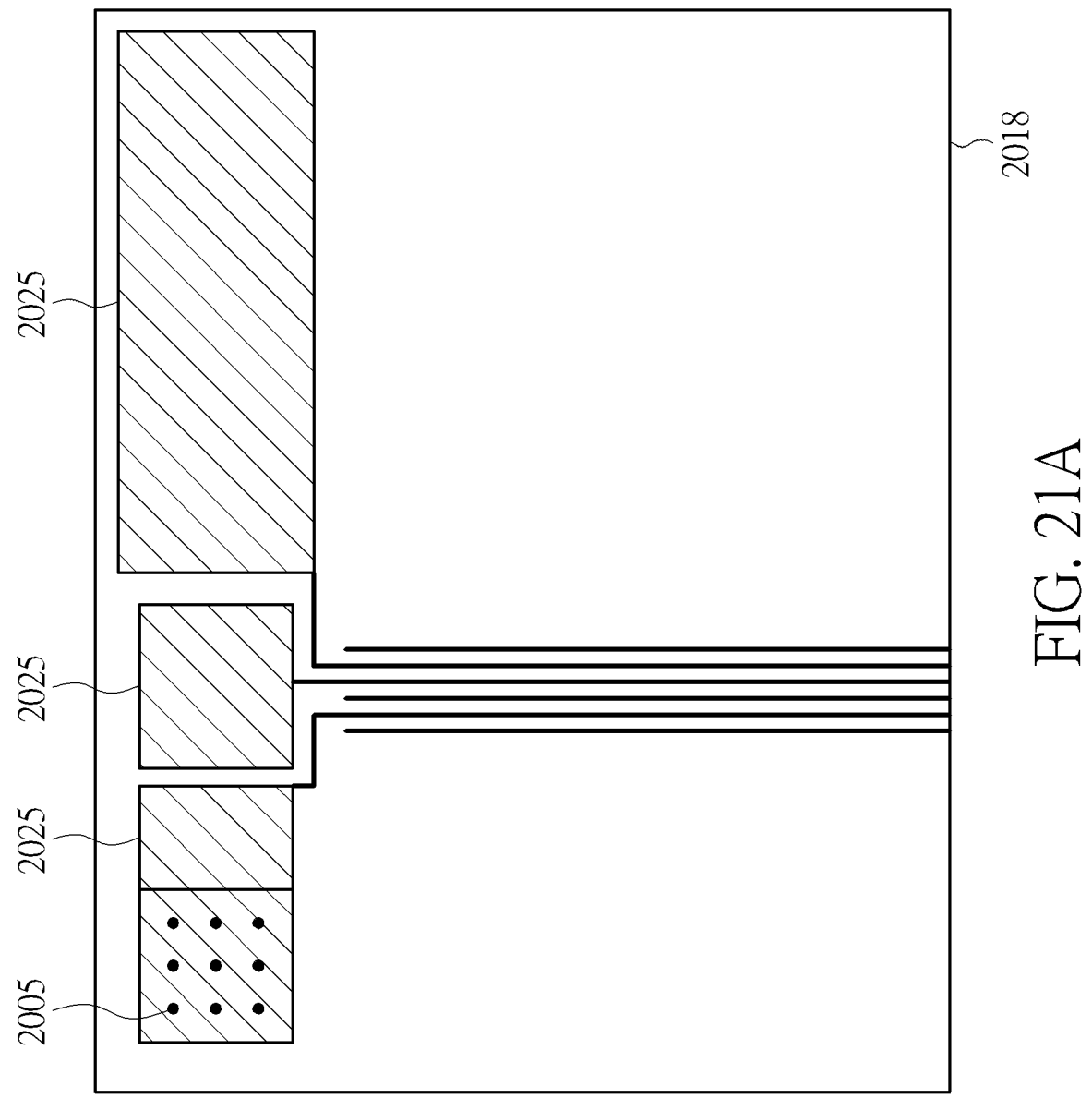
FIG. 21A is a diagram of a first manufacturing stage of a sensor according to an embodiment of the present invention.
Figure 21B:
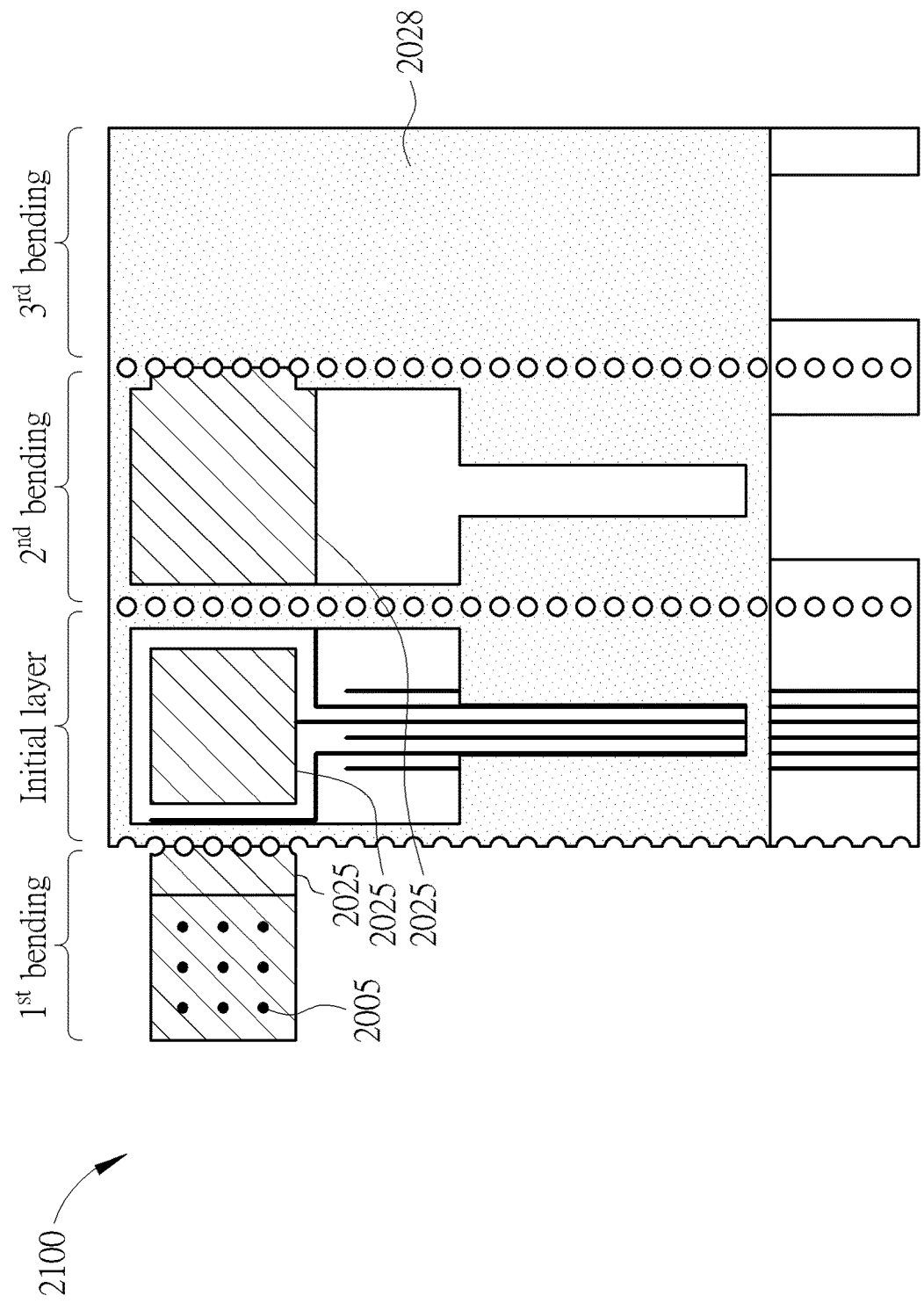
FIG. 21B is a diagram of a second manufacturing stage of the sensor shown in FIG. 21A.

FIGS. 21A-21C illustrate the stages of a first embodiment of a capacitive pressure sensor formed using the above-described roll-to-roll method. The cuts and folds made in the multilayer structure are for enabling folding of the multi-layer structure and do not prevent compressive expansion cycles. FIG. 21A illustrates a substrate 2018 having conductive areas 2025 formed thereon, wherein the patterns are formed corresponding to the desired sensor shape. The conductive area on the left-hand side of the substrate 2018 has elastic nodules 2005 formed thereon.

FIG. 21B illustrates an individual structure 2100 formed from the substrate shown in FIG. 21A with adhesive layers 2028 formed over various parts of the structure, and holes cut into the substrate 2018 to enable bending and to further distinguish a $1^{st}$ bending from an initial layer, a $2^{nd}$ bending and a $3^{rd}$ bending of the structure 2100. As illustrated in the diagram, the adhesive layer 2028 will cover some of the conductive lines and conductive areas. In addition, sections of the substrate 2018 have been cut away. As can be seen in FIG. 21B, certain sections of the substrate are not covered by the adhesive layers. A section at the bottom of the structure 2100 is left exposed to form a connecting area. Further, on the initial layer and the first bending, a section below the conductive areas is left exposed. This area will form an air compartment once the entire structure has been flipped and bent.

FIG. 21C illustrates the final flipped and bent sensor 2100, wherein sections at either side of the conductive lines have been removed to form the desired sensor shape. As shown in the diagram, a sensing area is formed in the elastic layer 2005, and an air reservoir compartment is formed below the sensing area. When the sensing area is compressed, displaced air can flow into the air reservoir compartment.

Figure 22A:
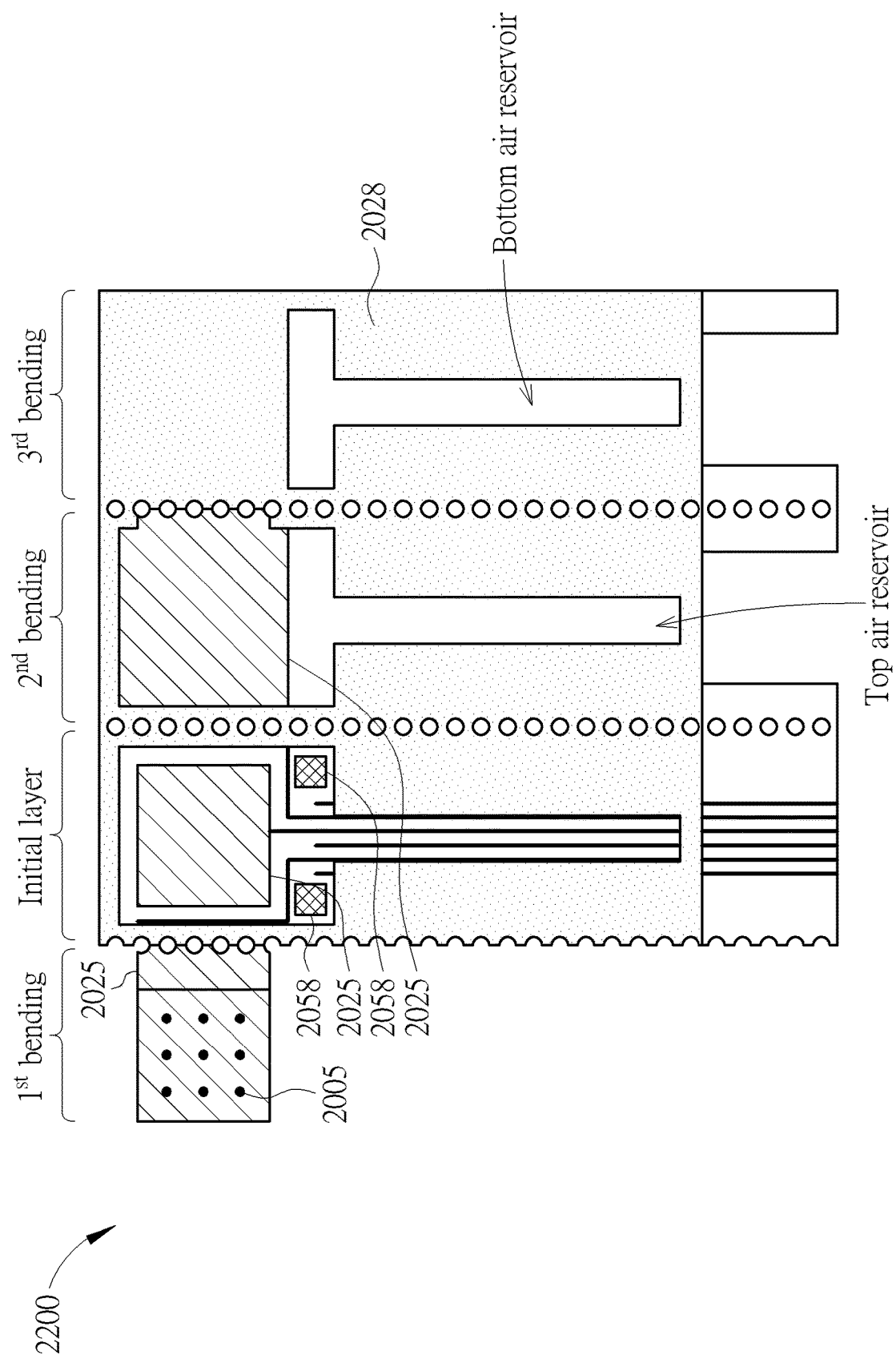
FIG. 22A is a diagram of a second manufacturing stage of a sensor according to another embodiment of the present invention.
Figure 22B:
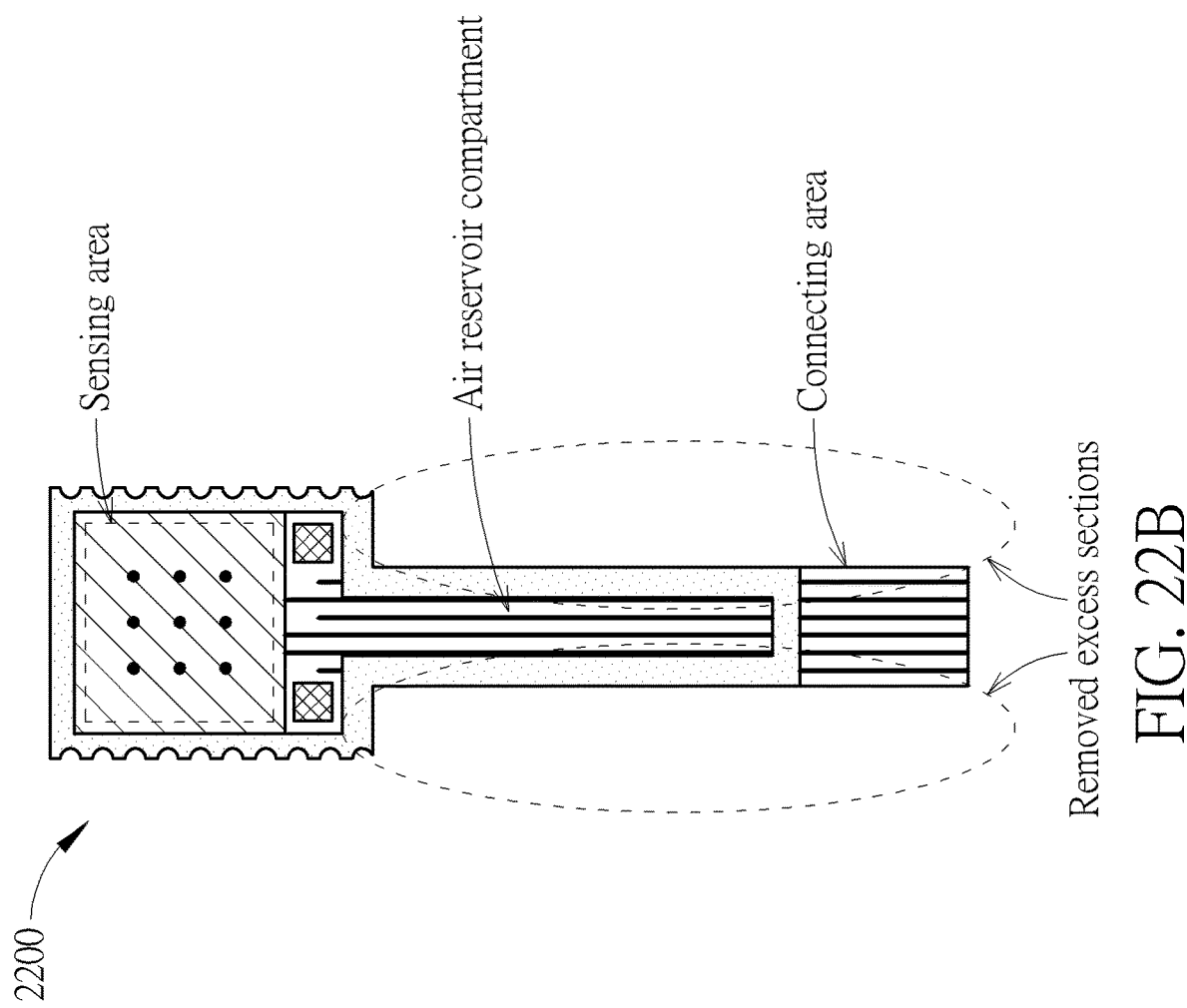
FIG. 22B is a final stage of the sensor shown in FIG. 22A.

A second embodiment of a sensor 2200 is illustrated in FIG. 22A and FIG. 22B, and includes air reservoirs in both the top and the bottom of the sensor. The sensor 2200 initially comprises the same conductive patterns 2025 as shown in FIG. 21A. Adhesive layers 2028 are then formed over some of the conductive patterns 2025 as shown in FIG. 22A, but leaving a connecting area at the bottom of the structure 2200 exposed. Additionally, an area of the substrate 2018 in the $2^{nd}$ bending is exposed to form a top air reservoir, and an area of the substrate 2018 in the $3^{rd}$ bending is exposed to form a bottom air reservoir. Finally, the initial layer includes two air holes 2058 which connect the top and bottom air reservoirs.

FIG. 22B illustrates the final flipped, bent and compressed sensor 2200. As in the previous embodiment, excess sections at the side of the sensor 2200 are removed. When the sensing area is compressed, air will move from the sensing area into both the top and bottom air reservoir compartments via the holes 2058.

Figure 22C:
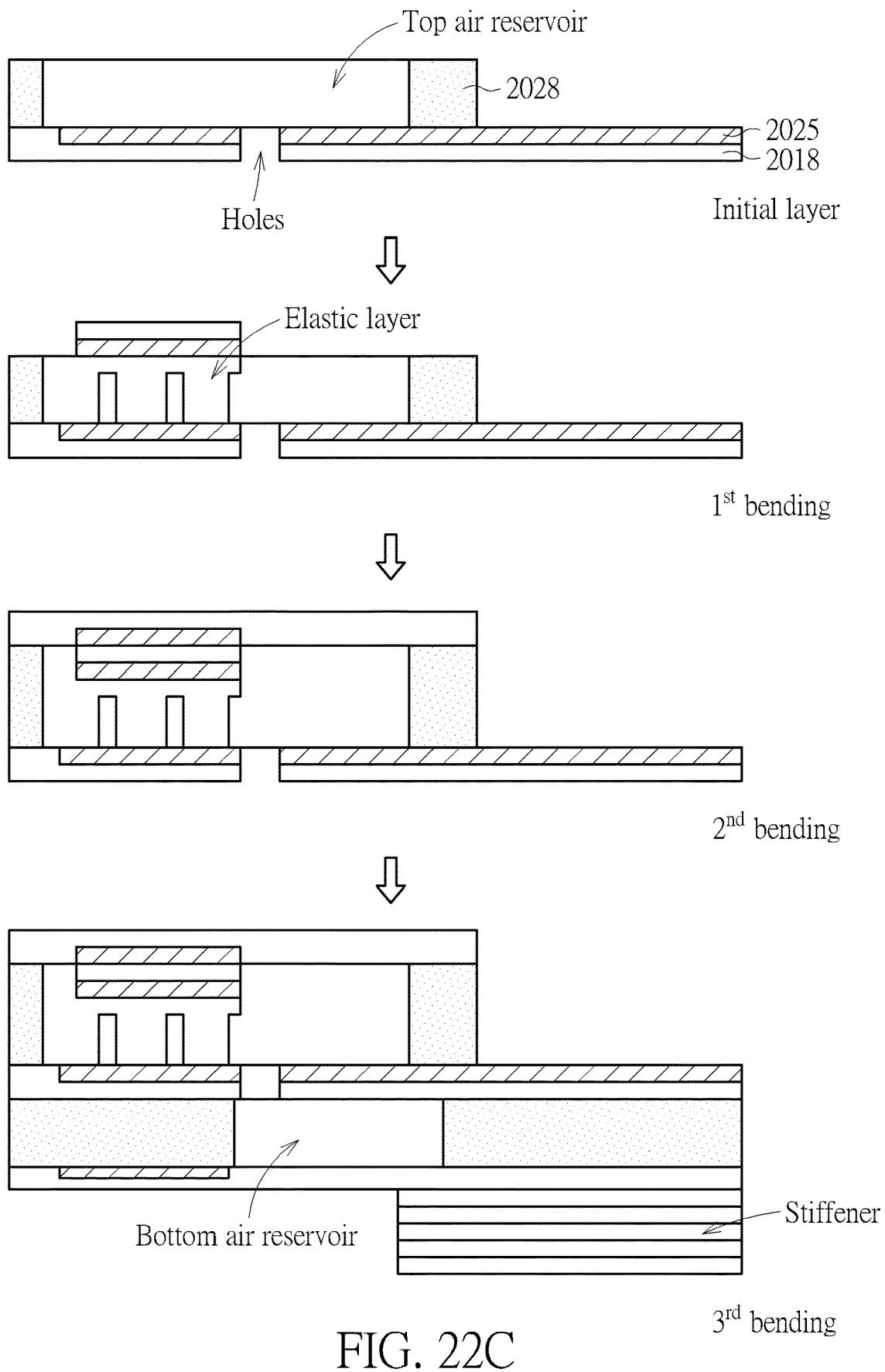
FIG. 22C is a side on view showing the manufacturing stages of the sensor shown in FIG. 22B.

FIG. 22C illustrates a side on view of each bending stage of the sensor 2200 shown in FIG. 22B. The initial layer comprises holes which are cut through the substrate 2018 and the conductive layer patterns 2025. A top air reservoir is formed in the adhesive layer. The $1^{st}$ bending folds the elastic layer onto the initial layer, such that the elastic nodules penetrate the gap in the adhesive layer. The $2^{nd}$ bending then folds onto the $1^{st}$ bending so that the adhesive layer on the $2^{nd}$ bending contacts the adhesive layer on the initial layer, and the top air reservoir is formed over the conductive lines on the initial layer. Finally, the $3^{rd}$ bending is folded onto the back of the initial layer, such that the holes allow air flow from the air reservoir in the initial layer, the air reservoir in the $2^{nd}$ bending and the air reservoir in the $3^{rd}$ bending. A stiffener can optionally be formed on the back of the $3^{rd}$ bending, to facilitate electrical connection to a specific connection port.

Figure 23A:
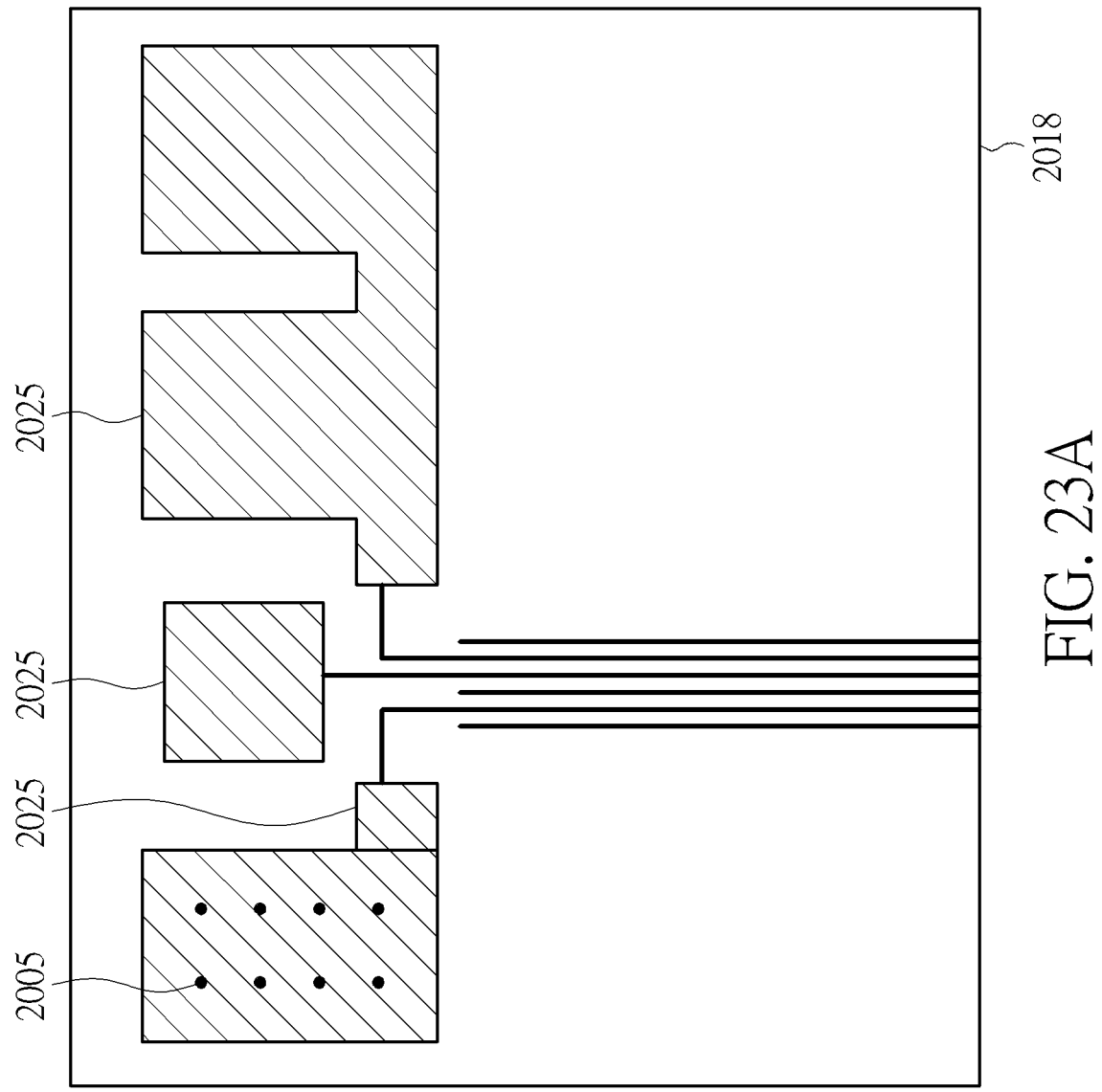
FIG. 23A is a diagram of a first manufacturing stage of a sensor according to an embodiment of the present invention.
Figure 23B:
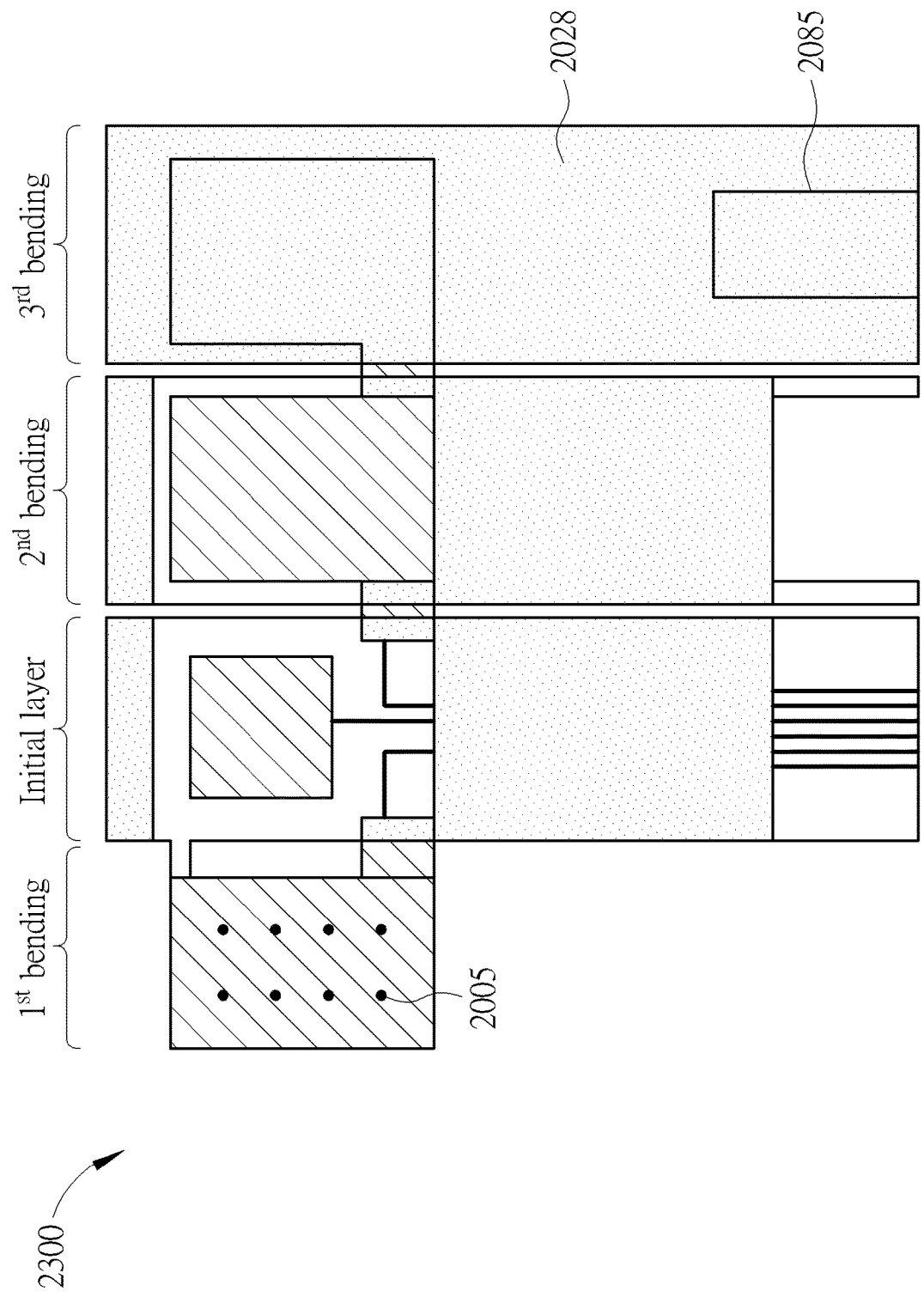
FIG. 23B is a diagram of a second manufacturing stage of the sensor shown in FIG. 23A.
Figure 23C:
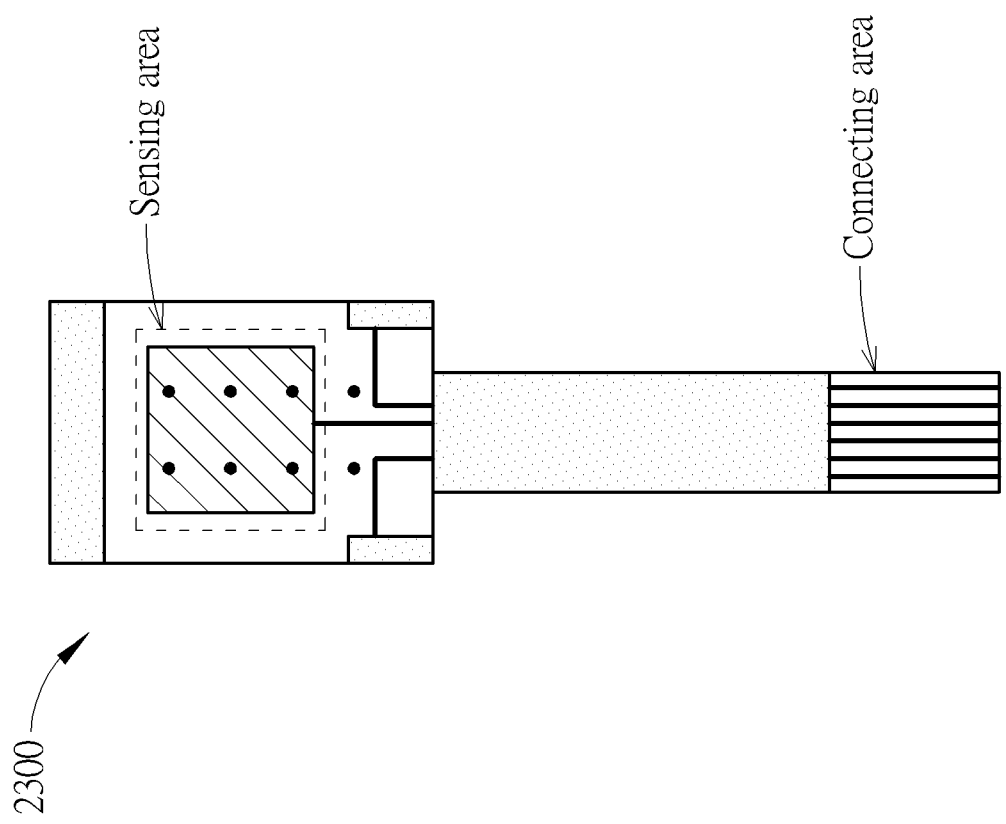
FIG. 23C is a final stage of the sensor shown in FIG. 23A.

In a final embodiment, rather than including air reservoirs within the sensor, the sides of the sensor are left open so that displaced air can directly flow out. As shown in FIG. 23A, the conducting area patterns 2025 formed on the substrate 2018 are slightly different from those in the previous two embodiments. As shown in FIG. 23B, there are open sections rather than cut holes formed between the $1^{st}$ bending, initial layer, $2^{nd}$ bending and $3^{rd}$ bending. Due to these open sides, the adhesive layer 2028 can cover more of the substrate 2018, as the structure 2300 does not require air reservoirs. A stiffener 2085 is formed on the back of the $3^{rd}$ bending, to facilitate electrical connection to specific connection ports. The final flipped, bent and compressed sensor 2300, including the sensing area and connecting area, is shown in FIG. 23C.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stacked structure composed of a plurality of layers, comprising:
    a substrate;
    a plurality of conductive patterns printed on the substrate;
    an adhesive layer printed or laminated on but not completely covering the conductive patterns and substrate; and
    at least one layer of elastic nodules formed between two layers of the plurality of layers, the layer of elastic nodules comprising a sensing area being used for at least one of actuation or sensing;
    wherein the stacked structure is formed by folding the substrate multiple times, each fold of the substrate folds the adhesive layer inward for forming the stacked structure by adhering each layer of the plurality of layers, and the stacked structure does not comprise electrically conducting through holes.

2. The stacked structure of claim 1, wherein a part of the substrate below, including at least two of the conductive patterns, is not covered by the adhesive layer, so that when the substrate is folded, the stacked structure comprises an air reservoir in at least one of the plurality of layers;
    wherein when the sensing area is compressed, displaced air is transmitted to the air reservoir.

3. The stacked structure of claim 2, wherein a part of the substrate below at least two of the conductive patterns is not covered by the adhesive layer, so that when the substrate is folded, the stacked structure comprises a first air reservoir in a top layer of the plurality of layers and a second air reservoir in a bottom layer of the plurality of layers, and the stacked structure further comprises:
    at least one hole in a middle layer of the plurality of layers for connecting the first air reservoir and the second air reservoir;
    wherein when the sensing area is compressed, displaced air is transmitted to the first air reservoir and the second air reservoir via the two holes.

4. The stacked structure of claim 1, wherein the adhesive layer is only formed on two sides of the sensing area, and the other two sides of the sensing area are at least partially open to the environment;

wherein when the sensing area is compressed, displaced air is transmitted to the environment via the open two sides.

5. The stacked structure of claim 1, further comprising an insulating layer formed on the conductive layer patterns and partially covering these patterns as well as part of the substrate.

6. The stacked structure of claim 1, further comprising cut holes or linear cuts or incisions, formed on the substrate for facilitating folding of the substrate to form the stacked structure.

7. The stacked structure of claim 1, further comprising a stiffener formed on at least a portion of the back layer of the stacked structure.

8. The stacked structure of claim 1, formed by a roll-to-roll method.

9. A method of forming a stacked structure composed of a plurality of layers, the method comprising:
providing a substrate;
printing a plurality of conductive patterns on the substrate;
forming at least one layer of elastic nodules on part of the conductive patterns;
printing or laminating an adhesive layer on but not completely covering the conductive patterns and substrate; and
folding the substrate multiple times to form the stacked structure where at least one layer of elastic nodules is located between two layers of the plurality of layers, wherein for each fold of the substrate, the adhesive layer is folded inward to form the stacked structure by adhering each layer of the plurality of layers, the layer of elastic nodules comprising a sensing area being used for at least one of actuation or sensing;
wherein the stacked structure does not comprise electrically conducting through holes or electrically connecting structures.

10. The method of claim 9, wherein the step of printing or laminating an adhesive layer comprises:
printing or laminating the adhesive layer so that a part of the substrate below at least two of the conductive patterns is not covered by the adhesive layer, so that when the substrate is folded, the stacked structure comprises an air reservoir in one of the plurality of layers;
and the method further comprises:
compressing the sensing area by displacing air to the air reservoir.

11. The method of claim 10, wherein a part of the substrate below at least two of the conductive patterns is not covered by the adhesive layer, so that when the substrate is folded, the stacked structure comprises a first air reservoir in a top layer of the plurality of layers and a second air reservoir in a bottom layer of the plurality of layers, and the method further comprises:

forming at least one hole in a middle layer of the plurality of layers for connecting the first air reservoir and the second air reservoir; and
compressing the sensing area by displacing air to the first air reservoir and the second air reservoir via the one or more holes.

12. The method of claim 9, wherein the step of printing or laminating an adhesive layer comprises:
only forming the adhesive layer on two sides of the sensing area, and leaving the other sides of the sensing area open to the environment;
and the method further comprises:
compressing the sensing area by displacing air to the environment via the open sides.

13. The method of claim 9, further comprising:
forming an insulating layer on part of the conductive layer patterns and also covering part of the substrate.

14. The method of claim 9, further comprising:
forming cut holes or linear cuts or incisions, on the substrate for facilitating folding of the substrate to form the stacked structure.

15. The method of claim 9, further comprising:
forming a stiffener on part of a back layer of the stacked structure.

16. A stacked structure composed of a plurality of layers, comprising:
a substrate;
a plurality of conductive patterns printed on the substrate; and
at least one layer of elastic nodules formed between two layers of the plurality of layers, the layer of elastic nodules comprising a sensing area being used for at least one of actuation or sensing;
wherein a hermetically sealed or semi-sealed pouch encases the stacked structure, the hermetically sealed or semi-sealed pouch being formed of a flexible material which has a folded shape or loose shape that allows the volume inside the pouch to change, to accommodate changes in ambient air pressure without hindering the compressive movement of the actuation or sensing of the stacked structure.

17. The stacked structure of claim 16, wherein the pouch structure is a one-sided elastic or pre-shaped flexible film that adheres to a substrate via an adhesive layer, and which adheres to one side of the substrate and encircles the stacked structure forming a covering pouch structure.

18. The stacked structure of claim 16, wherein the adhering is accomplished by an additional structure that seals the pouch to the substrate.

19. The stacked structure of claim 18, wherein the additional structure is a gasket.

20. The stacked structure of claim 16, wherein the pouch is tucked under the stacked structure and wherein an outer side of the pouch adheres to the substrate forming a sealed or semi-sealed structure.

* * * * *